(12) United States Patent
Ascari et al.

(10) Patent No.: US 11,074,497 B2
(45) Date of Patent: Jul. 27, 2021

(54) ARTIFICIAL MEMORY SYSTEM AND METHOD FOR USE WITH A COMPUTATIONAL MACHINE FOR INTERACTING WITH DYNAMIC BEHAVIOURS

(71) Applicants: TOYOTA MOTOR EUROPE NV/SA, Brussels (BE); HENESIS S.R.L., Parma (IT)

(72) Inventors: Luca Ascari, Parma (IT); Frederico Sassi, Poviglio (IT); Matteo Sacchi, Correggio (IT); Luca Mussi, Parma (IT); Jonas Ambeck-Madsen, Brussels (BE); Ichiro Sakato, Brussels (BE); Hiromichi Yanagihara, Fukuoka (JP)

(73) Assignees: TOYOTA MOTOR EUROPE NV/SA, Brussels (BE); CAMLIN ITALY S.R.L., Parma (IT)

( * ) Notice: Subject to any disclaimer, the term of this patent is extended or adjusted under 35 U.S.C. 154(b) by 888 days.

(21) Appl. No.: 14/413,944

(22) PCT Filed: Mar. 22, 2013

(86) PCT No.: PCT/EP2013/056104
§ 371 (c)(1),
(2) Date: Jan. 9, 2015

(87) PCT Pub. No.: WO2014/009031
PCT Pub. Date: Jan. 16, 2014

(65) Prior Publication Data
US 2015/0178620 A1    Jun. 25, 2015

Related U.S. Application Data

(63) Continuation-in-part of application No. PCT/EP2012/063371, filed on Jul. 9, 2012.

(51) Int. Cl.
*G06N 3/08* (2006.01)
*G06N 7/00* (2006.01)
(Continued)

(52) U.S. Cl.
CPC ............... *G06N 3/08* (2013.01); *G06N 3/049* (2013.01); *G06N 3/063* (2013.01); *G06N 7/005* (2013.01); *G06N 20/00* (2019.01)

(58) Field of Classification Search
CPC ....................................................... G06N 3/04
See application file for complete search history.

(56) References Cited

U.S. PATENT DOCUMENTS

2007/0005531 A1    1/2007    George et al.
2007/0192271 A1    8/2007    George et al.
(Continued)

FOREIGN PATENT DOCUMENTS

WO    2008/086156 A2    7/2008
WO    WO 2013/004846 A1    1/2013

OTHER PUBLICATIONS

T. Caelli et al., "Modularity in Neural Computing", Proc. IEEE, vol. 87, No. 9, 1999, pp. 1497-1518.*
(Continued)

*Primary Examiner* — Vincent Gonzales
(74) *Attorney, Agent, or Firm* — Oliff PLC

(57) ABSTRACT

This invention relates to an artificial memory system and a method of continuous learning for predicting and anticipating human operator's action as response to ego-intention as well as environmental influences during machine operation. More specifically the invention relates to an architecture with artificial memory for interacting with dynamic behaviors of a tool and an operator, wherein the architecture is a first neural network having structures and mechanisms for abstraction, generalization and learning, the network imple-
(Continued)

mentation comprising an artificial hierarchical memory system.

24 Claims, 22 Drawing Sheets

(51) Int. Cl.
    *G06N 3/04*        (2006.01)
    *G06N 20/00*      (2019.01)
    *G06N 3/063*     (2006.01)

(56) References Cited

U.S. PATENT DOCUMENTS

| | | |
|---|---|---|
| 2007/0213956 A1 | 9/2007 | Nasle et al. |
| 2007/0276774 A1 | 11/2007 | Ahmad et al. |
| 2008/0161987 A1* | 7/2008 | Breed .................... G08G 1/161 701/27 |
| 2008/0167820 A1 | 7/2008 | Oguchi et al. |
| 2009/0006289 A1 | 1/2009 | Jaros et al. |

OTHER PUBLICATIONS

""Neural-Gas" Network for Vector Quantization and its Application to Time-Series Prediction", IEEE Trans. on Neural Net., vol. 4, No. 4, Jul. 1993, pp. 558-569.*
W. Chen et al., "A General Model for non-Markovian Stochastic Decision Discrete-event Systems", 10th IEEE Int'l Conf. on Eng. of Complex Comp. Sys., 2005, 6 pages. (Year: 2005).*
J. Acevedo-Rodriguez et al., "Clustering of trajectories in video surveillance using growing neural gas", 4th Int'l Work-Conference on the Interplay between Natural and Artificial Computation, May 30-Jun. 3, 2011, pp. 461-470. (Year: 2011).*
Feb. 17, 2014 International Search Report issued in International Patent Application No. PCT/EP2013/056104.
Andreakis et al; "Incremental unsupervised time series analysis using merge growing neural gas;" Advances In Self-Organizing Maps, Springer Berlin Heidelberg, Berlin, Heidelberg; Jun. 2009; pp. 10-18.
Charalampous et al; "Sparse deep-learning algorithm for recognition and categorisation;" Electronics Letters; vol. 48; No. 20; pp. 1265-1266.
Sassi et al; "Classifying human body acceleration patterns using a hierarchical temporal memory;" Emergent Perspectives in Artificial Intelligence, Springer Berlin Heidelberg, Berlin, Heidelberg; Dec. 2009; pp. 496-505.
Hawkins et al; "Hierarchical temporal memory concepts, theory and terminology;" Internet Citation; Mar. 2007; pp. 1-20.
Kostavelis et al; "On the optimization of hierarchical temporal memory;" Pattern Recognition Letters; Apr. 2012; vol. 33; No. 5; pp. 670-676.
Dec. 6, 2016 Office Action issued in Japanese Patent Application No. 2015-520855.
Feb. 17, 2014 Written Opinion issued in International Patent Application No. PCT/EP2013/056104.
Nov. 5, 2012 International Search Report issued in International Patent Application No. PCT/EP2012/063371.
Nov. 5, 2012 Written Opinion issued in International Patent Application No. PCT/EP2012/063371.
Jul. 11, 2013 Written Opinion issued in International Patent Application No. PCT/EP2012/063371.
Oct. 13, 2011 Search Report issued in British Patent Application No. 1111645.6.
Joost Van Doremalen. "Hierarchical Temporal Memory Networks for Spoken Digit Recognition". PhD Thesis Faculteit Letteren Vakgroep Taal—en Spraaktechnologie, Dec. 31, 2007, XP55041929, URL: <http://www.acorns-project.org/documents/publications/DoremalenThesis.pdf> (retrieved Oct. 23, 2012).
"Hierarchical Temporal Memory Including HTM Cortical Learning Algorithms". Numenta, Inc., Dec. 10, 2010, pp. 11-23.
"Numenta Platform for Intelligent Computing Programmers Guide". Numenta Inc., Version 1.0, Mar. 2007, pp. 1-186, URL <http://www.web.archive.org/web/20070319232606/http://www.numenta.com/for-developers/software/pdf/nupic_prog_guide.pdf>.

* cited by examiner

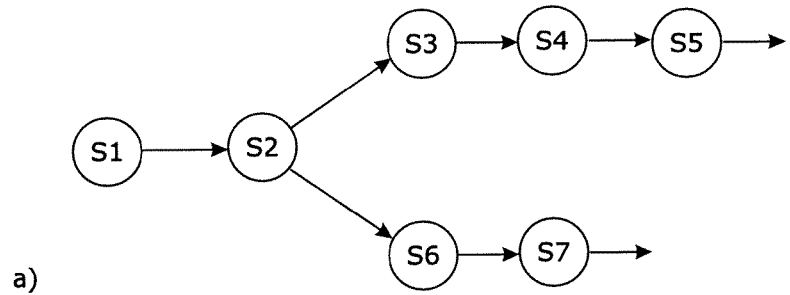
a)
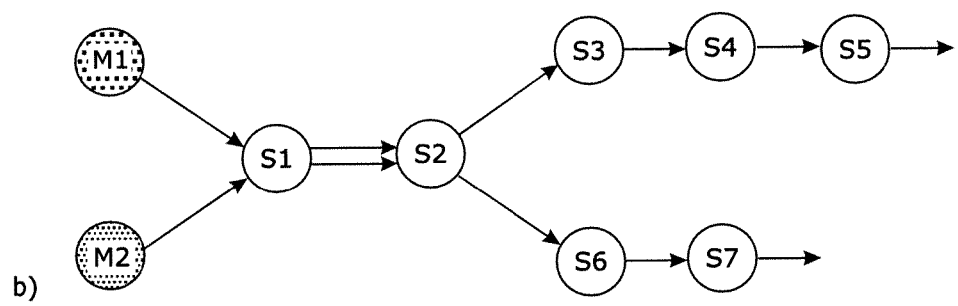
b)
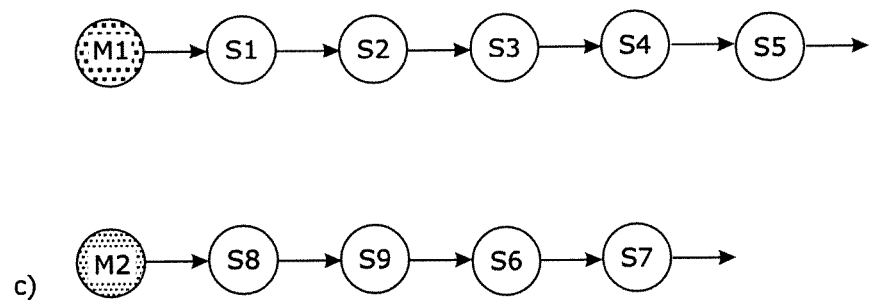
c)
Fig. 12

ARTIFICIAL MEMORY SYSTEM AND METHOD FOR USE WITH A COMPUTATIONAL MACHINE FOR INTERACTING WITH DYNAMIC BEHAVIOURS

The present invention relates to artificial memory systems and methods as well as a method of continuous learning for use with a computational machine for interacting with dynamic behaviours and for predicting and anticipating human operators' action as response to ego-intention as well as environmental influences or surrounding situations during machine operation.

More specifically the invention relates to a computational machine for interacting with dynamic behaviours comprising a modified Hierarchical Temporal Memory (HTM) as well as a method of training such artificial memory systems on classifying, predicting, storing and/or filtering signals coming from sensor inputs.

BACKGROUND OF THE INVENTION

Today, assisting systems are used for many applications in almost any kind of industry. Especially in the automotive industry or the aviation industry as well as in computational industry assisting systems are commonly used to facilitate for a user the operating of systems. In automotive industry, well known systems like ESC (Electronic Stability Control) for improving the safety of the vehicle's stability by detecting and minimizing of the skidding, or EBA (Emergency Brake Assist) to ensure maximum braking power in emergency situations by interpreting the speed and the force at which a brake pedal is pushed are widely-used. In aviation industry active autopilots or so called fly-by-wire systems are commonly used in modern civil as well as military aircrafts, where electronic interfaces replace the manual flight control by converting the movements of the flight controls into electronic signals and initiate flight control without human interference.

Additionally, the number of sensors and actuators integrated in the systems, like vehicles or aircrafts, increases rapidly with the aim to sensor and/or control almost each and every component in these systems electronically. One problem arising from the increased number of sensors and actuators is the amount of data to be handled and/or analyzed for recognizing a specific situation or operational status of the systems.

It is an intention of modern assisting systems to provide a robust, sensitive and real-time monitoring of human intention while operating a machine in a dynamically changing environment. Such modern assisting systems enable efficient and safe operation of a machine, optimized to actual human intended operation. Such machine may be any kind of system to be operated by a human, like e.g. a vehicle, aircraft, ship, a machine etc. as well as computational systems like, e.g. a computer game, or the like. In the following the term "system" should be understood as any kind of these.

WO2008086156 discloses a system and method for predicting driver behavior and generating control and/or warning signals which comprises: one or more sensors; a database; a driver predictor for generating warning and control signals; a notification unit; and a vehicle control unit. More specifically, the driver predictor includes a transfer module, a hierarchical temporal memory and a prediction retrieval module. The transfer module is used to receive data and translate it into a form so that it can be stored in the hierarchical temporal memory. The hierarchical temporal memory receives data input and stores it such that data items are translated into short-term memory items which are in turn translated into intermediate-term data which in turn are finally translated into long-term data. The translation of data from one level of the memory to another is performed such that the data at each level of memory is reflective of and predictive of a particular driver behavior. Once the data is stored in the memory, the prediction retrieval module accesses the hierarchical temporal memory to generate warning signals to alert the driver of potentially dangerous conditions and/or control systems of the vehicle to prevent or avoid collisions.

WO2010000521 discloses a driver assistance method for the indication and/or autonomous or semi-autonomous adjustment of a driving maneuver to avoid a collision or to reduce the effects of a collision in a motor vehicle on the basis of at least one ascertained evasion trajectory to prevent an accident while the motor vehicle is travelling. The disclosed method has the steps of a situation sensing step for sensing a current environment situation for the motor vehicle using at least one object detection sensor in the motor vehicle and/or data from at least one further vehicle system; a situation assessment step for ascertaining at least one evasion trajectory on the basis of the current environment situation of the motor vehicle and a trajectory prediction for the motor vehicle and for at least one detected object in the environment of the motor vehicle; and an action step for indicating and/or autonomously or semi-autonomously adjusting the driving maneuver on the basis of one of the ascertained evasion trajectories.

SUMMARY OF THE INVENTION

The invention relates to use of a first arrangement of first nodes, of which one or more of said first nodes being second arrangements of second nodes or components, in an embodiment denoted further neurons, said first and/or second arrangements preferable neural networks, alternatively said first arrangement preferably being a Memory Prediction Framework implementation and even more preferably a first neural network with a further Memory Prediction Framework implementation. Note that said nodes are denoted clustering nodes as their function to find data representations is realized by finding clusters of data or cluster of sequences therein. The first nodes are based on a set of components that represent input data and connection between said components that represent temporal or spatial relationship between represented data. In an embodiment of the invention one or more or all of said first nodes being based on the neural gas concept being artificial neural networks able to find suitable or optimal input data representations. More in particular neural gas is a quantization method. It is an algorithm for finding suitable or optimal data representations based on n-dimensional vectors of features (feature vector). In particular for the invention input values provided to the first nodes are probability distributions, except for the first level of first nodes receiving as input sensor values, whereas internally to the first nodes the input for their internal algorithms (for instance the neural gas method in accordance to an embodiment of the invention) is an n-dimensional feature vector composed by a probability distribution (as received as input to the first node) and/or a temporal context vector and/or a permanence estimation descriptor. The invention is specially providing nodes or clustering nodes denoted spatial temporal nodes, handling input data sequences, therefore the underlying techniques used with the nodes are adapted for performing time series analysis, preferably on-line or real-time. Hence the invention provides that one or more or all of said first nodes being based on the so called merge neural gas concept (a recursive growing self-organizing neural network for time series analysis) or alternatively described as temporal neural gas, which (i) introduces context data in the input space, whereby the context is a measure of past inputs (e.g. exponential mean), (ii) each neuron specializes on both the current input and the current context (to achieve a short-term temporal splitting). The above adaptations are applicable to any Neural Gas variation, for instance MGNG (Merge Growing Neural Gas), being a combination of the temporal context of Merge-SOM and the incremental part of GNG. More in particular the introduction of the concept of permanence is to be noted. In an embodiment of the invention first nodes are context-aware, therefore they can update the context with the new input data and search for the closest-context neuron. The temporal context of a merge neural gas combines the currently presented pattern with the sequence history patterns. Especially the invention provides for use a permanence estimation factor in the feature vector, further in combination with a permanence detector. The invention differs from "pure" neural gas theory because the neural gas as adapted in the invention provides a representation of a generalized Markov process, as demonstrated in the embodiments by the introduction of a temporal graph used side-by-side with the original topological graph leveraged by the Neural Gas theory.

Generally speaking an architecture is provided with artificial memory for interacting with dynamic behaviors of a tool and an operator, wherein the architecture is a first neural network having structures and mechanisms for abstraction, generalization and learning, the network implementation comprising an artificial hierarchical memory system, comprising (1) a port receiving data, generated by sensors on the tool; (2) one or more (spatial temporal) (clustering) nodes able to learn frequently seen input pattern and sequences therein; and (3) a port outputting data, constructed by the system and related to the behavior of the tool and/or operator, whereby one or more or essentially all of said nodes each being a second, preferably recursive growing self-organizing, neural network for time series analysis, comprising of neurons and edges connecting two or more of said neurons. The architecture may have further (spatial) clustering nodes able to learn frequently seen input patterns as such. Note that in between the port receiving data and the one or more first nodes other nodes might be present for performing a pre-processing step, like feature extraction.

Therefore in a first aspect of the invention an architecture is disclosed with artificial memory for interacting with dynamic behaviors of a tool and an operator, wherein the architecture is a first neural network having structures and mechanisms for abstraction, generalization and learning, the network implementation comprising an artificial hierarchical memory system, comprising (1) a port receiving data, generated by sensors on the tool; (2) one or more first nodes able to learn and recognize frequently seen input pattern and sequences therein; and (3) a port outputting data, constructed by the system and related to the behavior of the tool and/or operator, whereby one or more or essentially all of said nodes each being a second neural network adapted for time series analysis, comprising of neurons and edges connecting two or more of said neurons in a graph, preferably a topological or temporal graph.

The other aspects of the invention relate to computer based method for interacting with dynamic behaviors of a tool and an operator in relation to the architecture as described or computer based method for training/learning one or more of the nodes of an architecture as described or a computer based method for determining an output related to an input by use of the architecture as described The above described concepts are applicable to or can be used in connection with the methods, systems and architecture described further on.

The invention relates to a method or system or architecture, more in particular a perceptual/cognitive architecture with an artificial (i.e. implemented on a machine, or in or as a computer or in or as a tool) memory system, comprising: (1) at least one first node, further denoted Event Pooler node, being adapted to store and recall (e.g. long) input sequences, such (e.g. long) input sequences being modeled as an event; (2) at least one second node, further denoted Forced Temporal Pooler node, being adapted to extract and save prototypes from raw data, each prototype being representative of data chunks characterizing real world operation (of a tool within its environment) with features which are similar; whereby the second (Forced Temporal Pooler) node provides the input for the Event Pooler node. The raw data is typically data obtained from sensors, e.g. sensors that sense the activity of actuators or control elements of a machine or tool.

The above system or machine or architecture is particularly suited for understanding and controlling the dynamic behaviors of a tool in response to the human operator, more especially for actual and safe interactions of operator and tool in real-time in a dynamically variable environment.

Further the Perceptual/Cognitive architecture has structures and mechanisms for abstraction, generalization, and learning and optionally prediction, in particular prediction of input operator commands. In an embodiment the architecture is based on a Memory Prediction Framework implementation. More in particular the Memory Prediction Framework implementation comprises an enhanced artificial hierarchical memory system, comprising (1) at least one Event Pooler node, being adapted to store and recall long input sequences, such long input sequences being modeled as an event; (2) at least one Forced Temporal Pooler node, being adapted to extract and save prototypes/primitives from raw data, each prototype being representative of data chunks characterising real world operation (of a tool) with features which are similar; whereby the Forced Temporal Pooler node provides the input for the Event Pooler node, more especially the events are defined as occurrence of at least one prototype/primitive.

In a further embodiment the architecture comprises (1) a first processing stage (further denoted "conscious layer") comprising of a single or plurality of Event Pooler nodes, each being adapted to store and recall (e.g. long) input sequences, such (e.g. long) input sequences being modeled as an event; and (2) a second processing stage (further denoted "wired layer"), separate from the first processing stage, the second processing stage comprising a plurality of Forced Temporal Pooler nodes, each being adapted to extract and save prototypes from raw data, each prototype being representative of data chunks with features which are similar, whereby the second processing stage is suited for identifying and recognizing (e.g. single and/or multimodal spatio-temporal) primitives while the first stage is suited for learning, storing, recalling and predicting more abstract relationships among those primitives, these relationships comprising spatial-temporal events and inter-event states.

Note that amongst other methods, the above allows for the prediction/expectation of the temporal evolution of the primitives themselves (pushed down to second processing stage as "prediction" of operator input.

In an embodiment of the present invention one may dedicate one or more Forced Temporal Pooler nodes to recognize single mode spatio-temporal primitives, wherein the primitive relates to variations in input from a single physical sensor. Hence the primitives relate to received input from a single physical sensor. Furthermore another one or more Forced Temporal Pooler nodes can be dedicated to recognize multi-mode spatio-temporal primitives, wherein the primitive relates to co-occurrence of variations and hence receive inputs from more than one physical sensor.

Across the various embodiments the Event Pooler node may model either events as being occurrences of single mode prototypes/primitives, or of multimode prototypes/primitives, or both.

In an embodiment of the invention the extraction in the Forced Temporal Pooler node is being performed by a learning process, defining internal states and sequences thereof, whereby the node is provided with capabilities for applying known input data while using a forced learning process imposing those internal states and sequences thereof.

Note that the nodes as discussed above may be all derived from a generic node architecture, such generic node being capable to perform all of the discussed functions like event operation, primitive operation, and the learning thereof. By configuring the memory hierarchy with its plurality of interconnections between the plurality of nodes, one may then select the precise functions to be executed for a node.

While the invention has been cast in the context of a man-machine interface, in particular in relation to vehicles, wherein signals are generated from sensing the behavior of a driver and/or from external sensors of the car, more elaborated arrangements are possible wherein the sensors sense a variety of human activities in a direct or indirect way. For example, electrodes of a EMG—electromyography—acquisition system, or an (for instance an EEG—electroencephalography) helmet on the driver's head and optionally the driver commands and external sensors of the car, or MEMS accelerometers distributed on the person's body in a BAN (body area network) can be used to sample signals relating to human behavior. The cognitive architecture accepts all these data and is able of making predictions.

Moreover the cognitive architecture can be considered in an even broader context, wherein the system is fed with signals from a variety of electronic sources of which WSN (wireless sensor network) data and/or EEG data and/or EMG data and/or accelerometer data, in any combination of them are examples.

Indeed in an embodiment thereof the perceptual/cognitive architecture, being hosted in a server, processes data coming from a wireless sensor network. Such sensors can be deployed for instance in the landscape. In this case the sensors provide their inputs to embodiments of the present invention as described, but the sensors are distributed and wirelessly connected. For example, such a system could be used to detect, recognize, predict human behaviors starting from ambient sensors deployed in the house, or any other behavior. In this case the user interacts with the house, not with a machine per se, for control of the house, which must be "operated" due to regulations, for instance.

In an alternative embodiment thereof the nodes of the perceptual cognitive architecture are physically part of the wireless sensor network, in the hierarchy. This may require an embedded system hosting h-MPF algorithms. As a result a distributed h-MPF in the environment is an embodiment of the present invention.

In summary the invention relates also to systems comprising one or more cognitive architectures as described above, fed with a plurality of distributed sensors, (e.g. possibly wirelessly) communicating with those one or more architectures, which might themselves be distributed.

It is therefore an advantage of the present invention to provide an alternative artificial memory system and method of teaching or training such a system for use with a computational machine for interacting with dynamic behaviours and for predicting and anticipating human operators' action as response to ego-intention as well as environmental influences or surrounding situations, seen or not seen before, during machine operation.

A further advantage of such a system and method is its capability of handling and/or analyzing large amount of data coming from sensor signals and/or actuators, especially the capability of classifying, predicting and/or filtering large amount of data for predicting and anticipating human operators' actions and particularly in dealing with unknown situations.

In one aspect the present invention this is achieved by a Perceptual/Cognitive architecture with artificial memory for interacting with dynamic behaviours of a tool and an operator, wherein Perceptual/Cognitive architecture is based on a Memory Prediction Framework implementation having structures and mechanisms for abstraction and generalization and optionally learning, the Memory Prediction Framework implementation comprising an enhanced artificial hierarchical memory system, the enhancement being at least provision of a preprocessing stage, the architecture being adapted to provide a prediction about input operator commands based on temporal events management and the preprocessing stage being adapted to describe input data from physical sensors in terms of primitives and recurrent patterns.

The artificial hierarchical memory system can be an enhanced Hierarchical Temporal Memory (HTM).

Predicting the operator commands within a context allows the system to classify intentions of the human operator. The context can be obtained by physical sensors which can provide information about the environment and the developing context.

Another aspect the present invention is achieved by a Perceptual/Cognitive architecture with artificial memory for interacting with dynamic behaviours of a tool and an operator, wherein the Perceptual/Cognitive architecture is based on a Memory Prediction Framework implementation having structures and mechanisms for abstraction and generalization and optionally learning, the memory Prediction Framework implementation comprising an enhanced artificial hierarchical memory system, the enhancement being at least provision of a preprocessing stage, the preprocessing stage being adapted to describe input data from physical sensors in terms of primitives and recurrent patterns, the architecture having feed-forward and feed-back signal flows within the architecture, the correspondence between the feed-forward and feed-back signal flows being a measure of a context check.

Note that feed-forward and feed-back can also be understood as upward and downward signal flows within the architecture.

The artificial hierarchical memory system can be an enhanced Hierarchical Temporal Memory (HTM).

A context check provides an indication when the higher level interpretations of the sensor input data are not consistent with the data itself. If, after feed-forward and feed-back processing of the data, significant differences exists between the predictions and the observations, this indicates that there is a potentially troublesome situation and a loss of coherence in the system.

Yet another aspect the present invention is achieved by a Perceptual/Cognitive architecture with artificial memory for interacting with dynamic behaviours of a tool and an operator, wherein the architecture is based on a Memory Prediction Framework implementation having structures and mechanisms for abstraction and generalization and optionally learning, the memory Prediction Framework implementation comprising an enhanced artificial hierarchical memory system, the enhancement being at least provision of a preprocessing stage, the preprocessing stage being adapted to describe input data from physical sensors in terms of primitives and recurrent patterns, the architecture being adapted to output a compressed higher level information on the behavior of the tool and/or operator based on inputs from the physical sensors.

The artificial hierarchical memory system can be an enhanced Hierarchical Temporal Memory (HTM).

The compressed higher level information can be a classification, e.g. of behavior. Such a classification can be useful as it records behaviour in a compressed manner rather than recording more voluminous and less understandable raw data.

Preferred embodiments are defined in the dependant claims as well as the following description.

Embodiments of the present invention can include an artificial memory system for use with a computational machine for interacting with dynamic behaviours, the artificial memory comprising a Physical I/O Layer, an Enhanced hierarchical Memory, a Time Master, a Context Check, a Supervised Gating, a System Control Unit, and a User Control I/O Layer. The Physical I/O Layer can be adapted to translate physical sensor inputs without modifying the information content to a format manageable by the Enhanced hierarchical Memory, and the Enhanced hierarchical Memory can be adapted to be taught and to recognize, and predict sequences of input patterns received from the Physical I/O Layer. The User Control I/O Layer can be adapted to output compressed higher level information based on the physical sensor inputs received by the Physical I/O Layer. Typically the "input pattern" obtained from the sensors is linked to a human intention of doing something or not doing something as part of a context/environment, i.e. the human operator will adjust controls in a certain pattern and the adjustment of these controls will be detected by the sensors.

Optionally the "driver" can be an autonomous driver. For example the driver commands can be given a priori, in the form of commands stored on a suitable storage medium that can be read by the system. The commands might be destinations, expected times of arrival, expected fuel consumption, whether to drive aggressively, sportily, calmly etc. The actual human driver can also intentionally switch on the system and a command can be provided to drive the driver to a destination in such a way that accelerations, braking force, speed, fuel consumption etc are according to the driver's normal behaviour or other behaviour.

Note that more generally speaking a driver is a user. Further in the description other types of users such as people living in a house, equipped with sensors, connected to the system are discussed also.

Also the system can take over in case of lack of commands. For example if it is detected that the driver is asleep the system brings the vehicle safely to a stand still. Whether the driver has fallen asleep can be detected by an Awareness Check.

Also the Awareness function of the present invention can be used in combination with characteristics of the driver. What is an emergency situation for a beginner is not necessarily n an emergency for a formula 1 racing driver. Thus embodiments of the present invention combine Awareness of the tool behaviour with driver capabilities as determined for example by driving behaviour.

Embodiments of the present invention can include an artificial memory system for use with a computational machine for interacting with dynamic behaviours, the artificial memory comprising a Physical I/O Layer, an Enhanced hierarchical Memory, a Time Master, a Context Check, a Supervised Gating, a System Control Unit, and a User Control I/O Layer, wherein the Physical I/O Layer is adapted to translate physical sensor inputs without modifying the information content to a format manageable by the Enhanced hierarchical Memory, and wherein the Enhanced hierarchical Memory is adapted to be taught and recognize, and predict sequences of input patterns received from the Physical I/O Layer, and wherein the User Control I/O Layer is adapted to output a classification output and/or a context check.

According to a preferred embodiment of the invention, the Enhanced hierarchical Memory of the artificial memory system comprises a plurality of Memory Level blocks which are employed and connected together in a hierarchical way.

According to another preferred embodiment of the invention, the Enhanced hierarchical Memory comprises a plurality of Memory Level blocks which are employed and connected together in a hierarchical way. Each of these Memory Level blocks may consist of at least of a set of nodes arranged in distinct columns, wherein each node column comprises at least an Event Pooler node.

According to yet another embodiment, the at least one Event Pooler node has a Spatial Pooler node or a Forced Temporal Pooler as a child-node.

According to a further preferred embodiment, each Memory Level block of the Enhanced hierarchical Memory is coupled with an Attentive Classifier. Further, the Attentive Classifier may comprise at least one of a Control Unit, a Gating, a Multi-Parent Gating, and a Classifier.

The very first Memory Level block in the Enhanced hierarchical Memory of the artificial memory system may comprise a Wired Memory Level block to receive input signals. The Wired Memory Level block by itself may consist of at least of a set of nodes arranged in distinct columns, wherein each node column comprises at least a Signal Quantizer node and at least a Forced Temporal Pooler node. Furthermore, a node column may additionally comprise a Smoother node and/or a Forced Event Pooler node.

In another aspect of the present invention a method of interacting with dynamic behaviours of a tool and an operator is provided based on a Memory Prediction Framework implementation having an enhanced hierarchical memory system, the method comprising:

Generating signals by sensors, wherein the signals representing a physical status of the system;

Sending the signals generated by sensors to the artificial memory system;

Collecting the signals in the artificial memory system,

Describing the input data in terms of simple primitives and recurrent patterns;

Receiving and analyzing operator's commands, tool behavior, optionally an external environment, and the content of the artificial memory system to decide if a received event is a new/unknown or a known event;

Classifying the received event; and

Determining from an internal representation the current state of the tool along with the identification of short temporal events and inferred long term operator actions.

The artificial hierarchical memory system can be an enhanced Hierarchical Temporal Memory (HTM).

The method may include:

Outputting a compressed higher level information on the behavior of the tool and/or operator, or predicting about input operator commands based on temporal events management and the primitives and recurrent patterns of the input data, or determining from feed-forward and feed-back signal flows the correspondence between the feed-forward and feed-back signal flows as a measure of a context check, or any combination of these.

In another aspect of the present invention a method of interacting with dynamic behaviours of a tool and an operator is provided based on a Memory Prediction Framework implementation comprising an artificial memory system, the method comprising the steps of:

Generating signals by sensors, wherein the signals representing a physical status of the system;

Sending the signals generated by sensors to the artificial memory system;

Collecting the signals in the artificial memory system, wherein the artificial memory system is equipped with memory patterns describing the behavior of the system;

Classifying, predicting and/or filtering the signals coming from the sensors in the artificial memory system and sending back the computational result to the system; and Generating a Context Check signal by the artificial memory system representing the internal coherence status of the memory and which Context Check signal highlights when the output of the artificial memory system is trustable.

The method may further comprise:

Sending the Context Check signal to a Exception Evaluator; and

Receiving the Context Check signal by the Exception Evaluator, wherein the Exception Evaluator decides, based on the Context Check signal received, to record current raw signals from the sensors received for a deeper off-line analysis by sending a control signal to a Pattern Recorder module. The artificial hierarchical memory system can be an enhanced Hierarchical Temporal Memory (HTM).

The method may also comprise:

Storing the raw signals received in a database;

Separating the artificial memory system from the signals coming from the sensors;

Setting the artificial memory system to a train mode; and

Feeding the previously stored pattern in the database as an input to the artificial memory system instead of the signals generated by the sensors to train the artificial memory system on that stored signal pattern.

In another aspect of the present invention a method of interacting with dynamic behaviours of a tool and an operator is provided based on a Memory Prediction Framework implementation comprising an artificial memory system, the method comprising the steps of:

Generating signals by nodes of a wireless sensor network, wherein the signals representing a physical status of the system, where the system can be any natural or artificial environment being monitored;

Sending the signals generated by sensors to the artificial memory system wirelessly;

Collecting the signals in the artificial memory system, wherein the artificial memory system is equipped with memory patterns describing the behavior of the system;

Classifying, predicting and/or filtering the signals coming from the sensors in the artificial memory system and sending back the computational result to the system through the wireless sensor network or through a web site or an application for mobile devices, such as smart phones; and Generating a Context Check signal by the artificial memory system representing the internal coherence status of the memory and which Context Check signal highlights when the output of the artificial memory system is trustable.

The method may further comprise:

Sending the Context Check signal to a Exception Evaluator; and

Receiving the Context Check signal by the Exception Evaluator, wherein the Exception Evaluator decides, based on the Context Check signal received, to record current raw signals from the sensors received for a deeper off-line analysis by sending a control signal to a Pattern Recorder module. The artificial hierarchical memory system can be an enhanced Hierarchical Temporal Memory (HTM).

The method may also comprise:

Storing the raw signals received in a database;

Separating the artificial memory system from the signals coming from the sensors;

Setting the artificial memory system to a train mode; and

Feeding the previously stored pattern in the database as an input to the artificial memory system instead of the signals generated by the sensors to train the artificial memory system on that stored signal pattern.

In another aspect of the present invention a method of interacting with dynamic behaviours of a tool and an operator is provided based on a Memory Prediction Framework implementation comprising an artificial memory system, the method comprising the steps of:

Generating signals by sensors, wherein the signals representing a physical status of the system;

Sending the signals generated by sensors to the artificial memory system;

Collecting the signals in the artificial memory system, wherein the artificial memory system is equipped with memory patterns describing the behavior of the system;

Classifying, predicting and/or filtering the signals coming from the sensors in the artificial memory system and sending back the computational result to the system; and Generating a Context Check signal by the artificial memory system representing the internal coherence status of the memory and which Context Check signal highlights when the output of the artificial memory system is trustable.

The method may further comprise:

Sending the Context Check signal to a Exception Evaluator; and

Receiving the Context Check signal by the Exception Evaluator, wherein the Exception Evaluator decides, based on the Context Check signal received, to record current raw signals from the sensors received for a deeper off-line analysis by sending a control signal to a Pattern Recorder module.

The artificial hierarchical memory system can be an enhanced Hierarchical Temporal Memory (HTM).

The method may also comprise:

Storing the raw signals received in a database;

Separating the artificial memory system from the signals coming from the sensors;

Setting the artificial memory system to a train mode; and

Feeding the previously stored pattern in the database as an input to the artificial memory system instead of the signals generated by the sensors to train the artificial memory system on that stored signal pattern. In another aspect of the present invention a method of interacting with dynamic behaviours of a tool and an operator is provided based on a Memory Prediction Framework implementation comprising an artificial memory system, the method comprising the steps of:

Generating signals by sensors, wherein the signals representing a physical status of the system;

Sending the signals generated by sensors to the artificial memory system;

Collecting the signals in the artificial memory system, wherein the artificial memory system is equipped with memory patterns describing the behavior of the system;

Evaluating the behaviour of the operator, or predicting the expected operator behaviour in the future, or filter and reconstruct current operator commends or generate a Context Check signal by the artificial memory system representing the internal coherence status of the memory.

The artificial hierarchical memory system can be an enhanced Hierarchical Temporal Memory (HTM).

The method may further comprise:

Sending the Evaluation, the prediction, or filtration and reconstruction or Context Check signal to an Awareness Evaluator; and the Awareness Evaluator deciding, based on the signals received to provide passive or active control information to the operator.

In another aspect of the present invention a method of interacting with dynamic behaviours of a tool and an operator is provided based on a Memory Prediction Framework implementation comprising an artificial memory system, the method comprising the steps of:

Generating signals by sensors, wherein the signals representing a physical status of the tool;

Sending the signals generated by sensors to the artificial memory system;

Collecting the signals in the artificial memory system, wherein the artificial memory system is equipped with memory patterns describing the behavior of the tool;

the artificial memory system generating a classification that summarizes the status of the tool; and Generating a Context Check signal by the artificial memory system representing the internal coherence status of the memory.

The artificial hierarchical memory system can be an enhanced Hierarchical Temporal Memory (HTM).

The method may further comprise:

Sending the Context Check signal to a controller as well as the input data; and recording the classification and/or the controller allowing recording of the input data when it has received a context check signal indicating an exception, In another aspect of the present invention a method of interacting with dynamic behaviours of a tool and an operator is provided based on a Memory Prediction Framework implementation comprising an artificial memory system, the tool being part of a gaming system, the method comprising the steps of:

Generating signals by sensors, wherein the signals representing a physical status of the tool and the behaviour of the operator;

Sending the signals to the artificial memory system;

Collecting the signals in the artificial memory system, wherein the artificial memory system is equipped with gaming patterns describing the behavior of the operator;

the artificial memory system generating a classification that summarizes the gaming capabilities of the operator; and Generating a Context Check signal by the artificial memory system representing the in incoherence in game play by the operator.

The artificial hierarchical memory system can be an enhanced Hierarchical Temporal Memory (HTM).

The method may further comprise:

Sending the Context Check signal the classification to a controller; and the controller controlling the game therewith.

According to a preferred embodiment of the inventive method, a Tool I/O Interface controls whether the artificial memory system is classifying, predicting and/or filtering the signals coming from the sensors and sets the artificial memory system to a train mode when the operational status of the system allows training.

According to another preferred embodiment, the artificial memory system is separated from the signals coming from the sensors by gates, which gates are triggered by the Exception Evaluator, whereby the Exception Evaluator is informed by the Tool I/O Interface about the training status of the artificial memory system.

BRIEF DESCRIPTION OF THE DRAWINGS

FIG. 12 graphically depicts a splitting mechanism in a Temporal Pooler node using markers according to an embodiment of the present invention;

DETAILED DESRIPTION OF THE EMBODIMENTS

Figure 1:
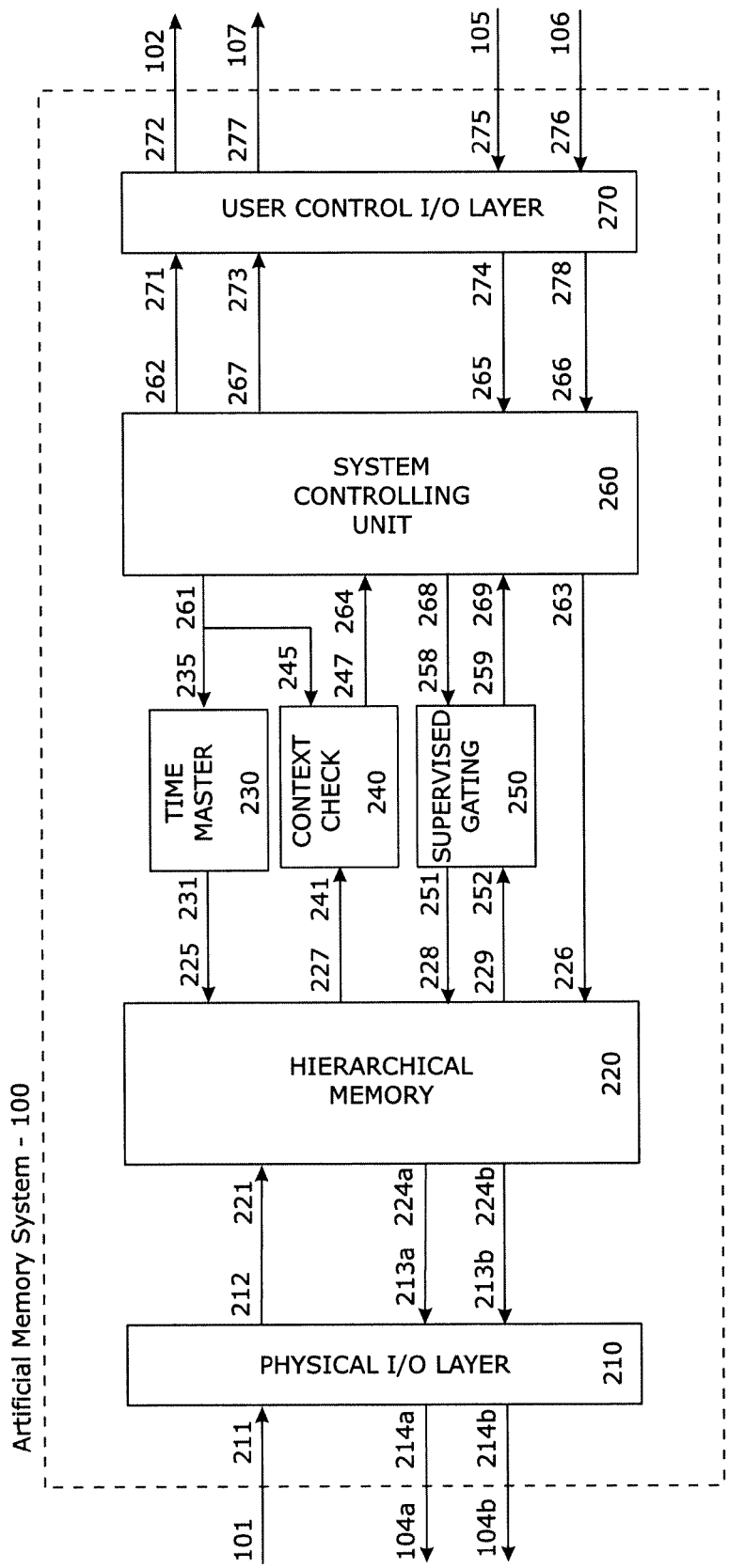
FIG. 1 shows schematically an artificial memory system according to an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention relates to computational processing architectures with nodes, wherein nodes having an input and an output, and wherein based on supply of a certain input, such node will provide a certain associated output, when the node is in a first operation mode, being called the inference mode, while in a second operation mode, being called learning mode, the node is capable to create this association or relation between inputs and outputs.

The invention further relates to an architecture with at least one other second (FTP) node, being adapted to create such predetermined set of data (in learning mode) (the set being denoted primitives/prototypes) and to output one of those, upon receiving input data (in inference) mode.

In an embodiment of the invention such second nodes are capable of outputting related control signals to the sensor by correlating received associations from first node(s) to its primitives and hereby related physical sensor control values.

The invention relates to architectures with at least one first node (EP) node, being adapted to change its internal state only with its input data changes from one to another input data (denoted an event), selected from a predetermined set of data.

The architecture hence supports a method of storing a sequence of input data in a compressed manner, by storing an index of the recognized input data (for instance the number in the predetermined list) and information related to timing (like occurrence and/or duration).

In an embodiment of the invention such second nodes are capable to be forced to associate input data with a partially or entirely inputted predetermined set of data (in a so-called forced learning process).

In an embodiment of the invention the output of the second node serves as input to the first node.

This embodiment of the architecture support a method of use of the architecture wherein the one or more second nodes (defining the so-called wired level or layer), being fed with input, operate at each defined clock cycle, while the one or more first nodes (defining the so-called conscious level or layer), being fed with the output of the second nodes, react only upon changes, and hence in an asynchronous way compared with the second nodes. This realizes a much lower memory footprint and speed and therefore good compression properties and real-time use capabilities, which is one (amongst other) technical advantages of the system.

Note that the creation of the association or relationship between input and output by the nodes is defined at the level of such node, for instance for the first node, on event and sequence of event level, and the representation thereof, while for the second node, on the level of temporal input sequences and the representation thereof. The use of the above defined specialized nodes enables creation of input output associations or relationship extending beyond one node layer, indeed by a controlled use of learning and interference mode and a controlled feeding back (from a higher node to a lower node) and forward (from a lower node to a higher node) information, improved input output representation across multiple nodes is performed, thereby going from abstract to concrete and vice versa, an important feature for real-world operation.

The invention may therefore also provide a master (timing) node, being capable of controlling the operations on one or more nodes, such operations being performing information feedback, information feed forward, update of nodes internal states, and switching between learning and inference mode.

The use of the system in a dynamic environment with operators while having safety requirements of operator comfort and safety puts some boundaries or design considerations on the degrees of freedom for learning by the system itself. Another technical contribution of the invention is to select as boundary condition the controlled (forced) learning by the Forced Temporal Pooler node.

The present invention relates to computer based Perceptual/Cognitive architecture with artificial memory for interacting with dynamic behaviours of a tool and/or a human actor or operator. The architecture can process sensor data so as to be able to understand and anticipate a human actor that interacts with the architecture and with the tool as well as his/her intentions, sometimes in response to an external context. The tool can be a physical object such as a vehicle with a captain, driver or pilot, e.g. an aircraft, automobile, ship, or a sporting tool such as a dummy racket in combination with a virtual tennis court as part of a gaming environment. The sensors can be electro-mechanical, optical, mechanical, temperature, electrical, magnetic, electromagnetic, audio, time sensors for example. Considering the un-controlled, un-predictable, and un-tested situations/environments under which a target application is expected to work providing high and robust performances, a major requirement provided by the architecture according to embodiments of the present invention can be identified as generalization capabilities.

Generalization abilities make the system tolerant to minor differences in operator performance patterns allowing for finite memory usage and hence tackling the impossibility of storing inside the system memory all possible situations which might be encountered during every operation of the tool. Concrete examples of situations where generalization capability is expected to win (against analytical approaches) includes coping with different operators (inter-operator) having different operational styles or characteristics as well as coping with different intentions of the same operator (intra-operator), and with different plans and times all of which cannot be foreseen a priori during the design of the system. In fact, a human operator scenario is extremely challenging because of the variability and adaptability of human operators, so that the number of situations in which an operator might be involved is virtually unlimited and hence impossible to memorize in an exhaustive manner.

A system as described with reference to the present invention which is provided with the above-listed capabilities is able of coping with unknown (because un-learned) situations. In other words, such a system is capable of a kind of understanding (e.g. by concluding/inferring from already experienced and related events), even situations which were never seen before (e.g. possibly identifying them as "unknown"). Since sound predictions can only be sought on the basis of a good understanding, these capabilities are indeed primary requirements for the final architecture.

A system or method according to the present invention has the following elements which each make a separate contribution as well as contributing in combinations:
preprocessing: describing the input data specific to the System/Tool operation modes in terms of simple primitives and recurrent patterns allows for the system to be able to reliably deal with specific sensory channels.
understanding: by analyzing operator's commands, tool behavior, possibly the external environment, and the content of the memory, the system "understands" the situation (e.g. the context), and whether it is something new/unknown or a known one (related to already experienced/"memorized" ones) which can be further classified, for example, as "good", "bad", "safe" or "risky", "successful" or "unsuccessful". Noticeably, confidently recalled known situations can be used to predict very likely future operator's and tool's activity.
Interactions: two-way, iterative or adaptive iterative interactions/communications between tool behavior (which is an internal representation of the current state of the tool along with the identification of short temporal events) and operator's intentions (e.g. inferred long term operator actions) during operation.

In embodiments of the present invention a human operator is mentioned such as a driver, captain, pilot, gamer. Such a person can be "autonomous". For example the operator commands can be given a priori, in the form of commands stored on a suitable storage medium that can be read by the system. For example if the operator is a driver and the tool is a vehicle such as an automobile, the commands might be destinations, expected times of arrival, expected fuel consumption, whether to drive aggressively, sportily, calmy etc. The actual human driver can also intentionally switch on the system and a command can be provided to drive the driver to the destination in such a way that accelerations, braking force, speed, fuel consumption etc are according to the driver's normal behaviour or other behaviour. Also the system can take over in case of lack of commands. For example if it is detected that the driver is asleep the system brings the vehicle safely to a stand-still. Whether the driver has fallen asleep can be detected by an Awareness Check.

Embodiments of the present invention are based on the Memory Prediction Framework (MPF) and include an artificial hierarchical memory system. The artificial hierarchical memory system can be enhanced Hierarchical Temporal Memory (HTM) with improved capabilities for scene recognition/"classification" and/or a preprocessing stage. The system and method have been adapted to be able, among others, to provide a number such as 10-15 samples or any suitable number of samples required for e.g. more or less than half a second) a prediction about input operator commands due to the introduction of temporal events management as well as the above-mentioned preprocessing stage.

The Memory Prediction Framework is appropriate as a fundamental model, as it foresees nearly all the structures and mechanisms necessary for good learning, abstraction and generalization, e.g. feed-forward and feed-back signal flows within the network, their correspondence as measure of the degree of understanding of the situation, which is a prerequisite for assessing the generalization capabilities of the network. The MPF computational approach and its learning algorithms have been proven to deal well with diverse sensory channels, although sensory-specific preprocessing is still required. Embodiments of the present invention may be seen as instantiations of suitable parts of the MPF.

The core of the above methods and systems is an Artificial memory System which will now be described.

In FIG. 1 an artificial memory system 100 for use with a computational machine for interacting with dynamic behaviours according to an embodiment of the present invention is shown. In this FIG. 101 is a sensor or sensors input, 104*b* is a predicted sensors output, 104*a* is a sensors feed-back output, 102 is a classification output, 107 is a context check,

106 is a reset input, and 105 is a controls input (predict, train, load memory, etc.). The links within the artificial memory system 100 are as follows: 211: Sensor input: this port receives all the raw sensors values coming from the physical Sensors; 214*a*: Sensor Feed-Back output: this port outputs all the converted raw sensor values reconstructed from the network. These values can be directly compared to physical sensors; 214*b*: Predicted sensors output: this output contains all the converted predicted raw sensor values. These values can be directly compared to physical sensors; 212: Sensor input converted to network: this output contains the sensors values in a format manageable by 220; 213*a*: Sensor Feed-Back: this input receives sensor values reconstructed by the network to be translated to physical sensor values; 213*b*: Sensor predicted: this input receives predicted sensor values generated by the network to be translated to physical sensor values; 221: Sensor Input to the Enhanced hierarchical Memory 220; 224*a*: Sensor Feedback output from the Enhanced hierarchical Memory 220; 224*b*: Sensor prediction output from the Enhanced hierarchical Memory 220; 225: Time Master control input. This input receives the scheduling information generated from the Time Master 230; 226: Reset input. This input receives a signal from the System Controlling Unit 260 to control the memory history reset of every level internal to 220; 227: Context Check output. This output aggregates the coherence check signals within 220; 228: Supervised Gating input. This input receives the specific control information to exploit gating and inter-level classification within the Enhanced hierarchical Memory 220; 229: Supervised Gating output. This output contains the inter-level classification results; 231: Time Master control output. Signals generated from the Time Master 230 module to schedule the execution of every component of 220; 235: Scheduling control signal coming from 260 to enable different high-level modalities of network execution (e.g.: normal, predictions, etc.) 245: Input for Context Check control signals coming from System Controlling Unit 260; 247: Output containing the coherence information for the whole Enhanced hierarchical Memory 220; 241: Context Check input: this signal contains all the coherence information coming from inside 220; 251: Supervised Gating output. This output contains the specific control information to exploit gating and inter-level classification within the Enhanced hierarchical Memory 220; 252: Supervised Gating input. This input contains the inter-level classification results coming from 220; 258: Input containing the control signals to enable different behavior of 250; 259: Output containing the classification results; 261: System Controlling Unit 260 control signals to be sent to the Time Master 230 (which converts a high level network behavior to a schedule of execution pattern for the Enhanced hierarchical Memory 220) and to the Context Check 240 (to select different modalities of asserting the coherence of the network) on different busses; 262: System Controlling Unit 260 output with raw classification output about the whole network; 263: System Controlling Unit 260 output with memory reset commands; 264: System Controlling Unit 260 input containing the coherence results of the network; 265: System Controlling Unit 260 input with network modalities commands (like predict, train, load, etc.); 266: System Controlling Unit 260 inputs with a system-reset command; 267: System Controlling Unit 260 output with raw coherence information about the whole network; 268: System Controlling Unit 260 output with control commands to manage inter-level classification, supervised classifiers, attentional-mechanisms of the networks.

The blocks within the enhanced hierarchical memory system as shown are as follows: 210: Physical I/O Layer. This module translates physical sensor inputs to a format manageable by the Enhanced hierarchical Memory 220, without modifying the information content, and vice-versa. 220: Enhanced hierarchical Memory; 230: Time Master. This module is an external server that masters the internal clock of every component of the Enhanced hierarchical Memory 220. It converts high level behavior (e.g. prediction) in a specific timing schedule and activation sequence of the network. 240: Context Check: this module provides a measure of the understandingness degree of the Enhanced hierarchical Memory 220 about its current sequence of Feed-Forward inputs 221; 250: Supervised Gating. This module translates commands from the System Controlling Unit 260 to enable specific sub-part of the Enhanced hierarchical Memory 220 to obtain attentional mechanisms or to obtain inter-level classification within the Enhanced hierarchical Memory 220 to recognize different temporal events; 260: System Control Unit. This module handles the communication among all the sub-modules of the Artificial Memory System in order to achieve high level function, satisfy user requests and tune the system parameters; 270: User Control I/O Layer. This module receives commands from the user interface and translates them to System Controlling Unit 260 commands.

The Time Master 230 can be considered the internal scheduler of the Artificial Memory System 100. It is controlled by the System Controlling Unit 260; when a certain high-level behavior is selected (e.g. classification, prediction, filtering, etc.), the Time Master 230 generates the best schedule of execution for each layer of the Enhanced hierarchical Memory 220. The Time Master tells every node whether to work in feed-forward, feedback or no-operation mode and whether to save, or restore, its internal status. The Time Master 230 may communicate to the nodes in two different ways:

1. MASTER MODE: Every node in the Enhanced hierarchical Memory 220, contacts the Time Master 220 (e.g. via socket) before execution to receive instructions on what to do. A node may receive a single instruction describing just the current time-step or a cumulative set of instructions.

2. BACKGROUND MODE: Every node registers itself with the Time Master 230 once and then the Time Master 230 contacts asynchronously all of them to set a different "execution cycle". It is possible to choose the best trade-off between these two modalities depending on the desired degree of functionalities of the system and the communication delay. The first mode allows to change the schedule only when nodes communicate to the Time Master 230: The longer the set of instruction sent, the longer the delay between behavior switch (e.g. from normal mode to prediction and vice-versa). Nevertheless this mode has a low communication overhead and it is very suitable for recurrent tasks. The second mode has a higher overhead because every node must have a server process continuously listening to Time Master 230 communications, but it would be able to act immediately upon a Time Master 230 command.

For every new input pattern the Artificial Memory System 100 needs several iterations to compute a classification or prediction, so the Time Master 230 must let the system run at an higher speed (Artificial Memory System clock) than the input data rate (World clock).

Through link 241 the Context Check module 240 receives the State Consistency Check signals (4*x*7) coming from all the nodes present inside the Enhanced hierarchical Memory 220. Based on control signals received through link 245 from the System Controlling Unit 260, it processes (subset of) consistency signals in order to provide via its output link 247 a measure of the current understanding degree the Enhanced hierarchical Memory 220 has about the sequence of inputs it is sensing via link 221. For example, the System Controlling Unit 260 can ask to evaluate the consistency of the enhanced hierarchical memory as a whole. This information could be useful to decide whether to ask the enhanced hierarchical memory to predict future inputs or not: There can be no point in asking for a prediction if the Enhanced hierarchical Memory 220 is not understanding what is going on. As another example, the System Controlling Unit 260 can ask to assess the consistency of the internal states of the Wired Memory level 310 only (see FIG. 2) in order to verify if user is promptly reacting to the external context. As a last example, the System Controlling Unit 260 can ask for the consistency of the internal states of the first level of the enhanced hierarchical memory 220. This information could be used by an external application to recognize sequences of inputs the Enhanced hierarchical Memory 220 has never seen before and does not know how to deal with them.

The System Control Unit 260 is the coordinating module of the system. Its main duty is to run the other modules in order to achieve the desired function of unit 260. For instance it receives commands from the User Control I/O Layer 270, like a request for prediction or a request of specific event classification, and it exploits Time Master 230, Context Check 240 and Supervised Gating 250 modules to control the Enhanced hierarchical Memory 220. This module supervises also the eventual training of the Enhanced hierarchical Memory 220 upon specific external request.

The Enhanced hierarchical Memory 220 is the core of the whole system. This is a bottom up architecture where patterns of information are pooled in an enhanced hierarchical structure, i.e. processing a noisy input space into an abstract and robust output space. Its principal purpose is to learn, recognize, understand and (e.g. upon request) predict sequences of input patterns. preferably it is also adapted to extract/infer meanings from a clear or not so clear context, like a cognitive system. To this aim, many memory levels 320 are employed and connected together in an enhanced hierarchical way. The number of such blocks 320 may vary depending on the particular application. Each memory block can be coupled with an Attentive Classifier 330 which can be useful to associate a meaning to the events learned by a particular level, or to implement attentive mechanisms for the Memory Level 320. Each level is identified by an index ranging from 1 to L. Usually the very first level (level 1) is composed by one Wired Memory Level block 310 and one Memory Level block 320. The wired level should be used to process "critical" mono-dimensional input signals for which a high level of reconstruction/prediction accuracy is needed. All other input signals can be routed to a normal Memory Level 320: these are usually signals coming from sensors which help to describe the current operative context but do not require to be reconstructed/predicted with a high accuracy.

Figure 2:
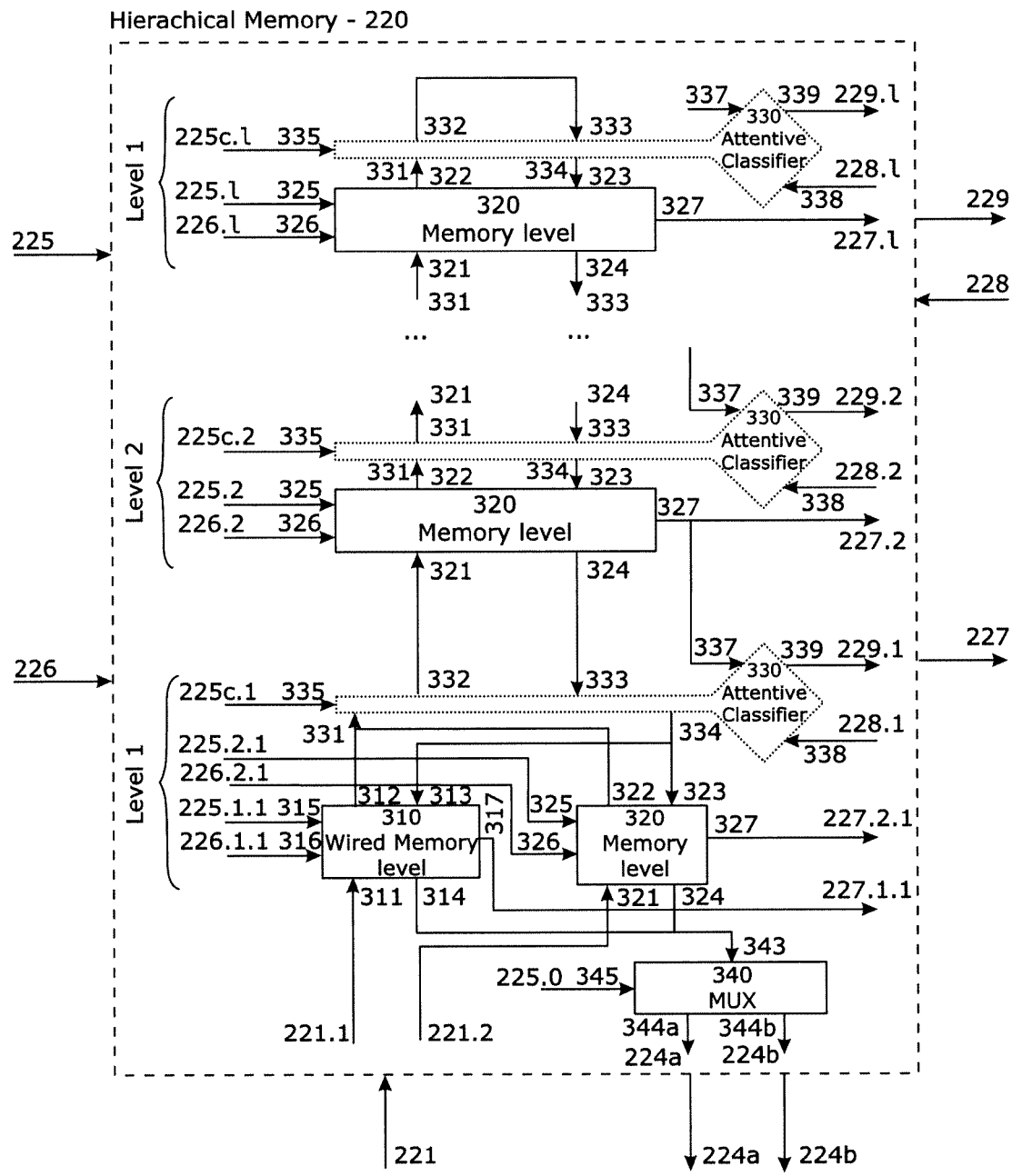
FIG. 2 shows the functional structure of a Enhanced hierarchical Memory as used in the inventive artificial memory system according to an embodiment.

FIG. 2 shows the functional structure of an Enhanced hierarchical Memory 220 as used in the inventive artificial memory system. The Multiplexer block 340 permits to make Feed-Back outputs and Predicted outputs available to the outside of the 220 block on separated output links. Based on the control signals 225.0, coming directly from the Time Master block 230, feed-back data are routed to link 224a via link 344a, while predicted data are routed to link 224b via link 344b. Link 343 collects feed-back/predicted outputs coming from block 310 and feed-back/predicted outputs coming from block 320 on a single multi-dimensional data array.

The links within the Enhanced hierarchical Memory 220 are as follows: 221: Feed-Forward inputs. This is a multi-dimensional data array. The set of signals to be processed by the Wired Memory Level 310 block is separated from other signals and routed through link 221.1. All the remaining signals are routed to the first Memory Level block 320 via link 221.2; 224a: Feed-Back outputs. This is a multi-dimensional data array; 224b: Predicted outputs. This is a multi-dimensional data array; 225: Controls signals. This is a multi-dimensional data array which comprises all the control signals to be provided to each internal block. Most subsets of these signals are labeled with 225:C:L where C=[1; c] specifies the index of the column to which a specific block belongs to (usually only for the first level), while L=[1; 2] identifies the index of the level. In particular subsets 225c:L provide control signals to all Attentive Classifier blocks 330 while subset 225:0 provides control signals to the Multiplexer block 340; 226: Reset signals. This is a multi-dimensional data array which comprises all reset signals to be provided to each memory level. Internal links are labeled with 226:C:L, or simply 226:L, where C=[1; c] specifies the index of the column to which the memory level sending the signal belongs to (usually only for the first level), while L=[0; 1] identifies the index of the level; 227: State Consistency Check signals. This is a multi-dimensional data array which collects all state consistency signals coming from each memory level inside the block. Internal links are labeled with 227:C:L, or simply 227:L, where C=[1; c] specifies the index of the column to which the memory level sending the signal belongs to (usually only for the first level), while L=[0; 1] identifies the index of the level; 228: Supervised Gating signals. This is a multi-dimensional data array which is split to internal 228.1, . . . , 228.1 links to bring gating signals to Attentive Classifier blocks 330 (when present); 229: Classification signals. This is a multi-dimensional data array which collects all classification signals coming from Attentive Classifier blocks 330 (when present) via 229.1, . . . , 229.1 links.

Figure 3:
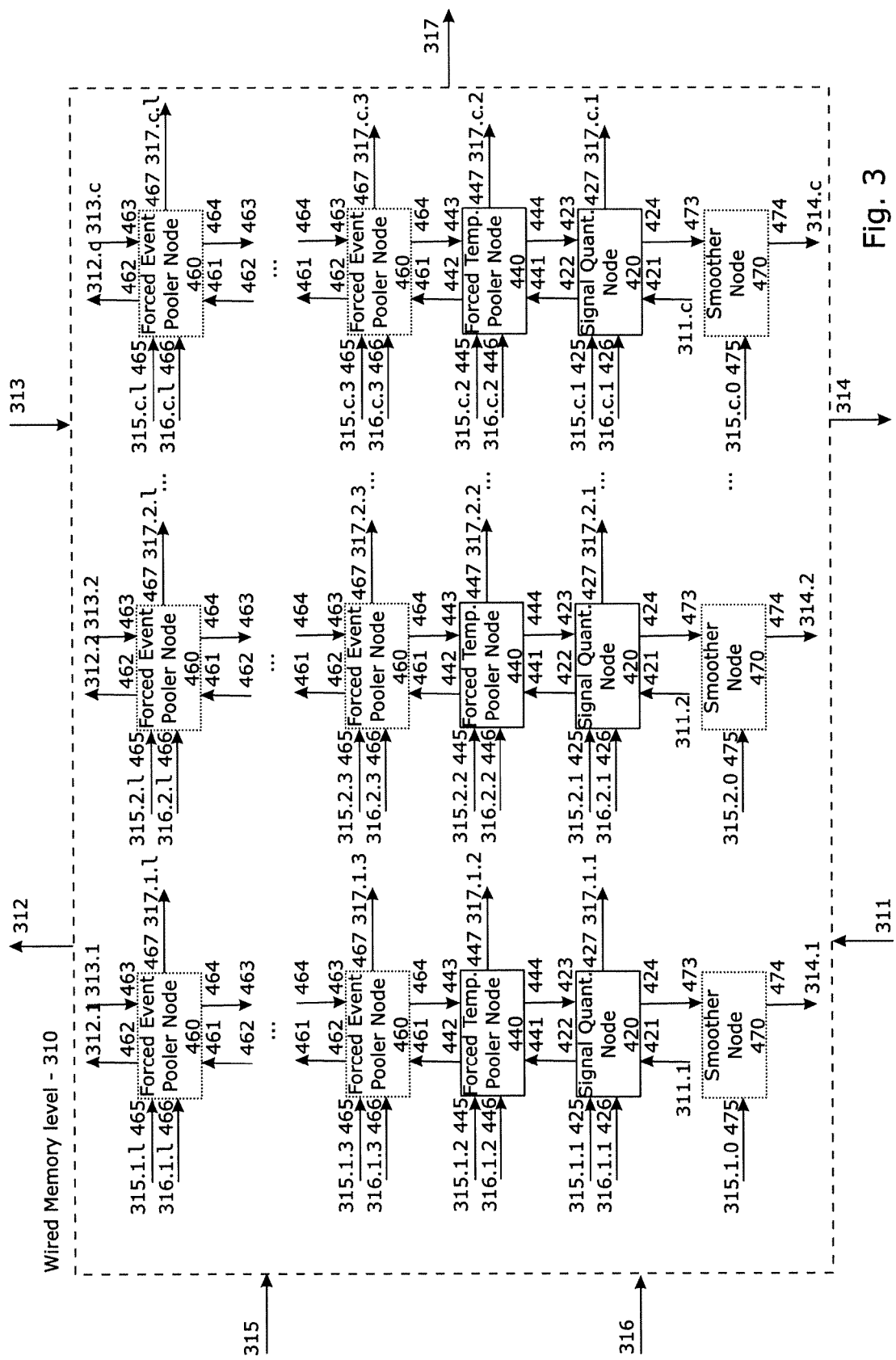
FIG. 3 shows the functional structure of a Wired Memory block as used in the inventive artificial memory system according to an embodiment.

FIG. 3 shows the functional structure of a Wired Memory block 310 as incorporated in the Enhanced hierarchical Memory 220. The Wired Memory Level block 310 encompasses a set of basic nodes organized in distinct columns. The total number of columns may vary depending on the number of input signals to be processed. Each column is identified by an index ranging from 1 to c. A column is usually composed by a Signal Quantizer (SQ) node 420 and a Forced Temporal Pooler (FTP) node 440. A Smoother (Sm) node 470 can be added on the Feedback output 424 of a column to better smooth the feed-back (or predicted) output signal. Moreover, in particular cases one (or more) Forced Event Pooler (FEP) node 460 can be added on top of a column. The aim of this block is to describe a certain number of mono-dimensional input signals in terms of "signal primitives". Each column works on a single mono-dimensional signal, hence c columns are needed to deal with c different mono-dimensional inputs. SQ nodes 420 permit to quantize mono-dimensional input signals (whose dynamics must be well known) in a controlled and very fast manner. Signal "primitives" (extracted by means of specific statistical algorithms from training data are "taught" to FTP and FEP nodes in order to be able to describe (during inference) input signals to parent memory levels in terms of frequently recurrent signal "chunks". The extraction of signal "primitives" from the raw data is a process needed to create the "memory content" of the wired levels. The output of this process is a set of sequences of input signal that the nodes must learn "as they are". These sequences must be descriptive of the events that the wired memory level must be able to describe. The sequences to be extracted are different in the case of a FTP 440 and a FEP 460.

A proposed extraction methodology for a FTP 440 is the following:

1. low pass filter: apply a low-pass filter to the raw input data in order to reduce spikes or sensor errors
2. quantize data: apply the same quantization process as the corresponding Signal Quantizer Node 420
3. split data into chunks: split the quantized data where the signal represent a stable condition (for example, but not limited to, a zero-crossing, a value sign inversion, a constant interval) ensuring that the length of chunks is enough to describe an event in the memory (for example, but not limited to, removing very short chunks)
4. compute chunks features: for each chunk compute a set of features that describe the signal properties. For example, but not limited to, value of start point, value of end point, length, average value, standard deviation of values, signal concavity.
5. calculate chunks distance: for each couple of chunks compute a distance measure that describe how similar they are in respect to each other. For example but not limited to a Pearson distance and an average distance between each point of the signals.
6. cluster chunks: apply a clustering algorithm to group together similar chunks based on both the chunk features and distances just computed. For example, but not limited to, by the means of a Hierarchical Clustering Algorithm.
7. extract prototypes: select the centroids of the clusters as the prototypes to be taught to the FTP 440 and save them as the training file.

The process of extracting primitives for the FEP 460 is similar. The main difference is in the selection of the split point in step (3). These primitives must be longer than the ones memorized by the corresponding FTP 440 because they should be a combination of them, so the selection of the split point should correspond to a longer event. For example, but not limited to, it may be defined by a set of rules over all the input signals or by an external trigger acquired during data acquisition. This mechanism permits to "compress" the description of long temporal sequences of mono-dimensional inputs. At the same time it permits to reconstruct the input signal with a very good accuracy and thus it allows for the application level to use reconstructed/predicted signals in place of the real ones (if needed). Sm nodes 470 (when present) filter the feed-back 424 output of a SQ node 420 in order to mask the quantization effect it introduces, hence providing a smoother output signal. Inside the general the Enhanced hierarchical Memory 220, block the Wired Memory Level block 310 can appear only at the very first level to process a set of "raw" mono-dimensional signals. In a different implementation this level may consider also multi-dimensional signals to be processed by each single wired column.

The links within the Wired Memory Level block 310 are as follows: 311: Feed-Forward (FF) inputs. This is a multi-dimensional data array. It comprises the FF inputs for all the memory level which are then internally routed to each single column. The mono-dimensional FF input for column 1 is separated from the others and routed to the correct node input via link 311.1. The mono-dimensional signal to be routed to column 2 flows through link 311.2, and so on up to link 311.c which brings the mono-dimensional FF input to the last column. Note that signals on link 311 can be routed to links 311.1, . . . , 311.c out of order; 312: Feed-Forward outputs. This is a multi-dimensional data array. It collects (possibly out of order) the (multi-dimensional) FF outputs coming from all columns (312.1, 312.2, . . . , 312.c) and makes them available to the outside of the block for parent memory levels; 313: Feed-Back (FB) inputs. This is a multi-dimensional data array which comprises all the FB inputs to be provided to the internal columns. Signals are split in subgroups 313.1, 313.2, . . . , 313.c to be routed to the corresponding column. Note that single inputs on link 313 can be grouped and routed to links 313.1, . . . , 313.c out of order; 314: Feed-Back outputs. This is a multi-dimensional data array. It collects (possibly out of order) the mono-dimensional FB outputs coming from all columns (314.1, . . . , 314.c) and makes them available to the outside of the block; 315: Control signals. This is a multi-dimensional data array which comprises all the control signals to be provided to each node inside the block. Internal subsets of these signals are labeled with 315:C:L where C=[1; c] specifies the index of the column to which a specific node belongs to, while L=[1; 2] identifies the index of the level; 316: Reset signals. This is a multi-dimensional data array which comprises all single reset signals to be provided to each node inside the block. Internal links are labeled with 316:C:L where C=[1; c] specifies the index of the column to which a specific node belongs to, while L=[0; l] identifies the index of the level; 317: State Consistency Check signals. This is a multi-dimensional data array which collects all state consistency signals coming from each node inside the block. Internal links are labeled with 317:C:L where C=[1; c] specifies the index of the column to which the node sending the signal belongs to, while L=[0; l] identifies the index of the level.

Figure 4:
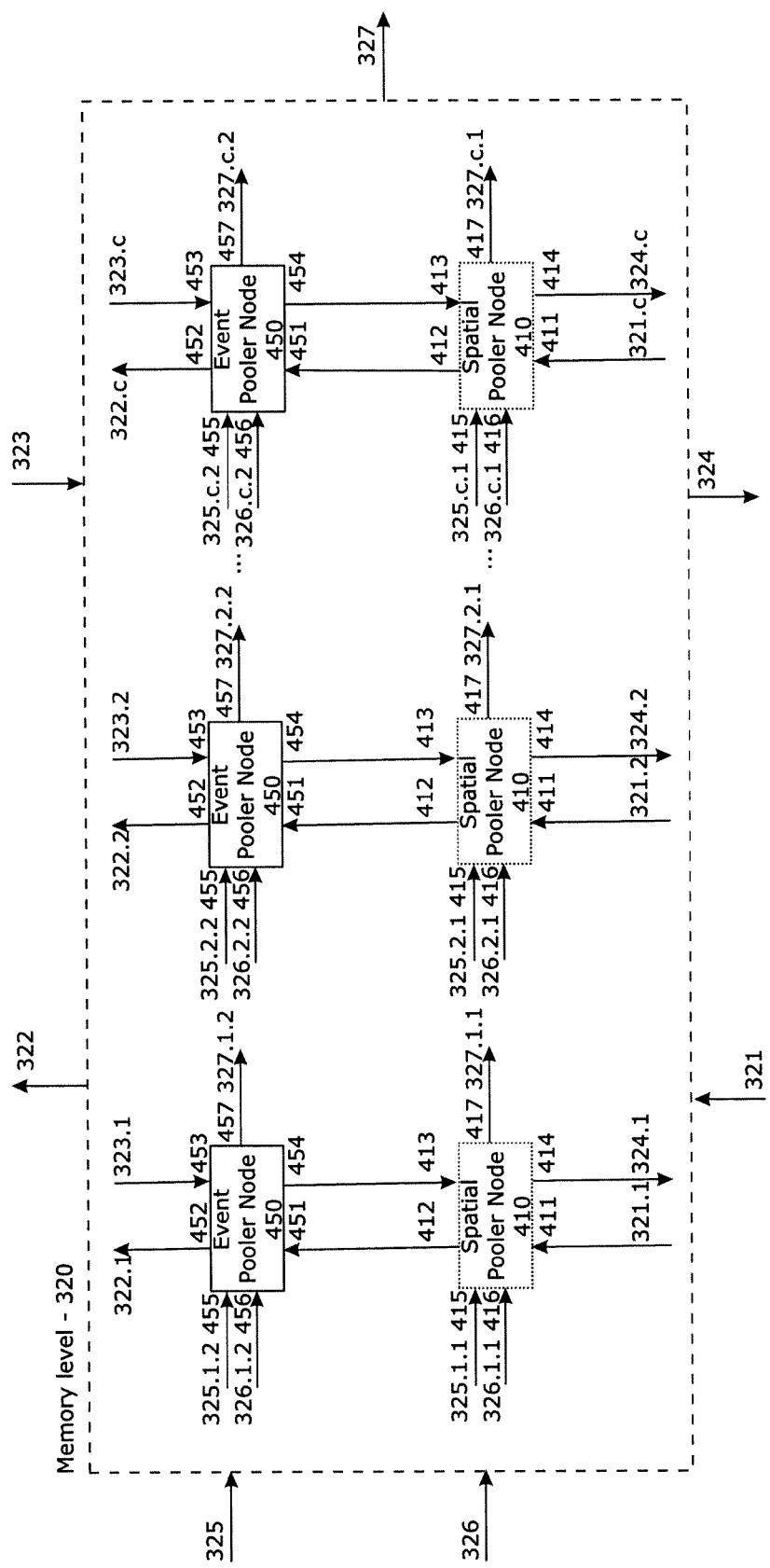
FIG. 4 shows the functional structure of a Memory Level block as used in the inventive artificial memory system according to an embodiment.

FIG. 4 shows the functional structure of a Memory Level block 320 as incorporated in the Enhanced hierarchical Memory 220. This block encompasses a set of basic nodes organized in distinct columns. The total number of columns may vary depending on the structure of the whole network. Each column is identified by an index ranging from 1 to c. A single column is usually composed by an Event Pooler (EP) node 450 which in some cases can have a Spatial Pooler (SP) node 410 as a child-node. The aim of this block is to learn (during training) and recognize (during inference) sequences of "coincidences" signaled by its child-memory level via its input link 321. It actually relies on the capability of the EP node 450 which is able to "record" (in a peculiar "compressed" manner) and "recognize" long-time events. It is also able to signal the current recognized event (or set of events) to its parent-memory level. Inside the general Enhanced hierarchical Memory block 220, there can be many Memory Level blocks 320 with single blocks learning and recognizing longer and longer (sequences of) events as moving from the bottom to the top of the hierarchy. The links within the Memory Level block 320 are as follows: 321: Feed-Forward (FF) inputs. This is a multi-dimensional data array. It comprises the FF inputs for all the memory level which are then internally routed to each single column. Specific FF inputs for column 1 are separated from the others and routed to the correct node input via link 321.1. Those to be routed to column 2 flow through link 321.2, and so on up to link 321.c which brings FF inputs to the last column. Note that single inputs on link 321 can be grouped and routed to links 321.1, . . . , 321.c out of order; 322:

Feed-Forward (FF) outputs. This is a multi-dimensional data array. It collects (possibly out of order) the FF outputs coming from all columns (322.1, 322.2, . . . , 322.c) and makes them available to the outside of the block for parent memory levels; 323: Feed-Back (FB) inputs. This is a multi-dimensional data array which comprises all the FB inputs to be provided to the internal columns. Signals are split in subgroups 323.1, 323.2, . . . , 323.c to be routed to the corresponding column. Note that single inputs on link 323 can be grouped and routed to links 323.1, . . . , 323.c out of order; 324: Feed-Back (FB) outputs. This is a multi-dimensional data array. It collects (possibly out of order) the FB outputs coming from all columns (324.1, . . . , 324.c) and makes them available to the outside of the block; 325: Control signals. This is a multi-dimensional data array which comprises all the control signals to be provided to each node inside the block. Internal subsets of these signals are labeled with 325:C:L where C=[1; c] specifies the index of the column to which a specific node belongs to, while L=[1; 2 . . . ] identifies the index of the level; 326: Reset signals. This is a multi-dimensional data array which comprises all single reset signals to be provided to each node inside the block. Internal links are labeled with 326:C:L where C=[1; c] specifies the index of the column to which a specific node belongs to, while L=[1; 2 . . . ] identifies the index of the level; 327: State Consistency Check signals. This is a multi-dimensional data array which collects all state consistency signals coming from each node inside the block. Internal links are labeled with 327:C:L where C=[1; c] specifies the index of the column to which the node sending the signal belongs to, while L=[1; 2 . . . ] identifies the index of the level.

Figure 5:
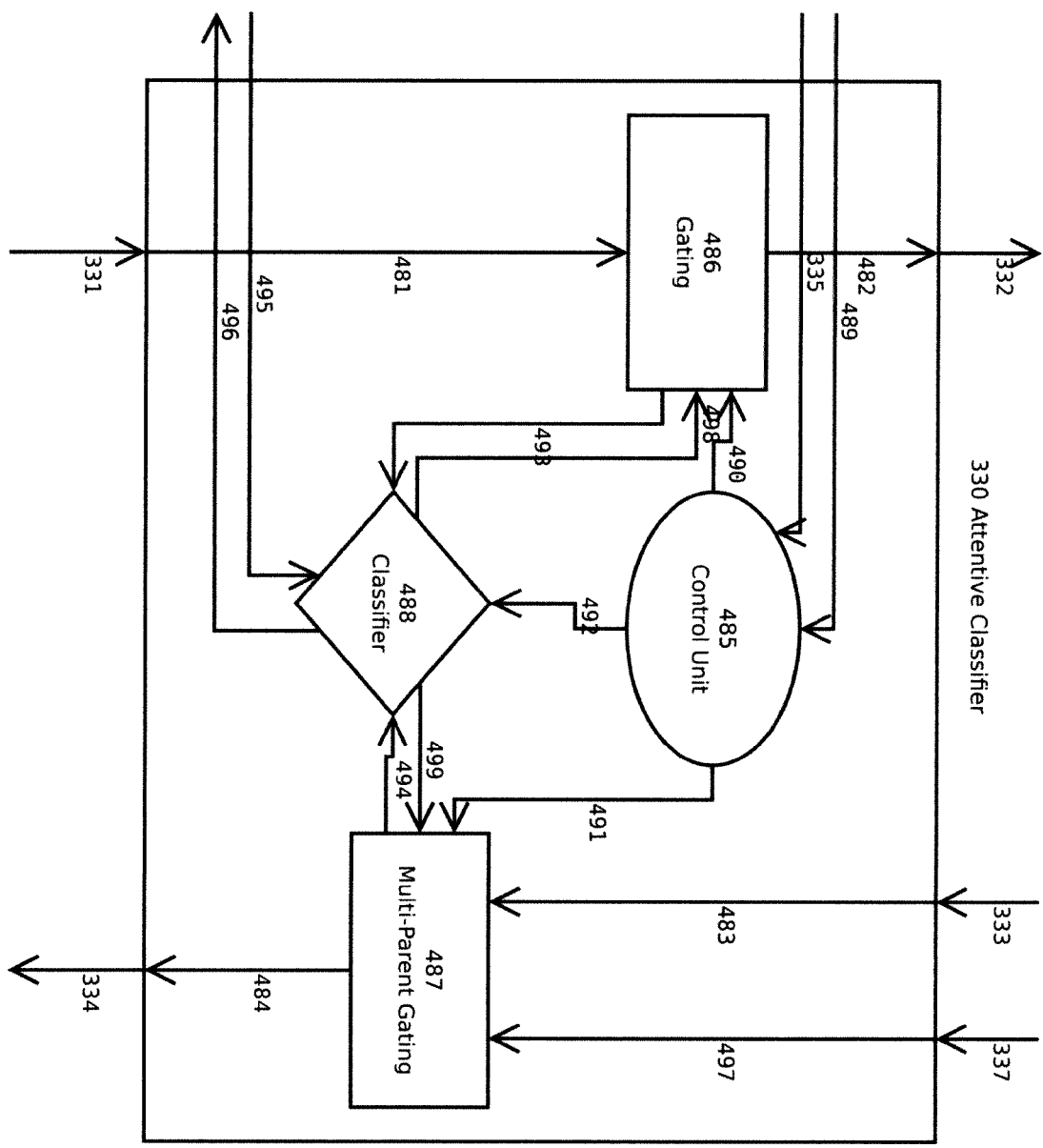
FIG. 5 shows the functional structure of an Attentive Classifier as used in the inventive artificial memory system according to an embodiment.

FIG. 5 shows the functional structure of an Attentive Classifier 330 as incorporated in the Enhanced hierarchical Memory 220. This module is optional and it is transparent in respect to the nearby levels 310, 320, 330. When not present, the signals flow directly from memory level to memory level. The level features are filter signal in order to implement Focus-of-Attention techniques in FF and FB, enable FB from multi-parents node with consistency check, and/or classify inter-levels signals to identify behavior at different time-scales. Attentive Classifier 330 is controlled by the Supervised Gating unit 250 (see FIG. 1) via connection 489. The execution is scheduled by the Time Master 230 via connection 335. During normal operation the Control Unit 485 sets the Gating 486 and the Multi-Parent Gating 487 to operate as pass-though. If FB input signal 333 belongs to different columns in the above memory level, the Multi-Parent Gating 487 exploits 497 to generate one univocal FB signal. For instance if may consider only the signal coming from consistent nodes. The Control Unit 485 may receive a command via 489 to enable classification. This command is sent to the Classifier 488. This Classifier 488 receives inputs from 486 or 487 and output a classification on 496. This process allows to identify a behavior at any level of the Enhanced hierarchical Memory 220. The Control Unit 485 may receive a command via 489 to enable supervised-gating of a specific class. This command is sent to 488 then to 486 and/or 487. The Classifier 488 enables the propagation of only a subset of signals in 486 and/or 487, corresponding to the desired classes specified via 495, via 498 and 499. This process allows to focus the attention of the Enhanced hierarchical Memory 220 on only a subset of possible behavior. In the Attentive Classifier 330 Control Unit 485 receives commands from the Supervised Gating Unit 250 via 489 and timing from the Time Master 230 via 489. This unit controls the whole module. Gating 486, if enabled, can acts as a gate by blocking a part of the signals and, if enabled, it can forward the FF input signals 481 to the classifier. Multi-Parent-Gating 487, if enabled, can act as a gate by blocking a part of the signals and, if enabled, it can forward the FB input signals 483 to the classifier 488. In case of multi-parent the Context Check 497 is analyzed to discard the non-consistent FB signals.

The links within the Attentive Classifier 330 are as follows: 331: multi-dimensional (multi-dim) input FF signals; 332: (multi-dim) output FF signals; 333: (multi-dim) input FB signals; 334: (multi-dim) output FB signals; 335: Time Master input; 337: (multi-dim) Context Check 327.* composed by all the Context Check links from the connected nodes of the level above; 481: (multi-dim) 331 inside the module; 482: (multi-dim) output of the Gating 486, it is a FF signal. When in pass-through mode is 481 or when gated it is a subset of it, even empty; 483: (multi-dim) 333 inside the node; 484: (multi-dim) output of the Multi-Patent-Gating 487, it is a FB signal. When in pass-through mode is 483 or when gated it is a subset of it, even empty; 489: input from the Supervised Gating 250, controls gating and classification; 490: enable gating and enable signal forward to Classifier 488; 491: enable gating, enable signal forward to Classifier 488, enable multi-parent selector; 492: enable classifier execution mode (select or exclude), enable training; 493: (multi-dim) FF signals forwarded to Classifier 488; 494: (multi-dim) FB signals forwarded to Classifier 488; 495: classes selection from the Supervised Gating 250 (see FIG. 1); 496: classification output to the Supervised Gating 250; 497: (multi-dim) 337 inside the module; 498: FF selective-class gating; 499: FB selective-class gating.

Figure 6:
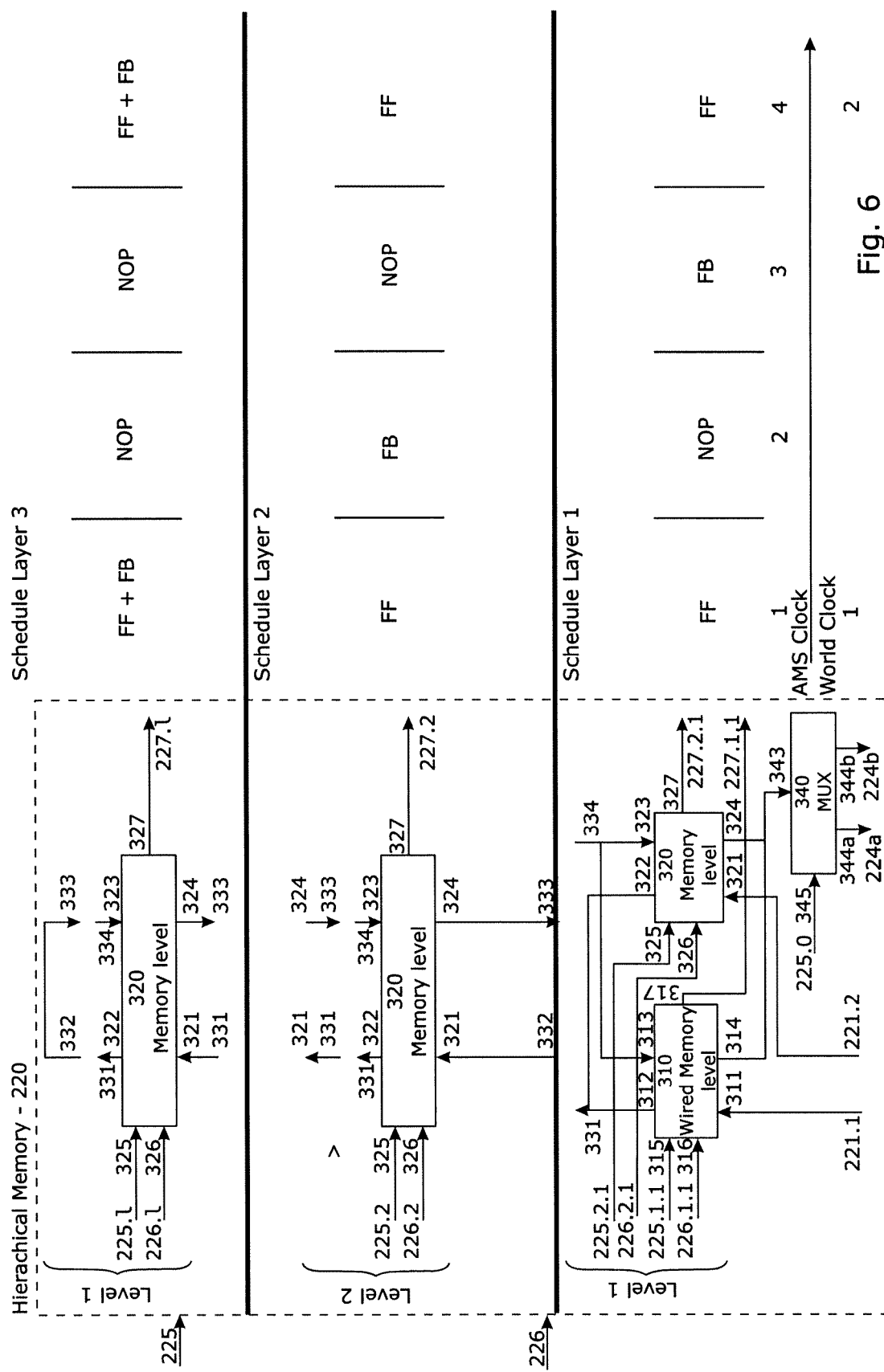
FIG. 6 depicts a standard schedule of execution per layer with no prediction in an artificial memory system according to an embodiment of the present invention.

FIG. 6 depicts a standard schedule of execution per layer with no prediction in an artificial memory system according to the invention. The execution schedule for each level of a three level network in inference mode (with feedback and feed-forward signals enabled) is shown. The left side of FIG. 6 represents a possible network while the right side contains the Time Master 230 commands that every level receives time step after time step. In the lower part of the figure there is the time-line.

Figure 7:
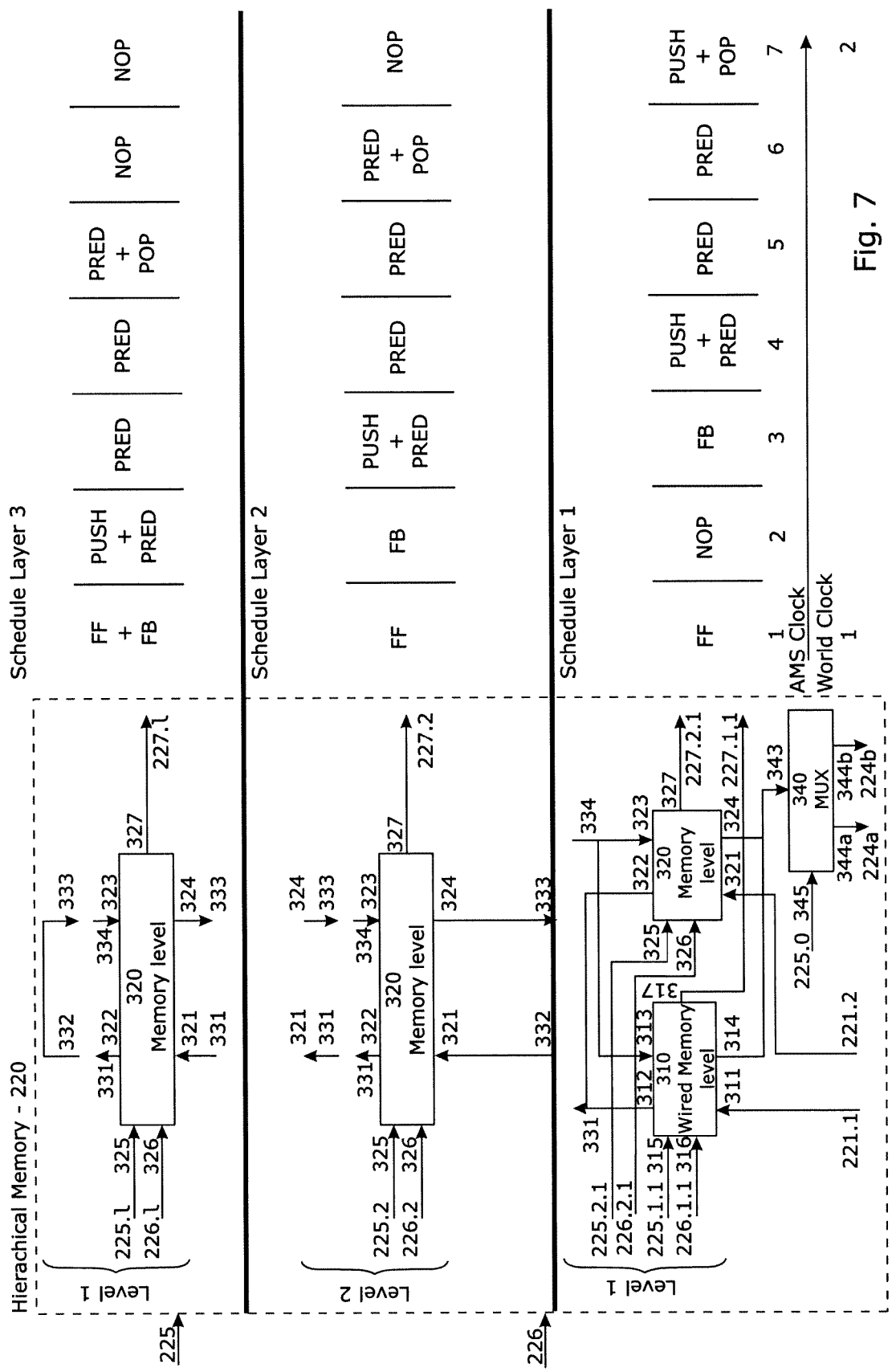
FIG. 7 depicts a schedule of execution per layer with 4 steps of prediction in an artificial memory system according to an embodiment of the present invention.

FIG. 7 depicts a schedule of execution per layer with 4 steps of prediction in an Artificial Memory System 100 according to the invention. The execution schedule to achieve a prediction of 4 time-steps ahead is shown. As one can notice, to generate a prediction of 4 steps ahead, 7 Artificial Memory steps are needed. The number of Artificial Memory System steps needed linearly increase with the prediction step requested.

Figure 8:
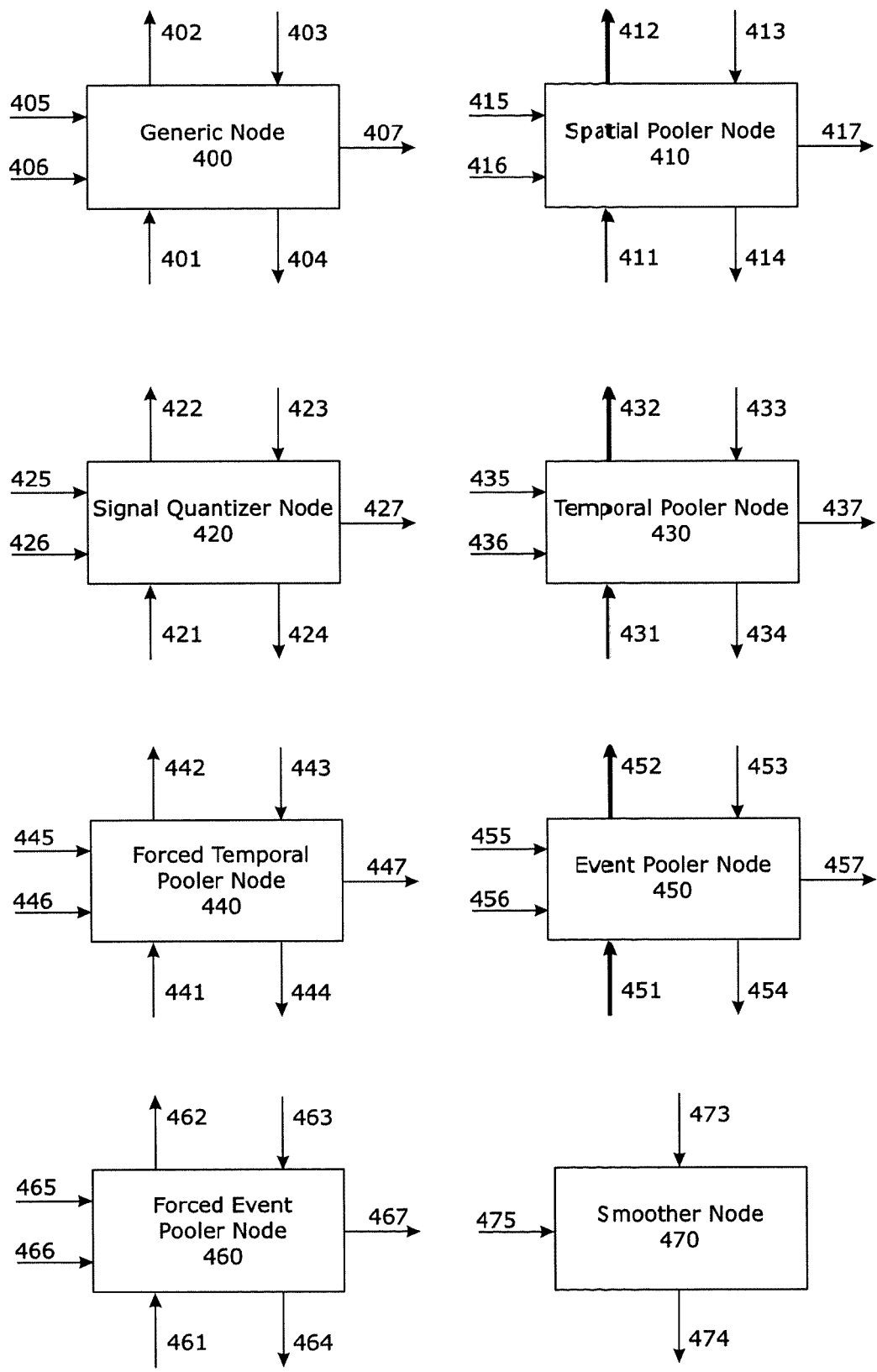
FIG. 8 shows the functional structure of a Basic Network node as used in an artificial memory system according to an embodiment of the present invention.

FIG. 8 shows the connection structure of a Basic Network node as used in an artificial memory system 100 according to the invention. Basic Network nodes can be, for example, any of a Spatial Pooler Node (SP) 410, a Signal Quantizer Node (SQ) 420, a Temporal Pooler Node (TP) 430, a Forced Temporal Pooler Node (FTP) 440, an Event Pooler Node (EP) 450, a Forced Event Pooler Node (FEP) 460, and a Smoother Node (Sm) 470. With respect to the links, at this level of description, all nodes have I/Os which share the same meaning. In the following list the character "x" can be substituted by any digit. This means, e.g., that "4x1" stands, at the same time, for 411, 421, 431, 441, 451, 461, etc.

The links are as follows:

4x1: Feed-Forward input. This is generally a multi-dimensional data array, but for the SQ node which takes as input only mono-dimensional signals;

4x2: Feed-Forward (FF) output. This is generally a multi-dimensional data array;

4x3: Feed-Back (FB) input. This is generally a multi-dimensional data array;

4x4: Feed-Back (FB) output. This is generally a multi-dimensional data array, but for the SQ node which outputs only mono-dimensional signal. The values outputted through this link can be feed-back signals as well as predicted signal, depending on the operation triggered by the Time Master through the links 4x5;

4x5: Control signals. The Time Master module (230) controls/triggers the internal functioning of the node through this link. Time after time the node can be asked to update, e.g., only its feed-forward internal state, or to switch to the training mode, or output some predicted data, etc.;

4x6: Reset signal. See detailed description of each particular node above;

4x7: State Consistency Check signals. Via this link the node communicates whether its FB input signal (4x3), is somehow coherent/consistent with its FF output signal (4x2). It represents a measure of its understandingness degree about the current "situation".

The Spatial Pooler node (SP) 410 with its feed-back computational path differs from the known Numenta implementation (among other things) in at least an added support for the Time Master 230. In its general behavior it takes multi-dimensional inputs, discovers recurrent spatial relations among the inputs, and it samples and/or quantizes the input space. During the learning mode of the Artificial Memory System 100 it stores coincidences and/or occurrences (up to maxCoincN), and adds a new coincidence if its distance from the stored ones is ≥maxDist. The distance measurement may be Euclidean or any other suitable distance measurement. In the inference mode (feed forward), it computes the distance from the current input and all the stored coincidences providing as a FF output signal a probability distribution over the learned coincidences. At the same time, obviously, it signals which is the learned coincidence which is more similar to the current input. In the inference Mode (feed-back), the index of the winner coincidence is determined looking for the highest activation value inside the FB input signal. The corresponding coincidence value is then retrieved from the internal memory and copied into the FB output signal. It can be possible, for future modifications, to compute the FB output signal in a different way, e.g. calculating a weighted mean of all activated coincidences by using the activation values as weights. This could permit to obtain feed-back values which can be different from those of learned coincidences.

Figure 9:
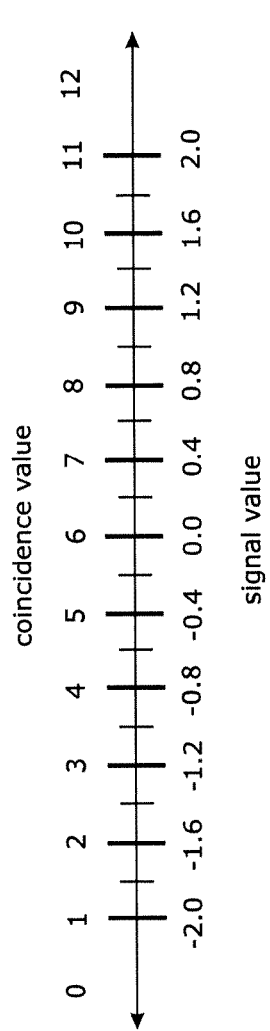
FIG. 9 shows the quantization mechanism for the Signal Quantizer node according to an embodiment of the present invention.

FIG. 9 shows Quantization mechanism for the Signal Quantizer node 420. In the shown example it is supposed that the input signal ranges in [−2:0; 2:0] and the pre-set number of coincidences is 13. The Signal Quantizer node (SQ) 420 is not known from the Numenta implementation. Its aim is somehow similar to the Spatial Pooler's one, but it is designed to deal with mono-dimensional input signals in a more effective way. It is a completely new node, specialized for dealing with known-range 1D sensor data. It uses statically pre-defined coincidences within a specified input range in order to provide full control over quantization centers/levels and thus to achieve a better quality for the feed-back output. The node's parameters are maxCoincidenceCount: pre-defined number of desired coincidences; minInputValue: lower limit for the input range; maxInputValue: upper limit for the input range; sigma: sigma value of the Gaussian used for FF output signal computation; minOutputValue: minimum output value for a single FF output element. Lower activation values are zeroed (both for keeping the FF output signal "clean" and to shorten the execution time). While there is no learning phase needed for this node 420, since once all the parameters of the node are set, nothing else is needed by the node for its function, on the other hand in the interference mode (feed-forward) the specified input range is uniformly quantized based on the pre-set number of desired coincidences. Actually, the first and the last coincidences are special. They are activated when the input value falls outside the specified range. In this case, once computed the distance between contiguous quantization centers, the computation of the index of the winning coincidence is straight forward. In future and further specialization of this node, a non-linear quantization of the input range is also envisioned: this can provide advantages, e.g., for signals which needs a finer quantization in a particular sub-interval of their range. The following listing is an example of how to compute the index of the winning coincidence:

```
minInputValue__ //lower limit for the input range
maxInputValue__ //upper limit for the input range
maxCoincidenceCount__ //pre-defined number of coincidences
inputValue //current (raw) input value
coincidenceID //FFoutput value to parent node
distance__    =    (maxInputValue__   −
minInputValue__)    / (maxCoincidenceCount__ − 3);
if (inputValue > maxInputValue__)
    coincidenceID = maxCoincidenceCount__ −1;
else if (inputValue < minInputValue__)
    coincidenceID = 0;
else
    coincidenceID = (int) rint( (inputValue − minInputValue__) /
distance__) + 1.
```

A benefit of the Signal Quantizer node 420 is a pre-defined coincidence which allows quantization error minimization, a faster execution due to no need for calculating distances from all coincidences, and a coincidences index which is directly proportional to the raw signal value, which in turn is useful for prediction.

Figure 10:
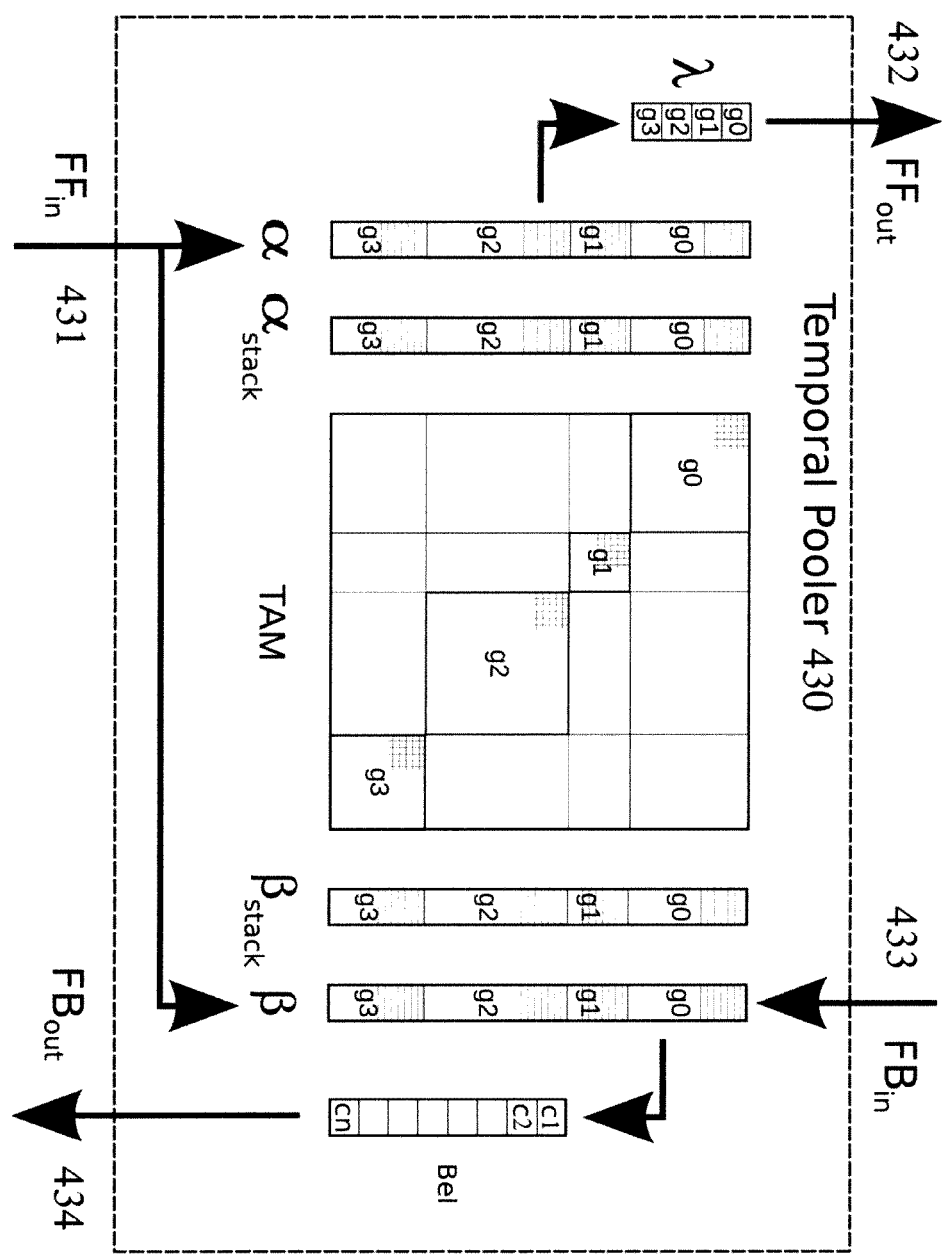
FIG. 10 shows the internal data structure for a Temporal Pooler node as used in Basic Network node according to an embodiment of the present invention.

FIG. 10 shows the internal data structure for a Temporal Pooler node 430 as used in a Basic Network node. In difference to the Numenta implementation, the Temporal Pooler node as used in this invention with its feed-back computation path adds a special mechanism to re-define the meaning of the reset signal (e.g. Markers) for better splitting and the Time Master support and a stack for saving node internal status for prediction. It takes multi-dimensional inputs (coincidences space), and discovers temporal relations among input sequences. During the learning mode, the Temporal Pooler node 430 is probably better described as a finite state machine (FSM) having each internal state mapped to a single input coincidence. A state transition table is also maintained to be able to specify different destination states (based on the current state) for the same input coincidence. At every new input it updates a time adjacency matrix (TAM) incrementing a counter for the transition "previous state→current state". The reset input 435 permits (when active) to skip marking a transition. This can be used to better highlight the beginning/end of a particular input sequence preventing it to appear connected to other sequences in the final TAM.

Figure 11:
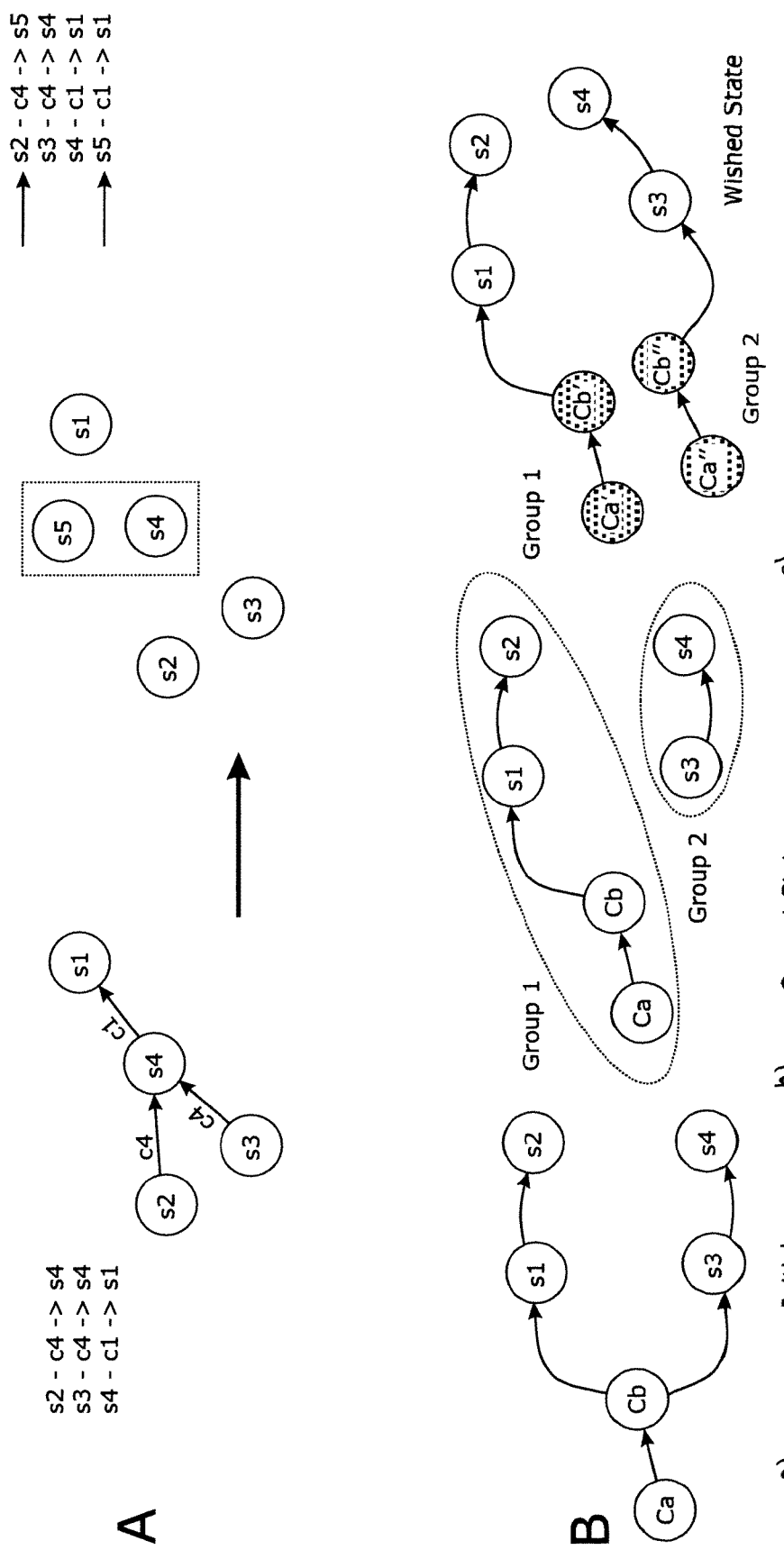
FIG. 11a depicts the splitting mechanism for a Temporal Pooler node according to an embodiment of the present invention.
FIG. 11b graphically depicts a possible problem arising from grouping.

It is possible to ask the node to periodically check for the presence of highly interconnected states triggering a splitting mechanism (see FIG. 11a). Splitting states permits to separate different sequences which shares some (sub-sequence of) input coincidences hence helping the grouping algorithm to identify different sequences as different groups. After each splitting attempt the TAM is reset because of the possible introduction of new internal states. Even if the splitting mechanism is used, it is impossible to separate two different chains which share their beginning part. For this reason when it comes to grouping the situation depicted in FIG. 11b is very likely to happen. To better grasp this problem, thinking about two different songs which start the very same way before taking different "directions" can help: it should be possible to identify both the two songs as possible candidates from the very beginning excluding the wrong one as soon as possible. What is described in FIG. 11b is very different. From the very beginning only one out of the two songs can be identified (as the only possible candidate) while only after the differentiation it is possible to discover the correct song was another one. Issues with grouping are: a) two separate sequences/events which share their beginning part; b) Possible groups resulting from current grouping algorithms; c) wished groups with completely separated chains.

FIG. 12 graphically depicts a splitting mechanism in a Temporal Pooler node using markers. In order to better separate overlapping chains we introduced a new mechanism which permits to use the Reset signal 435 in a new way. Many different reset commands can now be specified setting different values on the reset input channel. Each reset value is associated to a different marker. A marker is an internal state of the node which is not mapped to any coincidence. In this particular learning mode, the transition "marker x→current state" (instead of "previous state→current state") is marked every time the reset signal x is received to signal the beginning of a relevant event. This leads to the situation depicted in FIG. 12. If two different events share their initial part of the input sequence (FIG. 12a) but get marked with two different markers (FIG. 12b), the splitting algorithm can completely separate the two chains permitting the grouping algorithm to correctly form, once markers are discarded, two separated groups (FIG. 12c). In the post-learning phase, the very next step after the learning phase is the so called "grouping". Its purpose is to discover groups of internal states which should describe the most frequent (distinct) input sequences saw during training. To this aim, the TAM is used as a connection graph from which highly connected states are to be extracted and grouped together. A single group is hence a set of (internal) states which comes with its own sub-TAM specifying how these states are connected. A group can also be seen as a Markov chain. There are different algorithms to be possibly used for this phase: hierarchical grouping, growing, etc. In the inference mode (feed-forward), the TP node tries to figure out to which group the current input sequence belongs to, actually providing a probability distribution over groups. The $FF_{output}$ 432 provides a probability distribution over the learned groups. Referring to FIG. 10, every time the Time Master 230 asks the node to update its FF path the following computations are performed. The feed-forward internal state α is updated with $$\alpha_{tmp} = TAM\ \alpha$$

$$\alpha(i) = \alpha_{tmp}(i) FF_{in}(C(*i)), i \in [1, n_s]$$

where $n_s$ is the number of TAM's internal states and C is a function that maps each state to its corresponding coincidence index. Then the activation value for each group is computed as the maximum activation value among its states with $$\lambda(i) = \max_{j \in g_i} \alpha(j), i \in [1, n_g]$$

where $n_g$ is the number of groups learned by the node during the learning phase. Finally $$FF_{out} = \lambda$$

In the inference mode (feed-back), the inference mechanism employed for the feed-forward path is extended to use the $FB_{input}$ 433 to further filter the probability distribution computed for the internal states. The $FB_{output}$ 434 provides a probability distribution over the input coincidences. Referring to FIG. 10, every time the Time Master 230 asks the node to update its FB path the following computations are performed. The feed-back internal state (β) is updated with $$\beta_{tmp} = TAM\ \beta$$

$$\beta(i)\beta_{tmp}(i) FF_{in}(C(i)) FB_{in}(G(i)), i \in [1, n_s]$$

where $n_s$ is the number of TAM's internal states, C is a function that maps each state to its corresponding coincidence index and G is a function that maps each state to the index of the group it belongs to. Then the activation value for each coincidence is computed taking the sum of all TAM's internal states mapped to that coincidence with $$Bel(i) = \sum_{j \in [1, n_s] G(j) = i} \beta(j), i \in [1, n_c]$$

where $n_c$ is the number of input coincidences ($FF_{in}$ dimension). Finally $$FB_{out} = Bel$$

Figure 13:
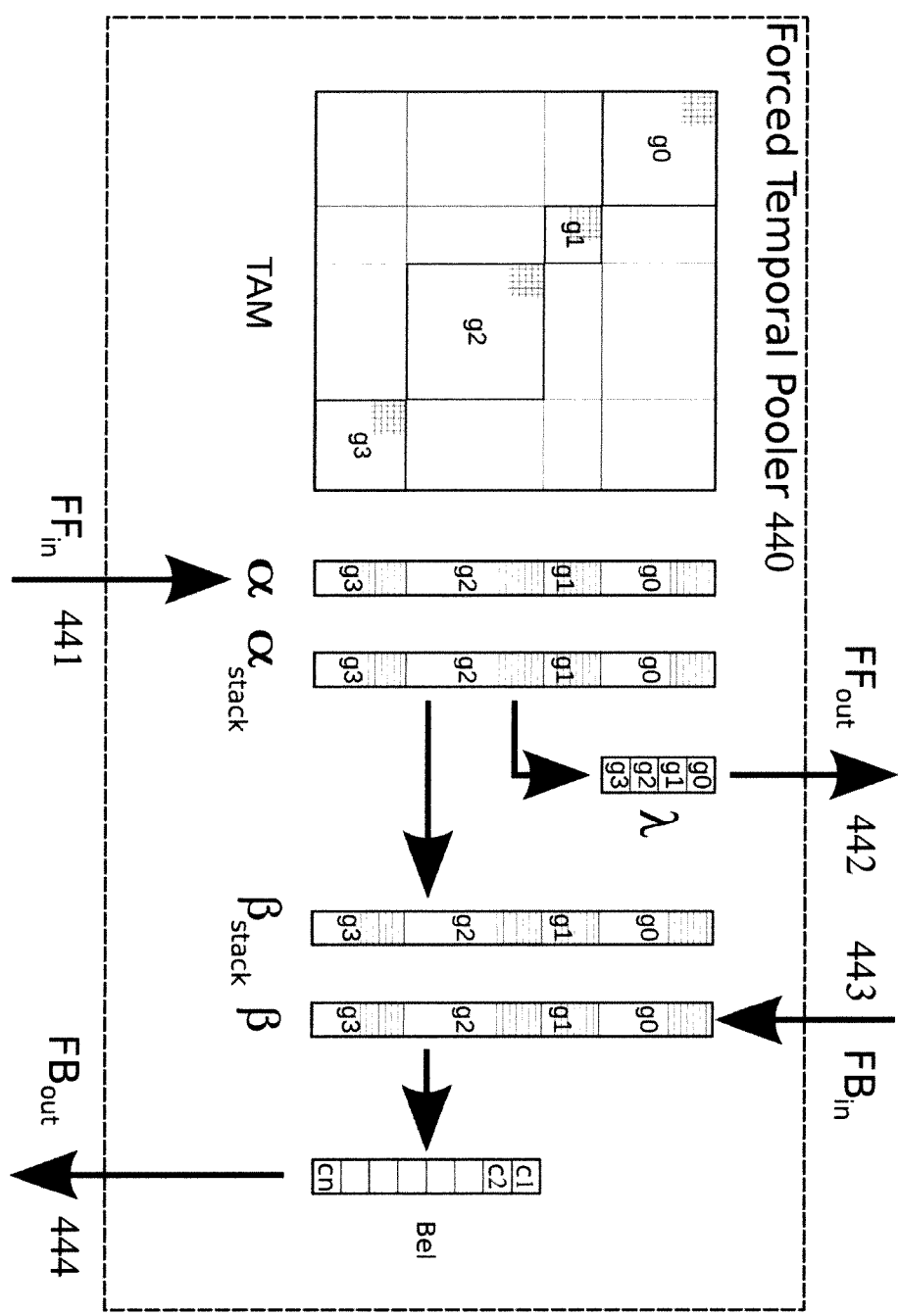
FIG. 13 shows the internal data structure for a Forced Temporal Pooler node according to an embodiment of the present invention.

FIG. 13 shows the internal data structure for a Forced Temporal Pooler node 440. In difference to the Numenta's implementation, this node is a variant to the normal Temporal Pooler node 430. A "forced learning" mode was added in order to be able to directly "teach" different input sequences as different groups (e.g. signal's primitives) to the node. The inference process was also modified (adding a "forced inference" mode) to make the $FF_{out}$ more stable and better following groups/primitives. Here, provided primitives/groups/sequences are learned "as is" by the node, and internal states (and their sequences) are imposed "by hands". Further, groups and their sizes result exactly as expected, and there is no need for complex grouping or splitting operations.

In the learning mode, at every new input, a new internal state is created for the TAM. This new state is mapped onto the current input coincidence and, if the reset signal is not active, a transition from the previous state is added to the internal transition table and marked into the TAM. This way there is no need for a splitting algorithm. At the same time, the grouping is very simple and straight-forward: every state can have only one predecessor as well as only one successor and different chains are kept separated by means of reset signals.

In the inference mode (feed-forward), this "Forced Infer" is completely different from the original one used inside the Temporal Pooler node 430. Since the aim here is to follow/signal as few groups as possible, keeping at the same time the $FF_{output}$ as clean and stable as possible, time after time only a subset of groups (Active Groups, Ag) are kept updated. States belonging to all other groups are kept non-activated (activation values set to zero). This approach permits "multiple-activations" which means that this kind of node can signal more than one group equally probable at the same time. At every time-step, for each active group, the next expected coincidence is checked for activation into the $FF_{input}$ and the activation value for the next state is computed as follows:

$$\alpha(i) = \begin{cases} \alpha(a_s) FF_{in}(C(N(a_s))) & i : i = N(a_s), \forall\, a_s \in A_s : G(a_s) \in A_g \\ 0 & \text{otherwise} \end{cases}$$

where C is a function that maps each state to its corresponding coincidence index, N is a function which returns the following state inside the groups its argument belongs to, G is a function that maps each state to the index of the group it belongs to, as is the current state (the one with the highest activation value) of a particular group, As is the set of all active states and Ag is a set containing only the active groups.

At the same time the activation values for all groups are updated as follows:

$$\lambda(i) = \begin{cases} \alpha(a_s) & \text{if } i = G(a_s),\, \bar{a}_s \in A_g \\ 0 & \text{otherwise} \end{cases},\, i \in [1, n_g]$$

(where $n_g$ is the number of groups learned by the node during the learning phase and G is a function that maps each state to the index of the group it belongs to) for newly computed as and Ag. Every time the activation value of an active group drops to zero, the group is removed from the set Ag. Every time the set Ag results empty, a new "ballot" is performed to choose the new set of possibly active groups. To this aim only groups containing a state which is mapped to the current input coincidence are considered and a different vote is assigned to different groups based on the distance between this state and the beginning of the group chain. This way it is more likely that a group is followed from its beginning and not randomly picked-up near its end providing a much more stable $FF_{output}$.

In the inference mode (feed-back), The $FB_{output}$ 444 provides a probability distribution over the input coincidences. Referring to FIG. 13, every time the Time Master 230 asks the node to update its FB path the following computations are performed. To update the feed-back internal state ($\beta$) the intersection between $FF_{output}$ and $FB_{input}$ is computed. If there is some match (i.e., the intersection is not empty) a winner group is chosen among the ones resulting from the intersection. Otherwise, based on the functioning mode chosen via the control signals 445, the node can choose the winner group from the $FF_{output}$, only, or from the $FB_{input}$, only. Once the winner group $w_g$ has been chosen the activation values of its states are copied from $\alpha$ to $\beta$ with $$\beta(i) = \alpha(i),\, i \in [1, n_s] \wedge G(i) = w_g$$

where $n_s$ is the number of TAM's internal states and G is a function that maps each state to the index of the group it belongs to. Then inside the Bel state only the coincidence $w_c$ corresponding to the state having the highest activation value $w_s$ is marked:

$$w_s = i : \beta(i) \,\dot{\iota}\, \max_{j \in [1, n_s]} \beta(j)$$

$$w_c = C(w_s)$$

$$Bel(w_c) = 1$$

where $n_s$ is the number of TAM's internal states and C is a function that maps each state to its corresponding coincidence index. Finally $$FB_{out} = Bel$$

The benefits of the Forced Temporal Pooler 440 are an easier/shorter training, much more stable FF inference ($FF_{out}$), it can be used to recognize signal's primitives when used inside a Wired Memory Level 310, and it is very well suitable as an Event Pooler's child node.

Figure 14:
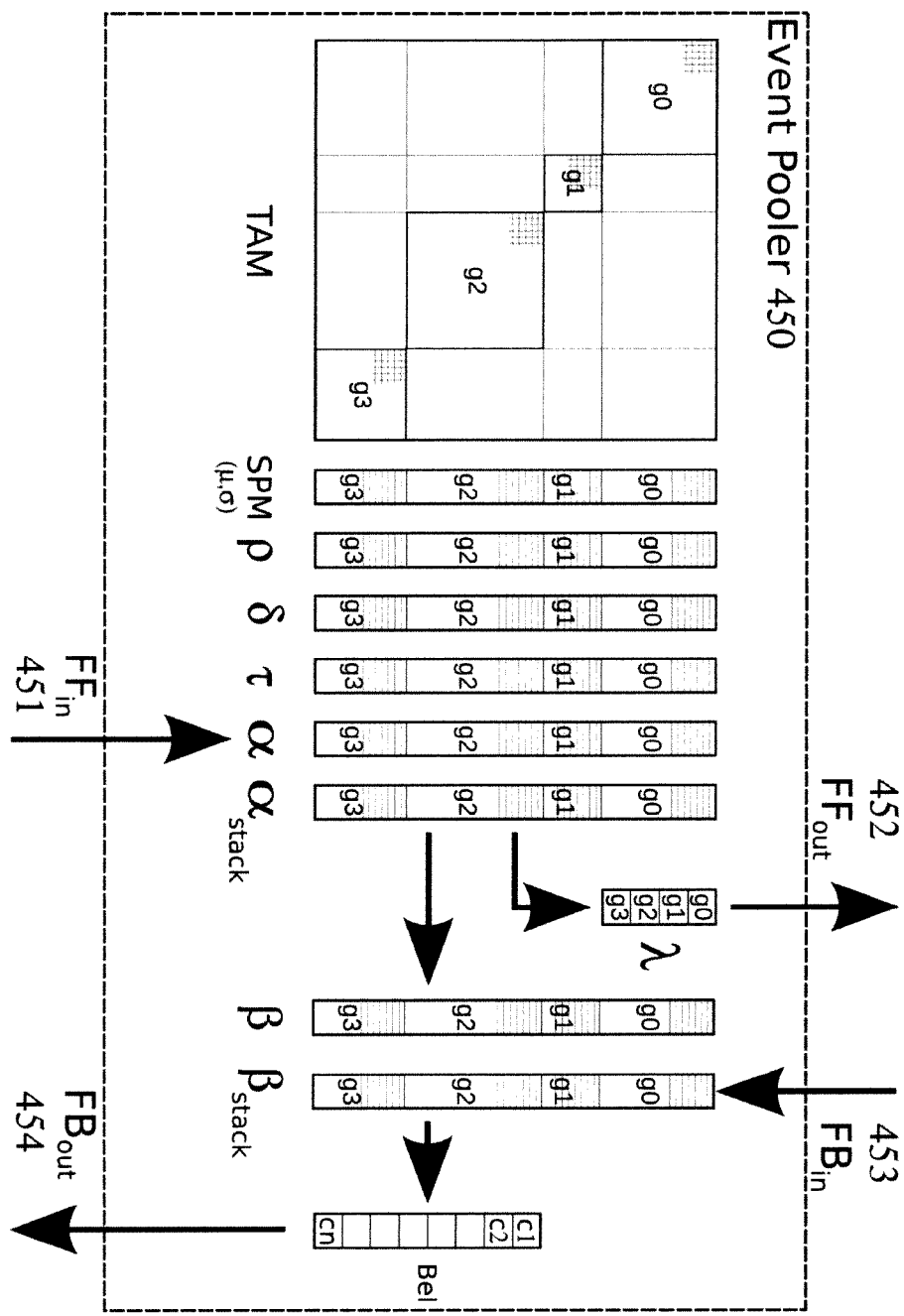
FIG. 14 shows the internal data structure for an Event Pooler node according to an embodiment of the present invention.
Figure 15:
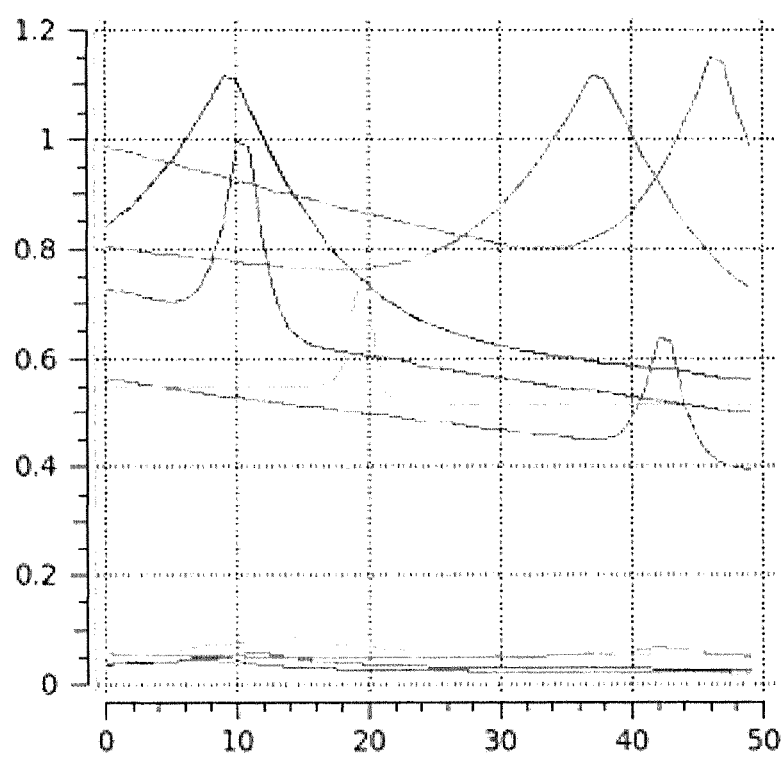
FIG. 15 shows an example of possible trends of activation values for groups sharing the same coincidence while that coincidence is seen as input.

FIG. 14 shows the internal data structure for an Event Pooler node 450. Here, $c_i$ represents an input coincidence, $s_i$ represents an internal state (many states, possibly belonging to different groups, can be mapped to the same coincidence); $g_i$ represents a group composed by many states $s_j$ each one mapped to a single input coincidence $c_k$. Each state belongs (exclusively) to only one group; $\alpha$ contains the current feed-forward internal state; $\alpha_{stack}$ is a memory stack used to save and restore state $\alpha$ (mainly used for prediction purposes); $\alpha_i$ contains the feed-forward activation value for state $s_i$; ß contains the current feed-back internal state; $ß_{stack}$ is a memory stack used to save and restore state ß (mainly used for prediction purposes); $ß_i$ contains the feed-back activation value for state $s_i$. A new data structure, the State Permanence Matrix (SPM) is used to store permanence statistics for each internal state determined during the learning phase; $SPM_i$ contains the average permanence $\mu_i$ determined for state $s_i$ as well as its relative standard deviation $\sigma_i$; $\rho$ contains the "coincidence to group" probability; $\rho_i$ represents the probability that the coincidence $c_j$ (to which the state si is mapped) refers to group $g_r$ (containing $s_i$) when seen as input (statistics are collected during learning provided that other states belonging to other groups can be mapped to the same coincidence). Put in other words, it represents the probability that $g_r$ is the correct group to signal when the coincidence $c_j$ is seen as input; $\tau$ contains the "state permanence" probability; $\tau_i$ models as a Gaussian distribution the probability to remain in state $s_i$. It is computed and updated based on the statistics $\mu_i$ and $\sigma_i$ (determined during learning) stored inside $SPM_i$ and on the number of time step elapsed since when the corresponding coincidence $c_j$ was firstly seen as input. It is set to zero when the current input is not $c_j$; $\delta$ contains the states' decay term; $\delta_i$ – represents the decay term associated to the permanence in state $s_i$. It mimics a mechanism also present in biological neural networks.

Its aim is to learn input sequences (or events) in a clever way (keeping the amount of used memory very low and being able to better generalize during the inference process). This node is designed to better model events inside higher levels of the network (e.g. to be used inside a normal Memory Level 320 where major information resides in time rather than in space. To this aim, a new concept of state is used inside this node. Since it is plausible to think that child-nodes provide a quite stable $FF_{out}$ signaling the same coincidence many times in a row it is reasonable to have a state describing the "duration" in time of a certain coincidence. Hence a state can represent many time points and not just only one as it is for the Temporal Pooler node 430. With this new state definition, which improves the node's ability of storing and recalling long input sequences, much smaller TAM (lean memory) are needed to describe complex events in time.

Each internal state can be referred to as an "event" which is characterized by an average duration (variable time mechanisms) determined during the learning phase and stored inside the SPM. During the inference phase, TAM and SPM are used together to follow the new chains of events. Note that it is possible to use the Modified Learning Mode (employing Markers), as described above for the Temporal Pooler node 430, also for this node.

In the learning mode, differently from what happens inside a Temporal Pooler node 430, transitions inside the TAM are not marked at every new input. New transitions are actually marked only upon detection of "change" in the evidence from below. In other words, a new transition is marked only when the beginning of a new event is triggered by the $FF_{input}$. The special mechanism designed to detect a "change" in the evidence from below is described in the next subsection. While no changes are detected inside the $FF_{input}$, statistics about the number of time point (duration) the current event persists are collected to be later used during the inference phase. Splitting mechanisms are also used with the same purpose as the one described for the normal Temporal Pooler node 430. In this case it is also possible to use more "aggressive" splitting algorithm since simpler chains are expected to be formed. Additionally a state split based on permanence statistics is also employable.

It can be supposed that child-nodes often signal multiple winning groups at the same time through their $FF_{output}$. These are usually called "multiple-activations". This is especially true when the children are Forced Temporal Pooler nodes 440. Looking at subsequent multiple-activations it frequently happens that some active groups persist over consecutive time steps while others, during the same interval, appear and disappear. It thus makes sense to filter consecutive multiple activation to extract only persisting winning groups. Only when (all) persisting groups disappear from a sequence of multiple-activations, it makes sense to trigger an "event" to mark a new transition inside the TAM. This behavior can be obtained by updating and checking the intersection between consecutive multiple-activations and signaling an event change only when the intersection becomes empty. Table 1 shows an example of multiple-activations received through the $FF_{input}$ of an Event Pooler node 450 during the learning phase. The first column reports the current time-step and the second column show the set of winning groups signaled by the child node through its $FF_{output}$. The column "intersection" reports the current content of a hypothetical "intersection" kept updated from the previous time-steps. Every time this intersection results empty (steps 33, 41 and 48) an event change is signaled and the intersection itself is re-initialized to the current multiple-activation seen as input and a "counter" for the number of repetition is zeroed. While the intersection remains non-empty the same repetition counter is incremented in order to be used to provide the duration of the previous event when an event change is signaled (see column $n_{rep}$). Finally, the last column ("transitions to mark") shows the only transitions that are going to be marked into the TAM during this sample input sequence (which is obviously a few with respect to the input steps).

TABLE 1

| time | FF activations | intersection | signaled event | $n_{rep}$ | transitions to mark |
|---|---|---|---|---|---|
| 32 | ... | ... | | | neoellyden |
| 33 | 1 3 4 7 | 1 3 4 7 | x | y | z → x |
| 34 | 1 3 5 7 8 | 1 3 7 | | | |
| 35 | 1 3 5 7 | 1 3 7 | | | |
| 36 | 1 3 4 9 | 1 3 | | | |
| 37 | 1 3 | 1 3 | | | |
| 38 | 1 3 | 1 3 | | | |
| 39 | 3 5 | 3 | | | |
| 40 | 3 | 3 | | | |
| 41 | 2 6 10 | 2 6 10 | 3 | 8 | x → 3 |
| 42 | 2 6 10 | 2 6 10 | | | |
| 43 | 2 10 11 | 2 10 | | | |
| 44 | 2 11 | 2 | | | |
| 45 | 2 11 | 2 | | | |
| 46 | 2 | 2 | | | |
| 47 | 2 | 2 | | | |
| 48 | 4 | 4 | 2 | 7 | 3 → 2 |
| ... | ... | ... | | | |

As an learning example, if the input sequence
111122233333344
is presented to a normal Temporal Pooler node, it can be (after proper splitting steps) that it learns the sequence
(1)→(1)→(1)→(1)→(2)→(2)→(2)→(3)→(3)→(3)→(3)→(3)→(3)→(4)→(4)

Each pair of brackets represents an internal state of the node where number specifies the coincidence to which that particular state is mapped.

Differently, the Event pooler node 450 learns the following sequence (with no need for splitting at all in this case):
(1; 4; 1)→(2; 3; 1)→(3; 5; 1)→(4; 2; 1)

Each pair of brackets represents an internal state of the node where: the first number specifies the coincidence to which that particular state is mapped, the second number (in boldface) represents the average number of consecutive repetitions seen during learning for that particular coincidence and the third number (in italics) specify the standard deviation (which is always one in this case because we're supposing to have "presented" the example sequence just once) of the sample used to compute the average repetition number (second number).

If, differently, the following two sequences:

...

1 1 1 2 2 2 2 2 4 4

...

1 1 1 1 1 1 2 2 4 4

...

were contained inside the training data (possibly each one more than once), the Event Pooler node 450 would learn the following sequence:
(1; 4.5; 1.5)→(2; 3.5; 1.5)→(4; 2; 1)
where now the variance of some state is greater than one.

In the inference mode (feed-forward), the $FF_{output}$ 452 provides a proportionality distribution over the learned groups. Referring to FIG. 14, every time the Time Master asks the node to update its FF path the following computations are performed. Two different behaviors are used to update the feed-forward internal state ($\alpha$) based on inputs dynamic:

1. When a change in the evidence from below is detected, EP 450 updates its internal states using the same equation employed for the normal Temporal Pooler node 430, hence moving one step forward all internal chains.

$$\alpha_{tmp} = TAM\ \alpha$$

$$\alpha(i) = \alpha_{tmp}(i) FF_{in}(C(i)),\ i \in [1, n_s]$$

where $n_s$ it the number of TAM's internal states and C is a function that maps each state to its corresponding coincidence index.

2. When the evidence from below persists, the statistics collected during learning are used to model the behavior of currently active internal states.

$$\delta_i = \begin{cases} 1 & \text{if } n_{rep} < \mu_i \\ e^{-\frac{1}{2}(\mu_i - n_{rep})^2} & \text{otherwise} \end{cases}$$

$$\tau_i = (1 - \rho_i)\ \text{DecaySpeed}$$

$$\alpha_{tmp} = \alpha$$

$$\alpha(i) = \alpha_{tmp}(i)[FF_{in}(C(i)) + \delta_i] - \tau_i$$

where $i \in A_s$, $A_s$ contains the most active state (winner state) taken from currently active groups only, $n_{rep}$ is the number of time step elapsed since when the repetitions of the current input coincidence began, $\mu_i$ and $\sigma_i$ are the repetition statistics retrieved from $SPM_i$ associated to state $s_i$, DecaySpeed is the decay factor and C is a function that maps each state to its corresponding coincidence index. At present, DecaySpeed is a global parameter (found depending on the duration of the events being sought at a certain level) but, as a future development, its choice can be embedded directly into the learning phase.

After this the activation value for each (active) group is computed as the maximum activation value among its states with $$\lambda(i) = \max_{j \in g_i} \alpha(j),\ i \in [1, n_g]$$

where $n_g$ is the number of groups learned by the node during the learning phase. Finally $$FF_{out} = \lambda$$

In the inference mode (feed-back) the $FB_{output}$ 454 provides a probability distribution over the input coincidences. Referring to FIG. 14, every time the Time Master asks the node to update its FB path the following computations are performed. The feed-back internal state ($\beta$) is updated with $$\beta(i) = \alpha(i) FB_{in}(G(i)),\ i \in [1, n_s]$$

where $n_s$ is the number of TAM's internal states and G is a function that maps each state to the index of the group it belongs to. Then the activation value for each coincidence is computed taking the maximum among all TAM's internal states mapped to that coincidence with $$Bel(i) = \max_{j \in [1, n_s] \wedge G(j) = i} \beta(j),\ i \in [1, n_c]$$

where $n_c$ is the number of input coincidences ($FF_{in}$ dimension). Finally $$FF_{out} = Bel$$

The Forced Event Pooler node (FEP) 460, as shown in FIG. 8 is a variant of the Event Pooler node 450 as described above in the same way the Forced Temporal Pooler node 440 is a variant to the normal Pooler node 430.

Figure 16:
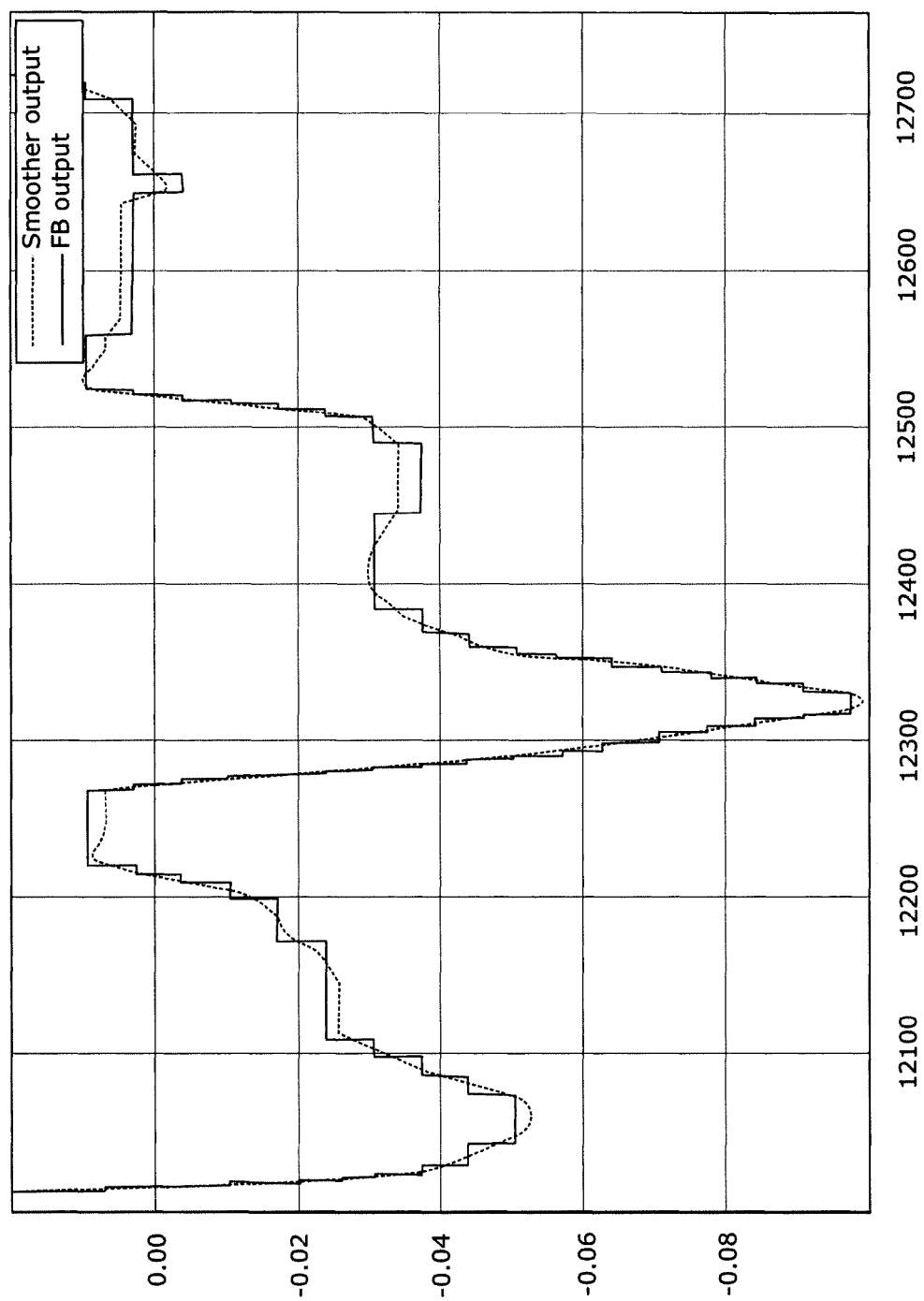
FIG. 16 shows an example of the output of a Smoother node processing a quantized signal according to an embodiment of the present invention.

FIG. 16 shows an example of the output of a Smoother node 470 processing a quantized signal. The aim of the Smoother node 470 is to filter a signal to recover from quantization effects and to make it "smooth". For example it can be used to filter the feed-back output of a Signal Quantizer node 420 to somehow hide/recover the quantization effects: this is exactly the way it is (optionally) used inside the Wired Memory Level 310.

FIGS. 17 to 20 show in way of further embodiments functional block diagrams of applications of the Artificial Memory System according to any of the embodiments of the invention described above whereas FIGS. 21 and 22 show an alternative.

Figure 17:
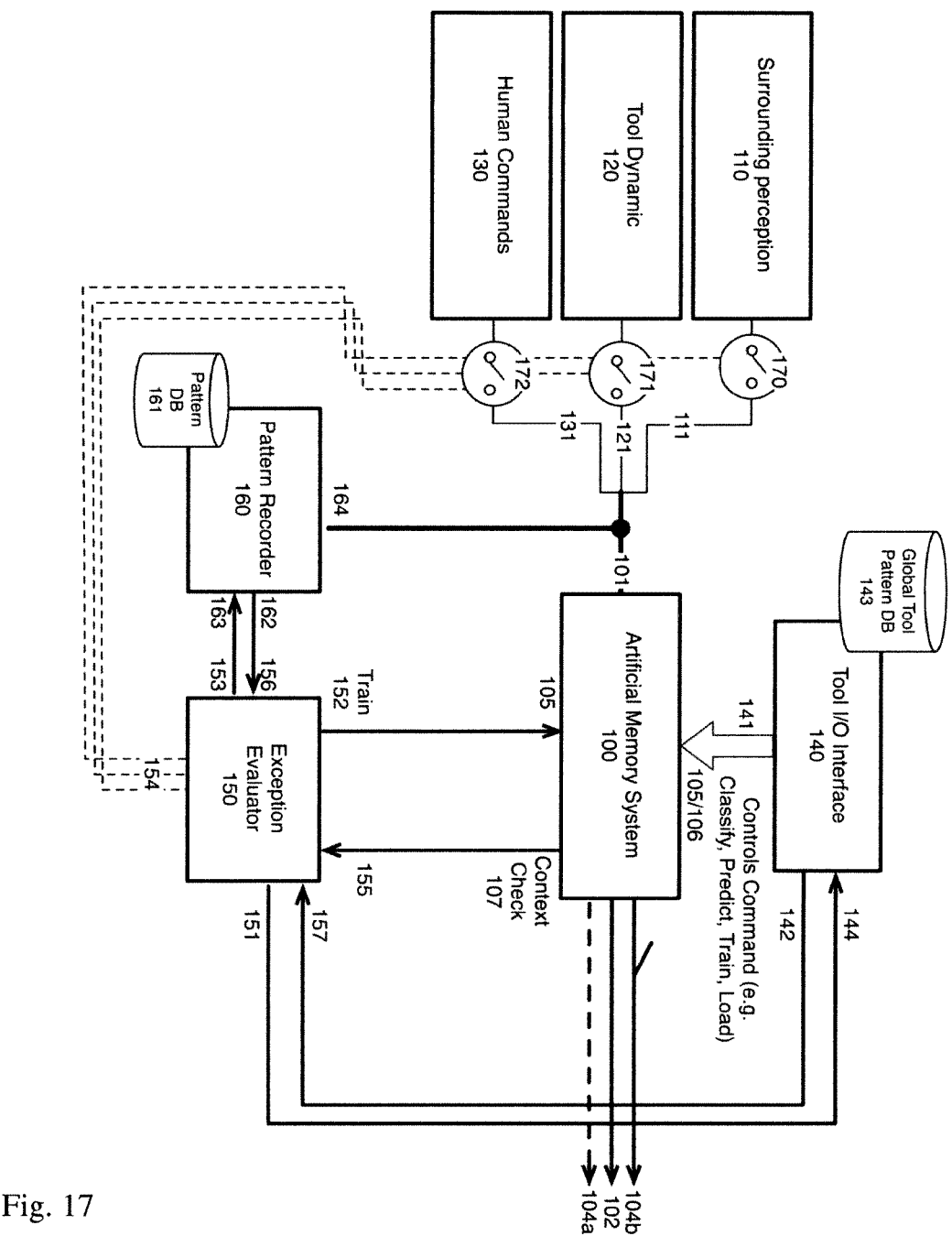
FIG. 17 shows in way of an example a functional block diagram of a continuous learning mechanism according to an embodiment of the present invention.

The following description illustrates a specific deployment of the AMS system described with reference to FIG. 17. The components of the example system as shown are as follows: 100: Artificial Memory System (AMS); 101: Bus of inputs signals to the AMS; 102: High level classification of AMS; 104*a*: Feedback signal generated by AMS according to its status on the current inputs; 104*b*: Predicted signal generated by AMS according to its status and the control signal coming from module 140; 105: Input bus of control signals in AMS; 106: Input bus of reset signals in AMS; 107: Context Check signal generated by AMS. This signal gives a coherent performance index of the memory in respect to the current inputs; 110: Surrounding environment perceptions module. It embeds a set of sensors to sense the environment nearby the tool; 111: Output bus of signals generated by module 110; 120: Tool dynamic sensors module. It includes a set of sensors in order to sense the dynamic response of the tool caused by human commands; 121: Output bus of signals generated by module 120; 130: Human commands module. It embeds a set of sensors in order to sense the raw human commands given to the tool via the controllers; 131: Output bus of signals generated by module 130; 140: Tool I/O Interface; humans can control the behavior of the tool via this interface (e.g. dashboard); 141: Output controls command bus. Many control signals can be submitted by the module; 140 to the AMS in order to accomplish different tasks; 142: Output signal control line to module 150; 143: Database associated with the module 140; it stores different expert behavior patterns that can be loaded and/or updated inside the AMS; 144: Input signal control line from module 150; 150: Exception Evaluator Controller module. It analyses the Context Check signals raised by module 100 and controls the recording and the learning process of new patterns; 151: Output bus of control signals to module 140; 152: Input bus of control signals from module 140; 153: Output bus of control signals to module 160; 154: Output bus for control signals to the gates 170, 171 and 172; 155: Input bus of Context Check signal from module 100; 156: Input bus of control signals from module 160; 157: Input bus of control signals from module 140; 160: Pattern Recorder module. It saves the same "raw" signals that are used by module 100. It record these patterns when receives the specific control signal by module 150; 161: Database for storage; 162: Output bus of control signals to the module 150; 163: Input bus of control signals from the module 150; 164: Input bus of "raw" input signals; 170: Gate to control the communication between module 110 and module 100; 171: Gate to control the communication between module 120 and module 100; 172: Gate to control the communication between module 130 and module 100.

As an example for the inventive continuous learning mechanism the following description illustrates a specific deployment of this system in the automotive field. In this case it is assumed that the "tool" is the car and the "human" is the driver. This system has 2 operation modes: "active" and "learning". In "active" mode the car is in use while in "learning" mode the car is preferably parked in a garage or in an appropriate place with the engine turned off. In the "active-mode" the module 110 senses

- The environment nearby the car using a set of sensors (like cameras, Lidars, GPS, temperature/humidity sensors, . . . ).
- The dynamic response of the car to human actions (like lateral acceleration, frontal acceleration, speed, . . . ).
- The "raw" driver commands (e.g. the position of steering wheel).

The signals generated by modules 110, 120 and 130 via bus 101 are collected by the Artificial Memory System module 100. This module is equipped with memory patterns describing the behavior of the car. By exploiting this memory this module can classify, predict or filter the sensors data coming from the car and then send back the computation results. The module 100 can be controlled by the module 140 (for instance, it can enable or disable the classification, enable or disable the prediction, train or load different patterns into the memory). Moreover the module 100 generates the Context Check signal on bus 107; this signal represents the internal coherence status of the memory and it highlights when the output of 100 is trustable. The module 150 receives the Context Check signal from module 100 and it may decides to record current "raw" signals for a deeper off-line analysis by sending a control signal to the module 160 via the output bus 153. The module 160, after having received the appropriate signal, stores the "raw" input signals (that is receives via bus 164) in the database 161. Finally, the module 160 can communicate with the module 150 in order to report its internal status. Database 161 stores "raw" unexpected input pattern that may be used for improving the system performance. When the system is switched to "learning" mode the Tool I/O Interface communicates this change, via bus signal 142, to the Exception Evaluator. Then the Exception Evaluator triggers a control signal to the module 140 in order to set the Train Mode for the AMS module via bus 141, and sends a control signal to module 160 and to the gates 170, 171 and 172. The Pattern Recorder 160 feeds the previously stored patterns in the database 161 to the module AMS to train it over them. At the same time the gates between the modules 110, 120 and 130 and the AMS are opened: in this way the AMS module is unresponsive to the "raw" input signal provided by the car but focus on the patterns from 160.

By this combination of signals the module AMS is learning the new patterns provided by the Pattern Recorder module. During this process the Exception Evaluator is checking the Context Check signal to check for incoherent states in the memory in order to tune the system over them.

Figure 18:
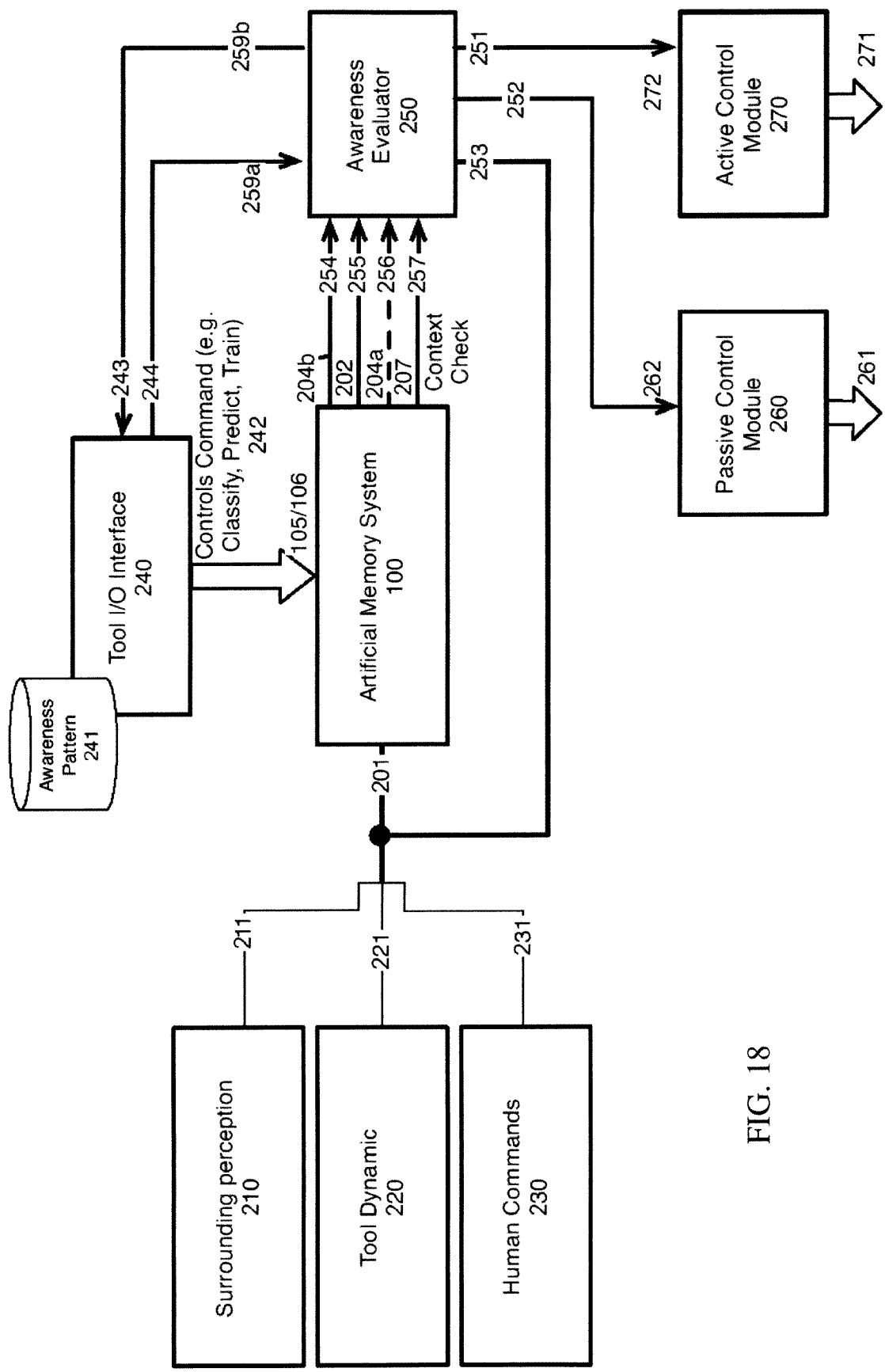
FIG. 18 shows in way of an example a functional block diagram of a system for monitoring human awareness in an automotive application according to an embodiment the invention.

The following description illustrates a specific deployment of the AMS system described with reference to FIG. 18 in which:

100: Artificial Memory System (AMS)
201: Bus of inputs signals to the AMS as described above in any embodiment.
202: High level classification of AMS.
204a: Feedback signal generated by AMS according to its status on the current inputs.
204b: Predicted signal generated by AMS according to its status and the control signal coming from module 240.
205: Input bus for control signals in AMS.
206: Input bus for reset signals in AMS.
207: Context Check signal generated by AMS. The signal gives a coherent memory performance index respect to the current inputs.
210: Surrounding environment perceptions module. It embeds a set of sensors to perceive the environment nearby the tool.
211: Output bus for signals generated by module 210
220: Tool dynamic sensors module. It includes a set of sensors in order to sense the dynamic response of the tool caused by human commands.
221: Output bus for signals generated by module 220
230: Human commands module. It embeds a set of sensors in order to perceive the raw human commands given to the tool.
231: Output bus for signals generated by module 230
240: Tool I/O Interface; humans can control the behavior of the tool via this interface (e.g. dashboard).
241: Database associated with the module 240; it stores different awareness patterns that can be loaded and/or updated inside the AMS.
242: Output controls command bus; Many control signals can be submitted by the module 240 to the AMS in order to accomplish different tasks.
243: Input signal control line from module 250.
244: Output signal control line to module 250.
250: Awareness Evaluator module. It receives from AMS the signals 202, 204a, 204b and 207 then it uses this information in order to evaluate the awareness of the user is using the tool.
251: Output bus line from module 250.
252: Output bus line from module 250.
253: Input bus line to module 250. It receives the same inputs as the AMS and the module 250 uses them together with signals 254, 255, 256 and 257 to generate output signals.
254: Input bus line with the prediction output coming from module 100.
255: Input bus line with the classification output coming from module 100.
256: Input bus line with the feedback output coming from module 100.
257: Input bus line with the context check control output coming from module 100.
259a: Input control line for signals coming from module 240.
259b: Output control line for signals to the module 240.
260: The Passive Control Module is controlled by module 240 and it performs a series of actions on the user of the tool.
261: Output bus line from module 260.
270: Active Control Module is controlled by module 240 and it performs a series of actions directly on the tool.
271: Output bus line from module 270.

The following description illustrates a specific deployment of the AMS (as explained above in any of the embodiments thereof) which will be described with reference to FIG. 18 in the automotive field and which is an embodiment of the present invention.

In this case it is assumed that the "tool" is the car and the "human" is the driver. The module 210 senses the environment nearby the car thanks to physical sensors such as cameras, Lidars, lane detectors, GPS receivers, etc.

The module 220 collects the signals like speed of the car, lateral acceleration and/or frontal acceleration. The module 230 senses the "raw" input commands given by the driver to the car (e.g. push on the throttle, position of the steering wheel, . . . ). Optionally the "driver" can be an autonomous driver. For example the driver commands can be given a priori, in the form of commands stored on a suitable storage medium that can be read by the system. The commands might be desitinations, expected times of arrival, expected fuel consumption, whether to drive aggressively, sportily, calmy etc. The actual human driver can also intentionally switch on the system and a command can be provided to drive the driver to the destination in such a way that accelerations, braking force, speed, fuel consumption etc are according to the driver's normal behaviour or other behaviour.

Also the system can take over in case of lack of commands. For example if it is detected that the driver is asleep the system brings the vehicle safely to a stand still. Whether the driver has fallen asleep can be detected by an Awareness Check.

Also the Awareness function of the present invention can be used in combination with characteristics of the driver. What is an emergency situation for a beginner is not necessarily n an emergency for a formula 1 racing driver. Thus embodiments of the present invention combine Awareness of the tool behaviour with driver capabilities as determined for example by driving behaviour.

Module 100 receives input signals from modules 210, 220 and 230. According to its internal memory it evaluates the behavior of the driver. It can evaluate the driving style (bus 202); it can predict what the driver is expected to do in the next few seconds (bus 204b); it can filter and/or reconstruct the current input pattern of commands (bus 204a). Moreover it can evaluate the consistency of its status in respect to the current inputs highlighting unexpected behavior (bus 207).

Module 100 can receive control signals from the Tool I/O Interface, like dashboard of the car, (module 240) both from the driver and the mechanic. These kind of signals are used to update and/or modify the state of the memory inside the module 100 (e.g. the driver can able/disable the prediction of his driving style and mechanic can update the awareness patterns stored in the AMS).

Module 250 receives inputs from the module 100 (signals from 254 to 257) and from the original signals 253 then it uses the provided information to evaluate thanks to a set of rules the awareness of the driver. In this way it generates the output signals 251 and 252. This module is equipped with a control bus to the module 240 in order to set properly the status of the dashboard.

The module 240 is equipped with a control bus to the module 250 in order to set properly its internal status. The module 260 receives the control signal from module 250 and it performs a series of actions wrt the driver in order to keep him aware (e.g. shake the seat of the driver or turn on visual and/or sound alarm).

Module 260 receives the control signal from module 250 and it drives the actuators of the car in order to prevent unexpected behavior.

The following description illustrates a specific deployment of the AMS (as explained above in any of the embodiments thereof) which will be described with reference to FIG. 19 and which is an embodiment of the present invention:

100: Artificial Memory System (AMS) as described in any of the embodiments above.
301: Bus of inputs signals to the AMS.
302: High level classification of AMS.
305: Input bus for control signals in AMS.
306: Input bus for reset signals in AMS.
307: Context Check signal generated by AMS. This signal gives a coherent performance index of the memory in respect to the current inputs.
310: Surrounding environment perceptions module. It embeds a set of sensors to perceive the environment nearby the tool.
311: Output bus for signals generated by module 310.
320: Human Inputs Controller Module. It senses the actions performed by the gamer over the controller (e.g. pushing a button, moving on the left/right, shaking it randomly . . . )
321: Output bus for signals generated by module 320.
330: Player Input/Output Interface. This is the control interface through which the gamer can change many behavior of module 100 (e.g. Load into the AMS memory new gaming profiles).
331: The database stores many game profiles. They can be shared world-wide.
332: Output bus line through which the module 330 controls the modules 100
340: AI Game Controller. This module implements the Artificial Intelligent controller for the virtual players in the game.
341: Output Strategy Plan Bus in module 340.
342: Input Context Check bus signal 340.
343: Input Strategy Classification bus 340.

Figure 19:
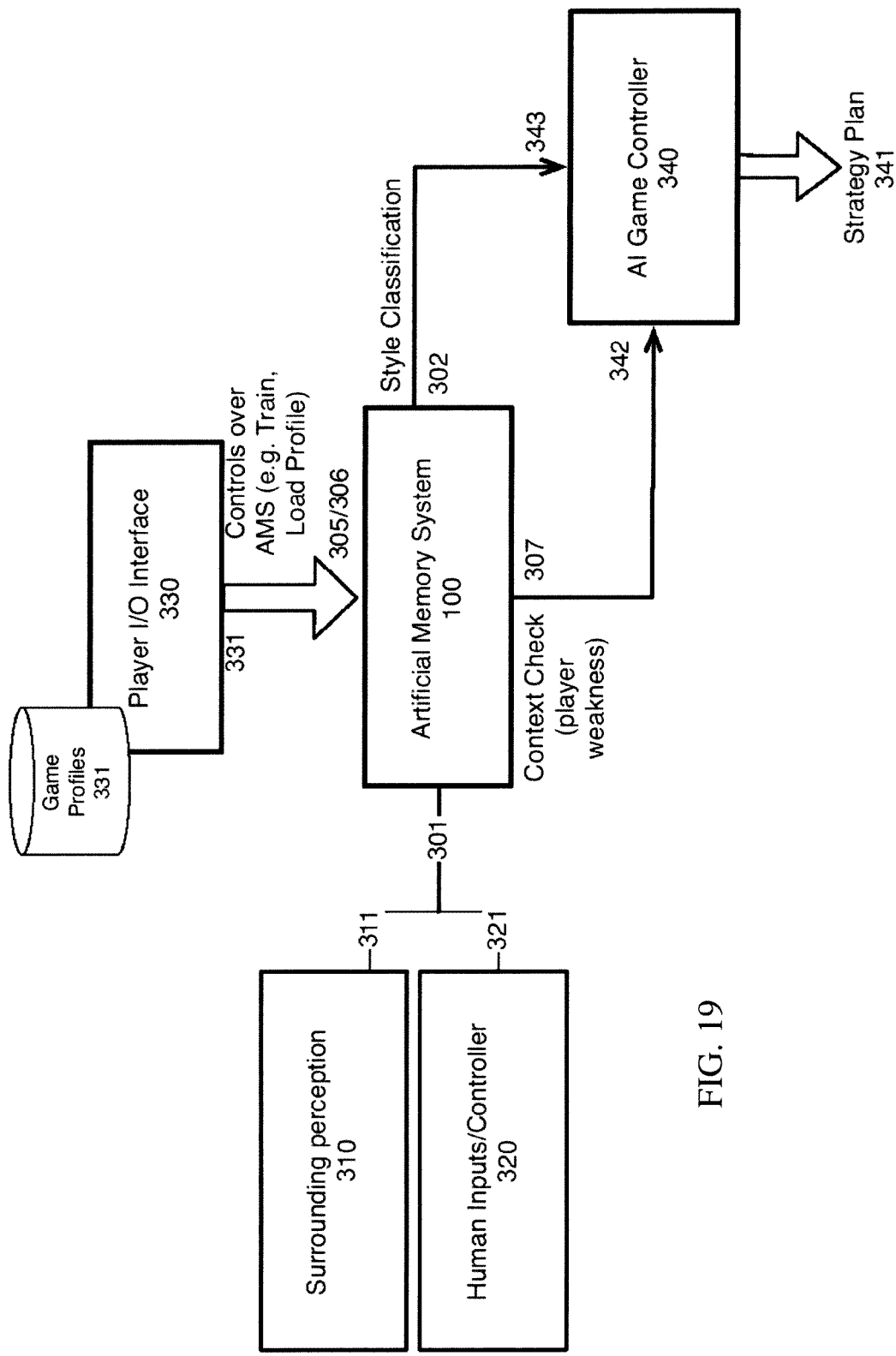
FIG. 19 shows in way of an example a functional block diagram of an AI game assistant according to an embodiment of the present invention.

The following description illustrates an embodiment the AMS as described above inside an entertainment console and used as an AI game assistant e.g. for a virtual tennis player with reference to FIG. 19 and which is an embodiment of the present invention.

The module 310 senses the indoor environment nearby the player or gamer and his position using a set of sensors like cameras and IR illuminators.

The module 320 senses the commands performed by the gamer with the human inputs/controller (e.g. pressing buttons, shaking the controller, moving in one direction, etc.).

The module 100 receives the signals generated by the modules 310 and 320 in order to classify and to recognize the style of the gamer and his potential weaknesses. To accomplish this task the AMS module 100 is equipped with a memory that stores different gaming patterns. The AMS 100 is able at the same time to both of recognize the style of the gamer (aggressive, expert, easy, novice, etc) and to discover his weakness by evaluating the coherence between the input signals (301) and feedback.

The gamer can use the module Player Input Output Interface 330 to upload/delete/change the gaming patterns stored inside the AMS module 100.

The signals (302, 307) generated by the AMS module 100 are used by the AI Game Controller 340 in order to plan the best strategy to play against the gamer (and so generating a better game experience).

The Context Check signal 307 provides the weaknesses of the player at behavior levels so it is possible for the module know when and how perform an action in order to engage the player in harder challenge (e.g. in a tennis game the game assistant can know that the human player has a poor service or a bad right response . . . ) The Style Classification signal 302 provides an overall classification of the player. The AI game controller module 340 can automatically set the difficulty level to improve the game experience. without that the gamer must choose it beforehand.

To train an AMS 100 able to accomplish this goal, the training process may be composed of, but not limited to, the following steps:

1. data acquisition: record input signals to the system (e.g.: player inputs) while different people play a high number of games where all the gamer's style are being performed;
2. data preprocessing: analyze the recorded data thanks to statistical methods to extract primitives and prototypes describing player's movements and styles at different level of temporal complexity;
3. data labeling: Label the prototypes according to the desired gamer's style.
4. data replication: Replicate data in order to ensure a sufficient splitting and prepare a different training file for each level of the Enhanced Hierarchical Memory 220;
5. training: switch the AMS 100 in training mode and feed the training files to each level of the AMS 100.
6. test: switch the AMS 100 in inference mode and feed some recorded data and pre-labeled data. Check AMS 100 output against the labels to calculate the system accuracy.

Figure 20:
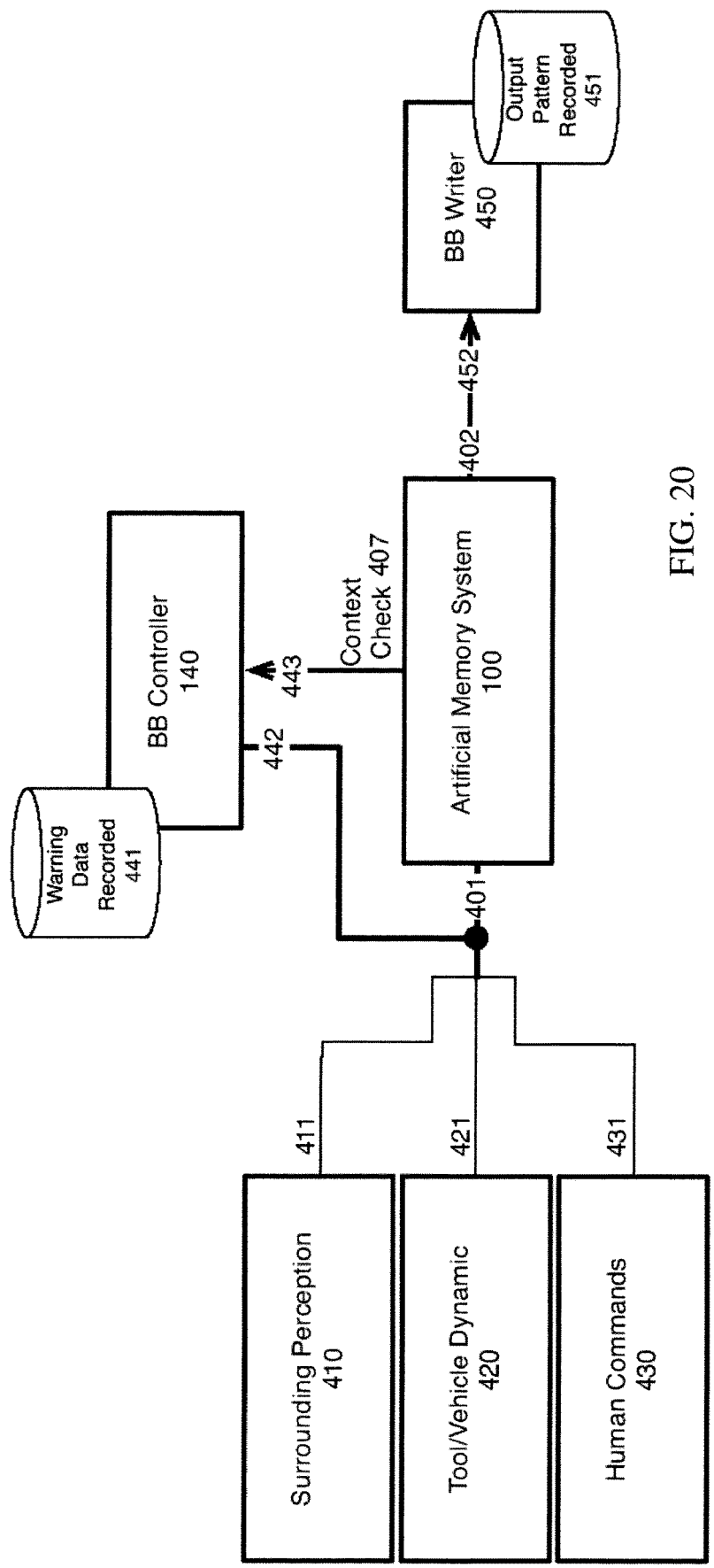
FIG. 20 shows in way of an example a functional block diagram of an application of data recording in an aircraft according to an embodiment of the present invention.

The following description illustrates a specific deployment of the AMS (as explained above in any of its embodiments) which will be described with reference to FIG. 20 in which:

100: Artificial Memory System (AMS) as described in any of the embodiments above.
401: Bus of inputs signals to the AMS.
402: High level classification of AMS.
407: Context Check signal generated by AMS. This signal gives a coherent performance index of the memory in respect to the current inputs.
310: Surrounding environment perceptions module. It embeds a set of sensors to perceive the tool's nearby environment.
411: Output bus of signals generated by the module 410.
420: Tool/Vehicle Dynamic module. It is equipped with a set of sensors to sense the dynamic response of the tool/vehicle.
421: Output bus of signals generated by module 420.
430: Human Inputs Controller Module. It senses the human controlled actuators of the vehicle (e.g. aircraft, car, ship/boat).
431: Output bus of signals generated by module 430.
440: Black Box Controller module. It receives via the input bus 442 the same signals as the module 100 plus another input from the bus 443. The Controller records the data on the bus 442 in 441 when the bus 443 is reporting an alarm.
441: Database that stores the "raw" signals coming from 410, 420 and 430 potentially dangerous.
442: Input Bus line to module 440 containing the "raw" signals coming from 410, 420 and 430.
443: Input Bus line for Context Check coming from module 100 to module 440.
450: Black Box writer. It receives the output signal classification from the module 100 and continuously stores the results in 451.
451: Database that stores the pattern classification results computed by module 100.
452: Input bus line to module 450 containing the signal classification.

The following description illustrates a specific deployment of the AMS described with reference to FIG. 20 inside an aircraft, e.g. to provide data for a black box which is an embodiment of the present invention.

The module 410 senses the environment surrounding the aircraft thanks to a set of sensors.

For instance, it can sense the weather conditions (like temperature, humidity, barometric pressure, luminosity, . . . ), presence of obstacles in front of the aircraft and the GPS position. The module 420 senses the dynamic response of the aircraft in respect to human actions (like airspeed, angle of attack, ground speed, directional stability, feet per minute, . . . ).

The module 430 senses the "raw" human commands that are given to the aircraft (e.g. the position of the joystick, throttle, flaps etc) via its controllers. The signals generated by modules 410, 420 and 430 are collected via bus 401 by module 100.

This module is equipped with many different memory patterns about the behavior of the aircraft. In this way module 100 can compress the "raw" input information into a higher level information on bus 402, that summarize the status of the aircraft. At the same time if, inside the memory, the feedback signal and the feed-forward signal are incoherent, the module 100 throws an exception on bus 407. In this way it is possible to detect unexpected situation, like potentially dangerous ones.

The Black Box Controller (module 440) receives the "raw" input signals from bus 442 and the Context Check signal from bus 43. When the Controller receives an exception on bus 443 it saves the "raw" input signals in to the database 441. It is possible to retrieve this information for a later deeper analysis.

The module 450 receives via bus 452 the classification output generated by module 100 and records it in the database module 451.

While "raw" signals are written in the database 441 by module 440 only when an exception is raised on the bus 443, the classification data are written continuously by module 450. The final goal of this system is to compress information in order to keep memory consumption under control and have a better understanding on what was happening on the aircraft.

The present invention may be realized on a processor system. The processing system may include a computing device or processing engine, e.g. a microprocessor or an FPGA. Any of the methods described above according to embodiments of the present invention or claimed may be implemented in a processing system. Such a processing system can include at least one customizable or programmable processor coupled to a memory subsystem that includes at least one form of memory, e.g., RAM, ROM, and so forth. It is to be noted that the processor or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information, such as parameter values. Ports for inputting and outputting data may be included such as the inputs for data and/or commands described with reference to FIGS. 17 to 22. More elements such as network connections, interfaces to various devices, and so forth, that allow connection to different types of physical sensors may be included. The various elements of the processing system may be coupled in various ways, including via a bus subsystem, for simplicity as a single bus, but which will be understood to those in the art to include a system of at least one bus. The memory of the memory subsystem may at some time hold part or all of a set of instructions that when executed on the processing system implement the steps of the method embodiments described herein.

The present invention also includes a computer program product which provides the functionality of any of the methods according to the present invention when executed on a computing device, e.g. on a processor of the kind described above. Software according to the present invention, when executed on a processing engine, can contain code segments that provide a Perceptual/Cognitive architecture with artificial memory for interacting with dynamic behaviours of a tool and an operator, wherein Perceptual/Cognitive architecture is based on a Memory Prediction Framework implementation having structures and mechanisms for abstraction and generalization and optionally learning, the Memory Prediction Framework implementation comprising an enhanced artificial hierarchical memory system. The software may be adapted to co-operate with a preprocessing stage. The software, when executed, may be adapted to provide a prediction about input operator commands based on temporal events management and to describe input data from physical sensors in terms of primitives and recurrent patterns.

The present invention also includes a computer program product having software according to the present invention, which when executed on a processing engine, can contain code segments that provide a Perceptual/Cognitive architecture with artificial memory for interacting with dynamic behaviours of a tool and an operator, wherein the Perceptual/Cognitive architecture is based on a Memory Prediction Framework implementation having structures and mechanisms for abstraction and generalization and optionally learning, the memory Prediction Framework implementation comprising an enhanced artificial hierarchical memory system. The software may be adapted to co-operate with a preprocessing stage, the software being adapted to describe input data from physical sensors in terms of primitives and recurrent patterns. The software may be adapted to allow feed-forward and feed-back signal flows and to develop the correspondence between the feed-forward and feed-back signal flows as a measure of a context check.

The present invention also includes a computer program product which includes software according to the present invention, which can contain code segments that provide A Perceptual/Cognitive architecture with artificial memory for interacting with dynamic behaviours of a tool and an operator when executed on a processing engine. The architecture can be based on a Memory Prediction Framework implementation having structures and the software may be adapted to provide mechanisms for abstraction and generalization and optionally learning, the memory Prediction Framework implementation comprising an enhanced artificial hierarchical memory system. The software may be adapted to co-operate with a preprocessing stage, the software being adapted to describe input data from physical sensors in terms of primitives and recurrent patterns, the software being adapted to output a compressed higher level information on the behavior of the tool and/or operator based on inputs from the physical sensors.

The above software may be adapted for use with a Physical I/O Layer, an Enhanced hierarchical Memory, a Time Master, a Context Check, a Supervised Gating, a System Control Unit, and a User Control I/O Layer. The software can be adapted to translate physical sensor inputs without modifying the information content to a format manageable by the Enhanced hierarchical Memory. The software can be adapted to be taught and to recognize, and predict sequences of input patterns received from the Physical I/O Layer. The software can be adapted to output a compressed higher level information based on the physical sensor inputs received by the Physical I/O Layer.

The software may also adapted to output a classification output and/or a context check.

The software may be adapted to provide a set of nodes arranged in distinct columns, wherein each node column comprises at least an Event Pooler node.

The software may be adapted to provide the at least one Event Pooler node so that it has a Spatial Pooler node or a Forced Temporal Pooler as a child-node.

The software may be adapted so that each Memory Level block is coupled with an Attentive Classifier.

The software may be adapted to provide the Attentive Classifier so that it comprises at least one of a Control Unit, a Gating, a Multi-Parent Gating, and a Classifier.

The software may be adapted to provide a Wired Memory Level block comprising at least of a set of nodes arranged in distinct columns, wherein each node column comprises at least a Signal Quantizer node and at least a Forced Temporal Pooler node.

The software may be adapted to provide a node column that additionally comprises a Smoother node and/or a Forced Event Pooler node.

The software may be adapted to provide a computer based method of interacting with dynamic behaviours of a tool and an operator based on a Memory Prediction Framework implementation having an enhanced hierarchical memory system, the software being adapted to provide the steps, when executed, of:

Generating signals by sensors, wherein the signals representing a physical status of the system;
Sending the signals generated by sensors to the artificial memory system;
Collecting the signals in the artificial memory system;
Describing the input data in terms of simple primitives and recurrent patterns;
Receiving and analyzing operator's commands, tool behavior, optionally an external environment, and the content of the artificial memory system to decide if a received event is a new/unknown or a known event;
Classifying the received event; and
Determining from an internal representation the current state of the tool along with the identification of short temporal events and inferred long term operator actions.

The software can be adapted to provide the steps, when executed, of:

Outputting a compressed higher level information on the behavior of the tool and/or operator, or
predicting about input operator commands based on temporal events management and the primitives and recurrent patterns of the input data, or
determining from feed-forward and feed-back signal flows the correspondence between the feed-forward and feed-back signal flows as a measure of a context check, or any combination of these.

The software can be adapted to provide a method of interacting with dynamic behaviours of a tool and an operator based on a Memory Prediction Framework implementation comprising an artificial memory system. The software can be adapted to provide the steps, when executed, of:

Generating signals by sensors, wherein the signals representing a physical status of the system;

Sending the signals generated by sensors to the artificial memory system;

Collecting the signals in the artificial memory system, wherein the artificial memory system is equipped with memory patterns describing the behavior of the system;

Classifying, predicting and/or filtering the signals coming from the sensors in the artificial memory system and sending back the computational result to the system; and Generating a Context Check signal by the artificial memory system representing the internal coherence status of the memory and which Context Check signal highlights when the output of the artificial memory system is trustable.

The software can be adapted to provide the steps, when executed, of:

Sending the Context Check signal to a Exception Evaluator; and

Receiving the Context Check signal by the Exception Evaluator, wherein the Exception Evaluator decides, based on the Context Check signal received, to record current raw signals from the sensors received for a deeper off-line analysis by sending a control signal to a Pattern Recorder module.

The software can be adapted to provide the steps, when executed, of:

Storing the raw signals received in a database;

Separating the artificial memory system from the signals coming from the sensors;

Setting the artificial memory system to a train mode; and

Feeding the previously stored pattern in the database as an input to the artificial memory system instead of the signals generated by the sensors to train the artificial memory system on that stored signal pattern.

The software can provide a method of interacting with dynamic behaviours of a tool and an operator based on a Memory Prediction Framework implementation comprising an artificial memory system. The software can be adapted to provide the steps, when executed, of:

Generating signals by sensors, wherein the signals representing a physical status of the system;

Sending the signals generated by sensors to the artificial memory system;

Collecting the signals in the artificial memory system, wherein the artificial memory system is equipped with memory patterns describing the behavior of the system;

Evaluating the behaviour of the operator, or predicting the expected operator behaviour in the future, or filter and reconstruct current operator commends or generate a Context Check signal by the artificial memory system representing the internal coherence status of the memory.

The software can be adapted to provide the steps, when executed, of:

Sending the Evaluation, the prediction, or filtration and reconstruction or Context Check signal to an Awareness Evaluator; and the Awareness Evaluator deciding, based on the signals received to provide passive or active control information to the operator.

The software can provide a method of interacting with dynamic behaviours of a tool and an operator based on a Memory Prediction Framework implementation comprising an artificial memory system. The software can be adapted to provide the steps, when executed, of:

Generating signals by sensors, wherein the signals representing a physical status of the tool;

Sending the signals generated by sensors to the artificial memory system;

Collecting the signals in the artificial memory system, wherein the artificial memory system is equipped with memory patterns describing the behavior of the tool;

the artificial memory system generating a classification that summarizes the status of the tool; and Generating a Context Check signal by the artificial memory system representing the internal coherence status of the memory.

The software can be adapted to provide the steps, when executed, of:

Sending the Context Check signal to a controller as well as the input data; and recording the classification and/or the controller allowing recording of the input data when it has received a context check signal indicating an exception.

The software can provide a method of interacting with dynamic behaviours of a tool and an operator based on a Memory Prediction Framework implementation comprising an artificial memory system, the tool being part of a gaming system.

The software can be adapted to provide the steps, when executed, of:

Generating signals by sensors, wherein the signals representing a physical status of the tool and the behaviour of the operator;

Sending the signals to the artificial memory system;

Collecting the signals in the artificial memory system, wherein the artificial memory system is equipped with gaming patterns describing the behavior of the operator;

the artificial memory system generating a classification that summarizes the gaming capabilities of the operator; and Generating a Context Check signal by the artificial memory system representing the in incoherence in game play by the operator.

The software can be adapted to provide the steps, when executed, of:

Sending the Context Check signal the classification to a controller; and the controller controlling the game therewith.

The software can be adapted to provide the steps, when executed, of: controlling whether the artificial memory system is classifying, predicting and/or filtering the signals coming from the sensors and setting the artificial memory system to a train mode when the operational status of the system allows training.

The software can be adapted to provide the steps, when executed, of: separating the artificial memory system from the signals coming from the sensors by gates, which gates are triggered by an Exception Evaluator, whereby the Exception Evaluator is informed by the Tool I/O Interface about the training status of the artificial memory system.

Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practising the claimed invention, from a study of the drawings, the disclosure, and the appended claims.

For example, a single unit may fulfil the functions of several items recited in the claims. Any reference signs in the claims should not be construed as limiting the scope.

For example in embodiments of the present invention modeling actions can be as "paths" or "sequences" employing Markov chains, whereby such embodiments of HTMs can "follow" just one path. However, in any of the embodiments a better generalization can be provided with the ability of "following" multiple paths in parallel while assessing their potential consequences, and continuously choosing the best performing one. These embodiments avoid the problem that the description of events and memory content based on Markov chains is too rigid to properly deal with the temporal coexistence of events characterized by very different time dynamics (e.g. driving on a straight path in highway, with respect to overtaking, or short and sudden corrections on the steering wheel or pedals, just to make a few examples). In such embodiments probability-based inference of un-folding of sequences, by transmission matrix is still valid. The information currently saved during training and used during inference is not sufficient for multiple pathways and poses additional limitations to their implementation. As a solution, in these embodiments storing the followed paths and their relative frequency in the training set would give important probabilistic information for the prediction phase.

The scheduler can be implemented in the framework so that it activates only one node of the network at a time (layer by layer), in a very strict way. This posing major limitations to network topologies. Embodiments of the present invention allow parallel "simulations", e.g. lateral (intra-level) connections, which allow for the implementation of inhibition mechanisms and the creation of probability distributions over possible paths from a certain state.

In embodiments of the nodes' memory (Markov chains) different chains can be considered completely uncorrelated from a semantical point of view. In a further embodiment a similarity measure is used to compare two different chains. Thus a newly recorded event/chain (not recognized as previously experienced ones) can be compared with already stored chains to actually understand if it belongs to the same "class" of events (e.g. a right turn but with a slightly different radius, never seen before). Hence, the present invention also includes an implementation of nodes that is not based only on the adoption of Markov chains to store memories, nor on the presence/distinction of different types of nodes (i.e. spatial and temporal poolers). The present invention includes an architecture for more flexible activation of network parts comprising parallel (concurrent) activation of network parts (such as nodes or groups of nodes), enabling also horizontal information flow (not only vertical), and the possibility to accept and deal with asynchronous input in a fast-clocked architecture.

The invention further provides for an architecture, being developed adhering to the Memory Prediction Framework (MPF) theory, in particular a system, based on the hMPF, developed to tackle a particular classification/prediction problem, having as its main processing element a artificial brain is provided.

The artificial brain, in turn, might comprise a number of processing nodes organized in layers and communicating each other by means of feed-forward (FF), feed-back (FB), and prediction signals. These signals are essentially Probability Density Functions (PDFs) expressing the likelihood for a particular input pattern to be a consequence of a particular world cause. The whole system might further check the status of the hierarchical network by means of context check signals also provided as outputs to the network.

Figure 21:
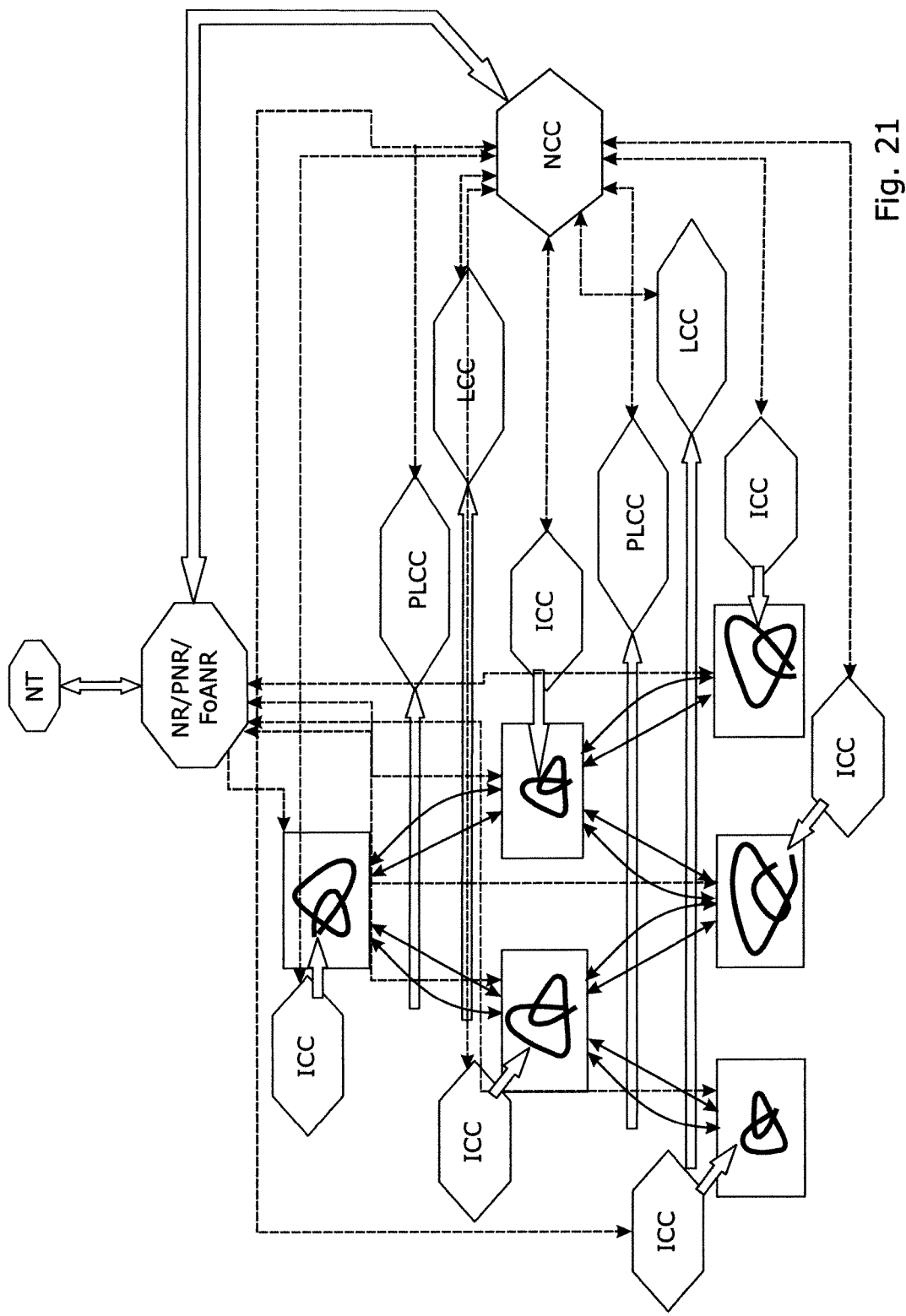
FIG. 21 shows a simplified block-view of the h-MPF architecture according to an embodiment of the present invention.

FIG. 21 summarizes the structure of a h-MPF artificial brain. The black rectangles are the new nodes, with the internal memory represented by means of a sort of twisted ribbon. The FF and FB links between the nodes are of two species: the black ones are the "classical" probability density functions on the nodes' input output spaces; the red ones carry prediction signals.

There are three kinds of special nodes, called "context checker": in blue, the ICCs (internal context checker) check the consistency of the node internal memory (based on indexes and measures in the node "memory space"); in black, the LCCs (Level context checker), check the consistency between FF and FB current signals; in red, the PLCC (prediction level context checker) check the consistency on the predicted values.

ICC, LCC, PLCC are connected to the NCC (network context checker), which supervises the consistency of the whole network and will be able to measure the "understanding index", a global index measuring the "context understanding" of the network, operating in the node (ICC), in time (LCC and PLCC) and in space (NCC).

NCC is connected to the NR/PNR/FoANR (network runner, predictive network runner, focus of attention network runner), which is the evolution of what was called "Time master": this block triggers the nodes (single or groups) and can implement every "normal run", "predictive run" or "focus of attention" mechanisms (this function implies the ability of following multiple predictions in parallel).

NT is the network trainer, a block running the network in training mode.

As required by the MPF theory each node should be able to deal with, at least, feed-forward (FF), feed-back (FB), and prediction signals. In FIG. 8 a generic processing node is shown as a black box to highlight its connections with other processing nodes or to the extern of the hierarchical network.

Figure 22:
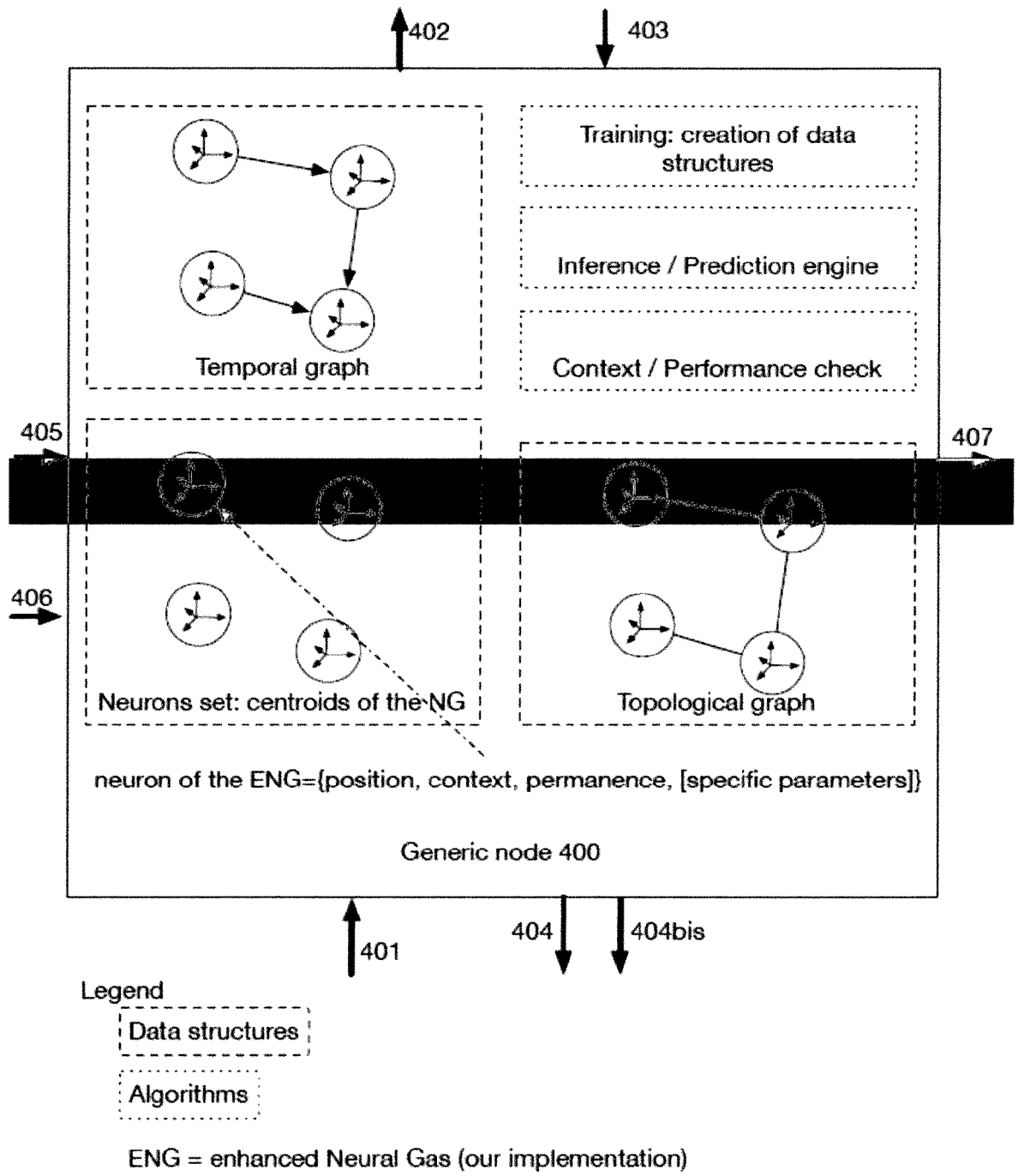
FIG. 22 shows the internal structure of the hMPF node, in a preferred implementation according to an embodiment of the present invention.

FIG. 22 shows a preferred embodiment of the structure of the hMPF node, highlighting both data structures and algorithms, as described in the document.

The main purpose of a node is to: (1) learn and recognize peculiar input patterns, (2) associate them to a number of external (possibly unknown) causes or events, (3) predict the next input pattern(s).

To these aims two different phases are usually distinguished: (1) training phase used to learn input patterns, which affects the internal 'memory' of a node; and (2) inference phase the actual operational phase for a node during which input patterns are compared against memorized ones and FF and FB outputs are generated. Actually nothing prevents a node to operate in a 'continuous learning' way in which training and inference are performed together. Another possibility is to have a very short initial training phase, used to overcome the 'cold start' problem, followed by a continuous learning phase. In any case, the purpose for the inference phase is to evaluate the current input pattern in order to associate it to one or more, learned causes. This results in the generation of a FF output signal which represent the likelihood for the current input pattern to belong to one of the learned causes. This process is usually affected also by the FB input signal which represents a prediction for the current FF output signal provided by a parent node. This last feature is intended to permit a node to disambiguate among different causes which might share common input patterns: this is usually referred to as 'focus of attention'. After the generation of the FF output a node should also generate a prediction for its next input pattern to be signaled to child nodes via its FB output: this might require to wait for all the network to finish the FF update in order to propagate prediction from top to bottom nodes.

In a further embodiment of our architecture we have introduced two main types of nodes: (1) Spatial clustering nodes and (2) Spatiotemporal clustering nodes. Both of them are based on the Neural Gas algorithm and related theory.

In a further particular embodiment the former are basically stateless and do not consider temporal sequences (and hence are not able or at most little ability to make predictions on their own). The latter definitely do consider the temporal dimension and are the only mean for a hierarchical network to make (substantial) predictions.

Actually, other kind of processing nodes to be used for (standard) data pre- or post-processing are foreseen.

Spatial clustering nodes are based on the Neural Gas (NG) algorithm which is a well-known artificial neural network able to find optimal data representations based on feature vectors. The NG algorithm is usually applied for data compression or vector quantization, especially in pattern recognition, image processing, and cluster analysis. Inside a spatial-clustering node NG is used to learn frequently seen input patterns and, possibly, to discover clusters representing different input 'sources' or 'causes'. To this aim, all the 'growing' variants to the base NG algorithm are of particular interest because of their capability to automatically discover the number of centroids needed to well represent the input space and to spread them as evenly as possible to minimize, for example, Quantization Errors (QE).

Since all these NG algorithms have their own parameters used to regulate their training processes, one of the embodiments of the invention is a version thereof wherein which training parameters are automatically driven to achieve certain predefined performances.

Yet two other FF PDF output computation strategies are disclosed, in particular (1) when the aim is to simply quantize the input space the output can be a PDF over the centroids learned so far by the gas; or (2) when it makes sense to look for a small number of 'causes' the output can be a PDF over the clusters found so far inside the gas.

Edges among centroids may visualize the topological graph underlying the NG algorithms' training process: by partitioning this topological graph learned centroids can be separated in different clusters. In order to discover meaningful clusters any graph partitioning technique can be employed, e.g. starting from the simplest connected components detection to more complex spectral partitioning or multi-level partitioning methods. When the node is asked to compute its FF output it can provide a PDF representing the likelihood for the current input to belong to a centroid's receptive field, when the input space quantization is the focus, or it can provide a PDF representing the likelihood for the current input to belong to one of the found clusters.

Please note that the PDF over clusters can be derived from the PDF over centroids by partitioning the latter one based on centroids belongings, extracting the maximum for each partition and finally normalizing values to get 1:0 as cumulative sum (to actually represent a PDF).

As stated by the MPF theory the FF output computation might consider, and hence be influenced by, the current FB input which is a prediction for the FF output generated by a parent node (possibly aware of a temporal context, or simply of a wider spatial context). If a parent node states that it is likely that the next input pattern belongs to cluster 2 the FF output of this spatial-clustering nodes might be biased toward the cluster 2 to shows the highest peak in correspondence of cluster 2 instead of cluster 1. This is an example about how a parent node might help a spatial-clustering node to disambiguate ambiguous inferences based on FB flows representing predicted expectations.

Since a spatial-clustering node is stateless its FB output, as well as its predictions, completely relies on its FB input. In the easiest case the FB output can be the position of the centroid identified by the highest peak in the PDF over centroid. Nothing prevents a spatial-clustering node to compute, e.g., the center of mass of the n most likely centroids. The same applies for predictions: m step predictions coming from a parent node are translated into the FF input space domain using the set of learned centroids as a dictionary. Again the results can be based on the most likely key of the dictionary or based on a weighted average of the n most likely keys.

Spatiotemporal clustering nodes are based on the extensions of the NG algorithm for temporal clustering. An example of such an extension is the Merge Neural Gas (MNG). Inside a spatiotemporal-clustering node MNG (or any other variant to the original MNG algorithm) is used to learn frequently seen input pattern sequences. To this aim, 'growing' variants to the base MNG algorithm are selected to be of particular interest because of their capability to automatically discover the number of neurons needed to well represent the input space and to spread them as evenly as possible to minimize Temporal Quantization Errors.

With respect to already published material about NG algorithms and their temporal variants, the invention in particular adds support for the following features enabling integration of temporal NG algorithms inside spatiotemporal clustering nodes, feature such as (1) temporal graph/model learning (in addition to the topological graph already accounted for), based on the Hebbian Competitive Rule (HCR), while training the gas, (2) enhanced training which exploits both the topological and temporal graphs to build an Homogeneous Generalized Semi-Markov Model of the input source. This effectively permits to learn/model also the timing between input patterns (also called inter-arrival times of events), (3) Enhanced (or Hybrid) Grouping to isolate temporal events which exploits the temporal graph structures as well as, at the same time, temporal statistics about each neuron's receptive fields (e.g. TQE and TQE for future inputs), (4) Inference Process based on Neural Gas data structures, (5) Graph-based prediction.

Concerning Temporal Graph Learning, a new graph structure composed by temporal edges has been added to the classical data structures used by NG algorithms (e.g. the topological graph structure used to represent topological relations among centroids/neurons induced by the input space). HCR is used to create and delete temporal edges among neurons (in a way very similar to the one used to manage temporal edges) during the training process in order to keep track of neurons' activation trajectories. From a different point of view, the neurons developed by the training process might be seen as internal state of a state machine modeling the input signal. This new temporal graph somehow represents the state transition function of this state machine.

The main aim of this temporal graph is to aid the inference, grouping, and prediction processes associated to a spatiotemporal clustering node.

Concerning enhanced learning, to enable a spatiotemporal clustering node to learn the timing between 'different' input patterns, we have extended the data structure associated with neurons to also comprise an estimation for the permanence on the previous state/neuron (which in the simplest case represents the estimated Gaussian distribution of the time spent on the previous neuron before moving on to the next one). In other words, knowing the current internal state, it is possible to extract the possible next states together with the time to wait on the current state before jumping to a next one (jumps to different states can be associated to different waiting times on the current state). These permanence estimations, together with the position of the neurons (input patterns) and the temporal graph edges (and related traversal counters), actually permit to learn a Homogeneous Generalized Semi-Markov Model over the input space. This means that our Enhanced Neural Gas (ENG) is able to model the input signal as a Homogeneous Generalized Semi-Markov Process learning all its characterizing parameters. This model serves as a good base for the inference and prediction processes.

Concerning hybrid grouping, in order to compute the FF output for a spatiotemporal clustering node it is necessary to distinguish a set of temporal events and estimate, input by input, the PDF over it. We identify meaningful subsequences inside the input signal by extracting isolated (multi-)paths on the temporal graph (the grouping process). These (multi-) sub-paths are said to be temporal events and neurons belonging to the same event are labeled consistently. As described before, this graph's nodes clustering can be done using several different graph partitioning algorithms, but since 'isolated' (multi-) paths can actually be not so clearly isolated from other parts of the graph, our approach is hybrid. Temporal statistics about each neuron's receptive fields (e.g. TQE and TQE for future inputs) are also used to determine cutting edges to facilitate the partitioning process. For example if from the TQE of future inputs of a particular neuron it is clear that after ten time tics there is a sharp increase in the QE values it should be considered very likely for the current temporal event to end within ten time tics from that neuron. If this is confirmed also for the temporal successors of that particular neuron, the outgoing edges of the neurons reachable in ten time tics from that neuron should be marked as cutting edges.

Concerning other grouping approaches, if an a priori classification (labeling) is available for at least some of the training and/or testing data, it is possible that each neuron collects statistics about the class (label) of the input data that activated it. If these statistics are collected during training then a specific mechanism for taking in less account old labels may be applied because the meaning of the neuron changes over time as the training progresses.

It is possible to partition (group) the neurons using their statistical information about the label.

A possible approach is to compute a histogram for each neuron where the most probable group or groups are highlighted.

Another possible grouping approach is to group together all the temporally consecutive neurons that have a high number of activation over input data of the same label (class). This approach may consider a single neuron belonging to various groups.

Another possible approach is to use the standard grouping algorithm and then refine the grouping by separating or merging groups depending on the neurons labels.

Another possible approach is to use the standard grouping algorithm and then calculate an average group-class by averaging the group's neurons classes.

The invention provides an interference process based on Neural Gas data structures. The Homogeneous Generalized Semi-Markov Model learned by the training process provides a very good basis for the inference process. Instead of choosing a single winning neuron at each new input pattern, as required by the NG training process, we store an activation state for each neuron. Activation states are then updated input by input based on the information extracted from the neurons' position, context, and permanence information as well as the temporal relations available from the temporal graph. This way, considering also the results of the grouping process, we are able to estimate a PDF over the identified temporal events to be provided as the FF output of the spatiotemporal clustering node.

The invention further provides for graph based prediction. In principle, predictions can be generated simply running a Markovian process on the Homogeneous Generalized Semi-Markov Model (developed by the training process) starting from the most likely current internal state.

When predicted data from parent nodes is available, differently, we turn the problem into a path search on the temporal graph. This is possible because the parent node's prediction will always be in the form "Event n1 for X seconds, then Event n2 for Y seconds, then . . . ". This way we know that starting from the possible current internal state(s) we have to find a path on the temporal graph which brings the current state to be a neuron belonging to a different event in a number of jumps (which in turn depends on the permanences on intermediate states). This technique, other than making it possible to take into account also the parent nodes' prediction, can provide much better results than just running a Markovian process "step by step" from an internal state to the next one. This is easy to understand considering that graph skeletonization can also be employed to compute the average forward receptive field of the current neuron or, in other words to compute the average input sequence associated with a particular event. More simply, the next predicted event gives the 'direction' to which polarize the sought path.

The invention claimed is:

1. A neural network system implemented within an electronic control unit (ECU) of a vehicle, the neural network system comprising:
   an artificial hierarchical memory system including:
      a first processing stage including a plurality of event pooler nodes, and
      a second processing stage separate from the first processing stage, the second processing stage including a plurality of forced temporal pooler nodes;
   one or more sensors installed on the vehicle;
   a communication interface configured to: (i) receive vehicle sensor data generated by the one or more sensors, the vehicle sensor data being related to dynamic behaviors of an operator while operating the vehicle, and (ii) provide the vehicle sensor data to the artificial hierarchical memory system; and
   an output port configured to output commands based on constructed data of the artificial hierarchical memory system, wherein:
      the plurality of forced temporal pooler nodes of the second processing stage of the artificial hierarchical memory system are configured to:
         receive the provided vehicle sensor data,
         extract and stored prototypes represented as datachunks characterizing the dynamic behaviors of the operator based on the provided vehicle sensor data, and
         provide the prototypes as input to the first processing stage enabling an event to be defined as an occurrence of at least one prototype;
      each event pooler node of the first processing stage and each forced temporal pooler node of the second processing stage includes neurons as components and edges, two or more of the neurons being connected in a graph to form each node;
      the first processing stage is configured to:
         learn and recognize input patterns and sequences from the received vehicle sensor data, and
         construct and store data including an index of the recognized input data and information related to timing of the input data, associated with one or more of the dynamic behaviors, the constructed data causing the ECU to (i) formulate a first prediction related to a desired vehicle behavior and a second prediction related to a predicted operator behavior, and (ii) issue one or more commands to cause actuation of actuators on the vehicle to prevent an unexpected vehicle behavior caused by the predicted behavior of the operator of the vehicle, whereby each of the two or more of nodes are adapted for time series analysis, and include components connected in a topological graph or a temporal graph; and
      the actuators include at least one of a steering actuator, a braking actuator, and an acceleration actuator.

2. The neural network system of claim 1, wherein the first processing stage is based on a Memory Prediction Framework implementation or a Deep Learning Architecture implementation.

3. The neural network system of claim 1, wherein each event pooler node of the first processing stage and each forced temporal pooler node of the second processing stage are configured to learn and recognize input patterns that are frequently occurring.

4. The neural network system of claim 1, wherein each event pooler node of the first processing stage and each forced temporal pooler node of the second processing stage use signals representing a probability density function for communication.

5. The neural network system of claim 1, wherein at least one of the event pooler nodes of the first processing stage and the forced temporal pooler nodes of the second processing stage is adapted to execute methods based on a neural gas concept.

6. The neural network system of claim 5, wherein the neural gas concept is provided with an automatically during-training-derived temporal graph, where nodes of the temporal graph represent neurons, each neuron of the nodes of the temporal graph representing a temporal state for the neural gas, and edges between the nodes of the temporal graph represent a temporal sequence in which different neurons were activated during training.

7. The neural network system of claim 5, wherein
   the neural gas concept is provided with neural gas neurons,
   each of the neural gas neurons represents a temporal state for the neural gas, and
   each of the neural gas neurons retains information about at least an input pattern, a temporal context and statistics about the time duration permanence of the previous state to which it responds.

8. The neural network system of claim 5, wherein the neural gas concept includes information on permanence on states and is configured to provide for autonomous learning of a homogeneous Generalized Semi-Markov Decision Model for at least an input space of the neural gas concept.

9. The neural network system of claim 8, wherein each event pooler node of the first processing stage and each forced temporal pooler node of the second processing stage are provided with inference methods exploiting the homogeneous Generalized Semi-Markov Decision Model.

10. The neural network system of claim 9, wherein the inference methods and temporal prediction methods are characterized in that for each new input pattern, an activation state of a plurality of the neurons is stored.

11. The neural network system of claim 8, wherein each event pooler node of the first processing stage and each forced temporal pooler node of the second processing stage are provided with temporal prediction methods exploiting the learned Generalized Semi-Markov Decision Model.

12. The neural network system of claim 11, wherein the temporal prediction methods make use of a Viterbi method.

13. The neural network system of the claim 8, wherein each event pooler node of the first processing stage and each forced temporal pooler node of the second processing stage are provided with temporal prediction methods that are based on a path search in the temporal graph representing the Generalized Semi-Markov Decision Model.

14. The neural network system of claim 1, wherein at least one of the event pooler nodes of the first processing stage and the forced temporal pooler nodes of the second processing stage:
   is adapted to execute methods based on a neural gas model extended to include time, and
   provides a representation of a generalized Markov process through introduction of the temporal graph used side-by-side with the topological graph leveraged by a neural gas algorithm.

15. The neural network system of claim 1, wherein two or more of the neurons within node edges represent temporal sequences of activation of the neurons.

16. The neural network system of claim 1, wherein each of the neurons represents information about an input pattern, a temporal context, and activation timing statistics.

17. The neural network system of claim 1, wherein feedback that is input to each of the nodes influences values of activation of the neurons.

18. The neural network system of claim 1, wherein each of the neurons retains statistical information about labels of the input data activated in the neuron.

19. The neural network system of claim 18, wherein the statistical information about the labels is used to perform semi-supervised grouping or to improve neural gas performance during training or inference.

20. A computer-implemented method comprising:
receiving, by the communication interface, the vehicle sensor data generated by the one or more sensors installed on the vehicle, the vehicle sensor data being related to dynamic behaviors of the operator while operating the vehicle;
sending the vehicle sensor data to the neural network system according to claim 1.

21. A computer based method for training/teaching patterns to one or more of the event pooler nodes of the first processing stage and the forced temporal pooler nodes of the second processing stage of the artificial hierarchical memory system of the neural network system according to claim 1, the method comprising:
providing input patterns to the one or more of the event pooler nodes of the first processing stage and the forced temporal pooler nodes of the second processing stage; and
automatically deriving the temporal graph or homogeneous Generalized Semi-Markov Decision Model for at least the one or more of the event pooler nodes of the first processing stage and the forced temporal pooler nodes of the second processing stage.

22. The method of claim 21, wherein statistical information about labels are used to perform semi-supervised grouping or to improve neural gas performance during training or inference.

23. A computer based method comprising:
storing, in an artificial hierarchical memory system of a neural network system, a first processing stage including a plurality of event pooler nodes, and second processing stage separate from the first processing stage, the second processing stage including a plurality of forced temporal pooler nodes;
receiving, by a communication interface of the neural network system, vehicle sensor data generated by one or more sensors installed on a vehicle, the vehicle sensor data being related to dynamic behaviors of an operator while operating the vehicle;
providing, by the communication interface, the vehicle sensor data to an artificial hierarchical memory system implemented within an electronic control unit (ECU) of the vehicle;
receiving, by the plurality of forced temporal pooler nodes of the second processing stage of the artificial hierarchical memory system, the provided vehicle sensor data;
extracting and storing, by the plurality of forced temporal pooler nodes of the second processing stage, prototypes represented as datachunks characterizing the dynamic behaviors of the operator based on the provided vehicle sensor data;
providing, by the plurality of forced temporal pooler nodes of the second processing stage, the prototypes as input to the first processing stage enabling an event to be defined as an occurrence of at least one prototype;
learning and recognizing, by the second processing stage, input patterns and sequences from the received vehicle sensor data, each event pooler node of the first processing stage and each forced temporal pooler node of the second processing stage includes neurons as components and edges, two or more of the neurons being connected in a graph to form each node;
constructing and storing, by the first processing stage, data including an index of the recognized input data and information related to timing of the input data, associated with one or more of the dynamic behaviors, the constructed data causing the ECU to (i) formulate a first prediction related to a desired vehicle behavior and a second prediction related to a predicted operator behavior, and (ii) issue one or more commands to cause actuation of actuators on the vehicle to prevent an unexpected vehicle behavior caused by the predicted behavior of the operator of the vehicle, whereby each of the two or more of nodes are adapted for time series analysis, and include components connected in a topological graph or a temporal graph; and
outputting, by the second processing stage, the constructed data, wherein the actuators include at least one of a steering actuator, a braking actuator, and an acceleration actuator.

24. A computer based method comprising:
storing, in an artificial hierarchical memory system of a neural network system, a first processing stage including a plurality of event pooler nodes, and second processing stage separate from the first processing stage, the second processing stage including a plurality of forced temporal pooler nodes;
receiving, by a communication interface of the neural network system, vehicle sensor data generated by one or more sensors installed on a vehicle, the vehicle sensor data being related to dynamic behaviors of an operator while operating the vehicle;
providing, by the communication interface, the vehicle sensor data to an artificial hierarchical memory system implemented within an electronic control unit (ECU) of the vehicle;
receiving, by the plurality of forced temporal pooler nodes of the second processing stage of the artificial hierarchical memory system, the provided vehicle sensor data;
extracting and storing, by the plurality of forced temporal pooler nodes of the second processing stage, prototypes represented as datachunks characterizing the dynamic behaviors of the operator based on the provided vehicle sensor data;
providing, by the plurality of forced temporal pooler nodes of the second processing stage, the prototypes as input to the first processing stage enabling an event to be defined as an occurrence of at least one prototype;
learning and recognizing, by the second processing stage, input patterns and sequences from the received vehicle sensor data, each event pooler node of the first processing stage and each forced temporal pooler node of the second processing stage includes neurons as components and edges, two or more of the neurons being connected in a graph to form each node;
constructing and storing, by the first processing stage, data including an index of the recognized input data and information related to timing of the input data, associated with one or more of the dynamic behaviors, the constructed data causing the ECU to (i) formulate a first prediction related to a desired vehicle behavior and a second prediction related to a predicted operator behavior, and (ii) issue one or more commands to cause actuation of actuators on the vehicle to prevent an unexpected vehicle behavior caused by the predicted behavior of the operator of the vehicle, whereby each of the two or more of nodes are adapted for time series analysis, and include components connected in a topological graph or a temporal graph;

outputting, by the first processing stage, the constructed data; and executing a temporal prediction method on the neural network system triggering temporal prediction methods on each the nodes by use of the homogeneous Generalized Semi-Decision Markov Model as learned by the second processing stage, wherein the actuators include at least one of a steering actuator, a braking actuator, and an acceleration actuator.

\* \* \* \* \*